US011016651B1

(12) United States Patent
Black et al.

(10) Patent No.: US 11,016,651 B1
(45) Date of Patent: May 25, 2021

(54) SYSTEM AND METHOD FOR MINIMIZING TEXT COLLISIONS IN PROJECT TIMELINES

(71) Applicants: Safford T. Black, Highlands Ranch, CO (US); James L. Black, Centennial, CO (US); Nathan W. Black, Kansas City, MO (US)

(72) Inventors: Safford T. Black, Highlands Ranch, CO (US); James L. Black, Centennial, CO (US); Nathan W. Black, Kansas City, MO (US)

(73) Assignee: Chronicle Graphics, inc., Centennial, CO (US)

( * ) Notice: Subject to any disclaimer, the term of this patent is extended or adjusted under 35 U.S.C. 154(b) by 0 days.

(21) Appl. No.: 17/136,755

(22) Filed: Dec. 29, 2020

(51) Int. Cl.
| *G06F 3/0484* | (2013.01) |
| *G06F 3/0482* | (2013.01) |
| *G06F 9/451*  | (2018.01) |
| *G06F 16/34*  | (2019.01) |
| *G06F 16/38*  | (2019.01) |

(52) U.S. Cl.
CPC ........ *G06F 3/04847* (2013.01); *G06F 3/0482* (2013.01); *G06F 9/451* (2018.02); *G06F 16/34* (2019.01); *G06F 16/38* (2019.01)

(58) Field of Classification Search
CPC ...... G06F 3/04847; G06F 9/451; G06F 16/38; G06F 16/34; G06F 3/0482
USPC ......................................................... 715/765
See application file for complete search history.

(56) References Cited

U.S. PATENT DOCUMENTS

| 2014/0006938 A1* | 1/2014 | Black ..................... G06T 13/00 715/255 |
| 2017/0330195 A1* | 11/2017 | Lange ................... G06F 3/0486 |
| 2019/0121498 A1* | 4/2019 | Jakobovits ............ G06F 3/0481 |

* cited by examiner

*Primary Examiner* — William D Titcomb

(57) ABSTRACT

A computer-implemented system that transforms one or more project plans to create a graphical project view. The project view contains a set of markers in rows and along a time axis, with each marker having associated text that must be placed into the project view in a manner that does not interfere with other nearby markers or other nearby text. To avoid such collisions, the user may turn on an algorithm that finds an optimal text position by seeking available white space. The user may also choose to invoke one or more escape paths which apply transformations to the conflicting text to either change the amount of space that they require, change the location of the text to a less-crowded location, increase the amount of available whitespace, or a combination of these approaches.

21 Claims, 33 Drawing Sheets

| Condition | Penalty Points |
|---|---|
| Text-to-Text Collision | 100 * (intersection area) / (text-rectangle area) |
| Text-to-Marker Collision | 100 * (intersection area) / (text-rectangle area) |
| Text-to-Boundary Collision | 100 * (text-rectangle area beyond boundary) / (text-rectangle area) |
| Text-to-Free Shape Collision | 100 * (intersection area) / (text-rectangle area) |
| Text-to-Link Collision | 100 * (intersection area) / (text-rectangle area) |
| Marker Text Overflow | 100 * (text-rectangle area outside marker but inside Chart) / (text-rectangle area) unless Marker is Interior Ribbon Marker |
| Text-Wrapping Escape Path | 10 points for each line of text wrapped, beyond the first |
| Stair-Step Escape Path | 10 points for each level (Row offset) that a stair step jumps |
| Truncation Escape Path | 40 * (original character count – truncated character count) / (original character count) |
| Font-Reduction Escape Path | 40 * (original font size – reduced font size / (original font size) |
| Time-Axis-Expansion Escape Path | 20 * (expanded chart duration – original chart duration) / (original chart duration) |
| Row-Height-Increase Escape Path | 20 * ( new row height – original row height) / (original row height) |

| Condition | Penalty Points |
|---|---|
| Marker Text in Left Position | -10 if Marker is left Exterior Marker in a Bird Set or Ribbon Set and has no Collisions with Markers outside its Bird or Ribbon Set.<br><br>+2 if Marker is the only Marker in its Row and is closer to left Chart Boundary than to right Chart Boundary. |
| Marker in Right Position | -10 if Marker is right Exterior Marker in a Bird Set or Ribbon Set and has no Collisions with Markers outside its Bird or Ribbon Set.<br><br>+2 if Marker is the only Marker in its Row and is closer to right Chart Boundary than to left Chart Boundary. |
| Marker Text in Above Position | +2 (optional; off in examples here) if Marker is closer to top Chart Boundary than to bottom Chart Boundary<br>-10 if Marker is Interior Marker in Bird Set or Ribbon Set |
| Marker Text in Below Position | +2 (optional; off in examples here) if Marker is closer to bottom Chart Boundary than to top Chart Boundary<br>-10 if Marker is Interior Marker in Bird Set or Ribbon Set |
| Marker Text in Upon Position | +2 if Marker is not assessed Marker Text Overflow Penalty Points.<br><br>-10 if Marker is the Task Marker in a Bird Set.<br><br>-10 if Marker is Interior Task Marker in Ribbon Set |

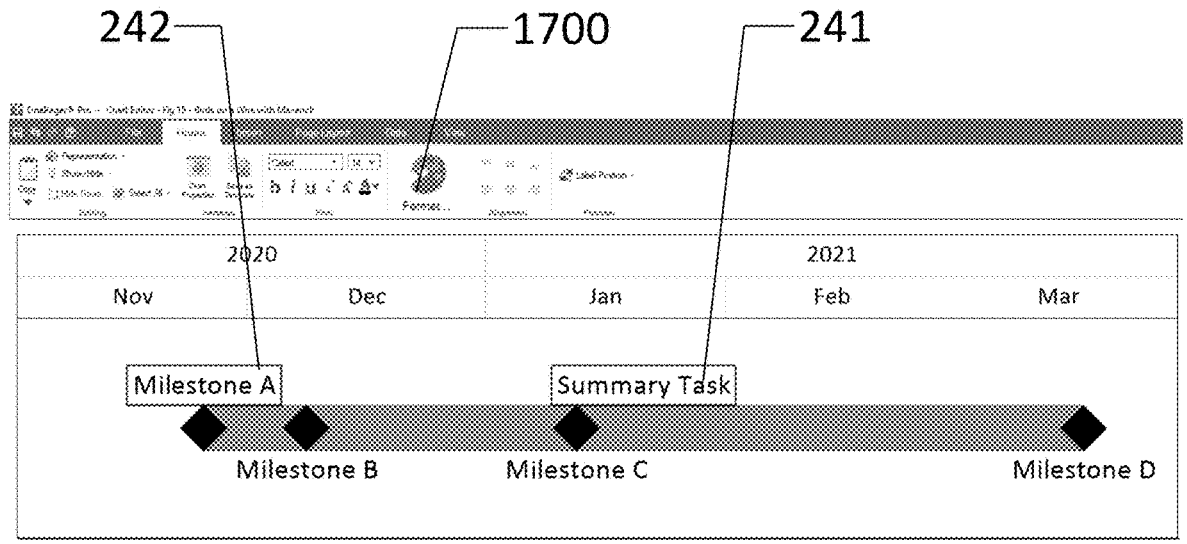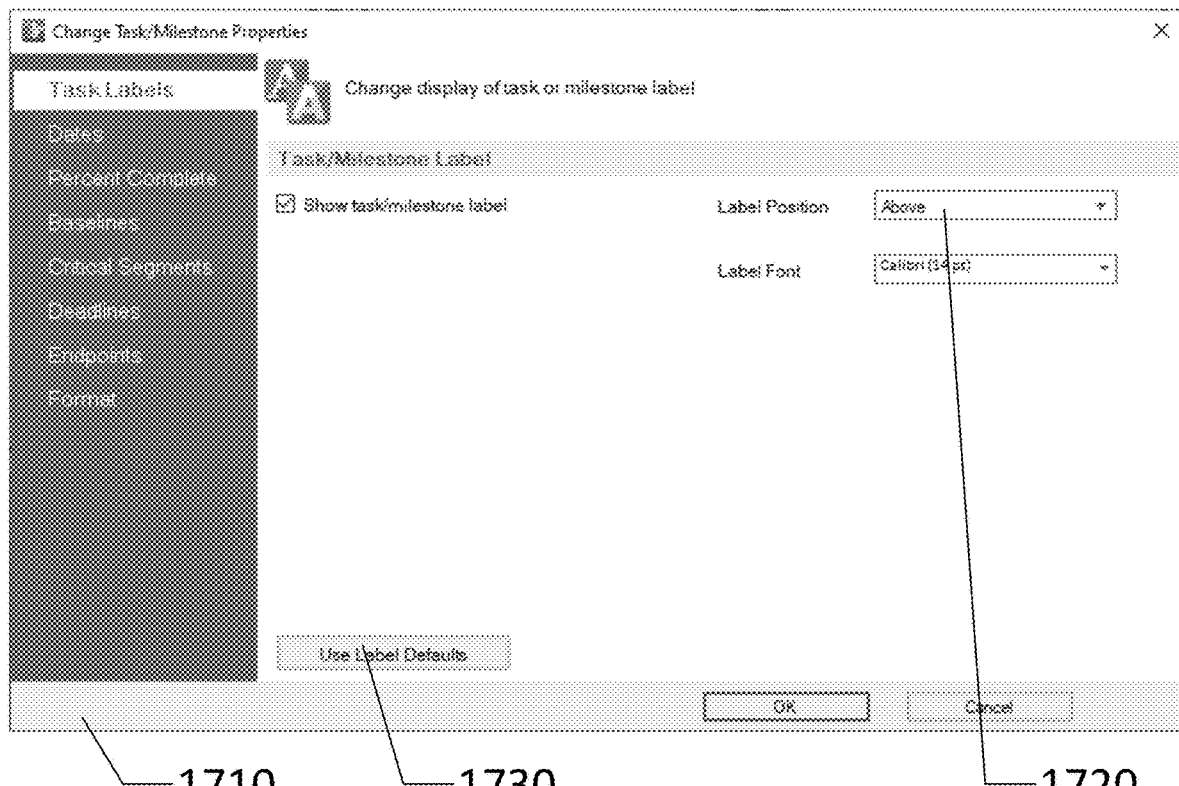
FIG. 15

Event Data 3700

| Event ID | Event Name | Start Time | Finish Time | Row ID |
|---|---|---|---|---|
| 1 | Milestone 1 | 1/28/2021 | 1/28/2021 | 1 |
| 2 | Task 2 | 11/1/2020 | 12/3/2020 | 2 |
| 3 | Task 3 | 12/18/2020 | 1/28/2021 | 2 |
| 4 | Task 4 | 11/1/2020 | 12/3/2020 | 3 |
| 5 | Long Milestone 5 | 12/14/2020 | 12/14/2020 | 3 |
| 6 | Task 6 | 12/18/2020 | 1/28/2021 | 3 |
| 7 | Milestone 7 | 12/8/2020 | 12/8/2020 | 4 |

3720 — 1300

Lowest

☑ Stairsteps up to [ 2 ] levels    Highest

3710

Chart 3730

3725 — 3741 — 3731

| 2020 | | 2021 |
| Nov | Dec | Jan |

Long Milestone 5    Milestone 1 ◆

Task 2    Task 3

Task 4    ◆    Task 6

◆ Milestone 7

—3734  3737—  —3727 3736—  —3744
—3732  3735—  —3742 3733—  3743—

FIG. 32

SYSTEM AND METHOD FOR MINIMIZING TEXT COLLISIONS IN PROJECT TIMELINES

BACKGROUND OF THE INVENTION (a) Field of the Invention

This invention pertains to a computer-implemented system that creates visual project reports where sets of task and milestone shapes appear alongside associated text that can be moved or modified to increase this text's legibility by minimizing its overlap with nearby shapes and text.

(b) Discussion of Prior Art

Project management is as much about communication as it is execution, but projects by their very nature are complex, which makes it difficult to effectively communicate the big picture to stakeholders or executives.

Commercially-available project management software such as MICROSOFT® Project or ORACLE® PRIMAVERA® P6®, focus on the management of project details, but do a rudimentary job of creating visual reports that are concise and are easy for laypeople to understand. One of the reasons that project details are often difficult to understand is that project managers attempt to include excessive amounts of detail in very small amounts of physical space, such as a single PowerPoint slide, which creates issues of legibility due to the volume of text relative to the available space.

In many cases, the legibility of dense charts can be optimized by relocating text or reducing its size.

The concept of text wrapping to enable longer text to fit into limited horizontal space has been taught by U.S. Pat. No. 10,127,193 (Kajimoto). However, Kajimoto does not teach wrapping in the context of text collisions; rather, this invention wraps text with the goal of fitting it into a fixed amount of horizontal space, irrespective of neighboring objects. Further, Kajimoto teaches that text is wrapped starting at the end and finishing at the beginning of the string, which results in a first line of text that is often significantly longer than the second line of text. This method works well in many applications and does reduce the overall width of a piece of text. However, it does not minimize the width of the text, which is often required to avoid collision with neighboring objects.

The concept of text truncation has addressed space constraint issues in the field of graphical user interface design under U.S. Pat. No. 10,503,808 (Vasiltschenko, et. Al). Vasiltschenko teaches that text may be truncated in cases where a text element does not have adequate space. In these cases, the Vasiltschenko solution provides the end user with several options for shortened text, prompting the user to approve a preferred shortened version of the element. This end user interaction and approval works well in the field of user interface design, because text in user interfaces is not subject to frequent changes after the user interface has been laid out. In project management, however, each project will have a vastly different set of tasks with different names, and it is not uncommon for a project manager to add, remove, or modify large volumes of tasks over the duration of a project. As a result, a system that prompts end users to review and approve each instance of truncation requires too much manual intervention by a project manager to be efficient.

The concept of optimal text repositioning to minimize collisions has been addressed in other fields such as air-traffic control displays, but is quite different in the field of project management reporting. The air-traffic text collision avoidance in U.S. Pat. No. 7,131,060 (Azuma) teaches automatic placement of each airplane-identification label at a radius and angle measured from the nose of a moving airplane symbol and rendering a radial line to show that it identifies the airplane that is some distance away from it. It looks for clusters of colliding labels and then changes the angles and radii of the labels to reduce collisions in such clusters. Project-management reporting strongly prefers not to render labels that are offset from tasks or milestones with such radial and angular degrees of freedom, but rather places labels immediately adjacent to or directly over the task or milestone. Furthermore, tasks and milestones are not arbitrarily distributed in two dimensions but rather are aligned in identifiable geometric configurations (e.g. "birds on a wire") in well-defined rows that have meaning to project managers. For these reasons, text collision minimization for project management reporting requires a different approach that does not identify clusters of colliding labels in two-dimensional space but rather identifies pairs of colliding labels, paying special attention to pairs that belong to identifiable geometric configurations in rows.

VISIBILITY.BIZ SWIMLANE TIMELINE is another project reporting application that faces the same issues handling excessive amounts of text. When SWIMLANE TIMELINE detects a lot of task or milestone shapes (also known here as "markers") in a single Row, it adds more Rows automatically to increase the amount of whitespace. While this does reduce the chances that text may collide, many users prefer a more traditional timeline layout with multiple markers aligned left-to-right in a single Row, and do not wish to have additional Rows added to the chart. Further, if the user disables the collision avoidance algorithm, and allows more tasks into the same Row, the text is not reoptimized to minimize overlap.

SWIMLANE TIMELINE also supports the wrapping of text, which is a method of optimizing whitespace. However, this text wrapping does not account for neighboring shapes or neighboring text; it happens automatically irrespective of surrounding conditions. As a result, there are cases where text is wrapped unnecessarily. Conversely, because SWIMLANE TIMELINE does not provide for a variable number of lines of text to be wrapped, there are also cases where text is wrapped insufficiently and thus still collides with neighboring objects.

OFFICE TIMELINE, which is a timeline application that embeds in MICROSOFT® POWERPOINT®, supports more adaptive wrapping of text than SWIMLANE TIMELINE, adding a variable number of lines of wrapping to improve readability for longer text. This text wrapping is accompanied by automatic adjustment of Rows containing wrapped text to increase the available whitespace. However, OFFICE TIMELINE® only applies text wrapping in cases where the text of a marker is too close to a page boundary. The wrapping is not applied in cases where the text collides with nearby text or shapes. Further, not all charts can accommodate more vertical space, so this solution only works for charts with relatively few Rows.

When text is repositioned above or below the marker, OFFICE TIMELINE® adjusts the Row height to ensure that adequate space for the text is available. Again, this solution only works in cases where there is not a constraint on available vertical space and is also not viable in cases where the user requires all Rows in the chart to maintain a consistent height. When it comes to horizontal space management, OFFICE TIMELINE® does not consider the common case where multiple markers are aligned left-to-right in the same Row, forcing several pieces of text to share limited horizontal space, which leads to text collisions.

When rendering milestones, OFFICE TIMELINE® automatically places milestone text on different vertical levels to reduce the chances for overlap. However, this is achieved by increasing the height of the Row containing the milestones, and again does not consider whitespace in neighboring Rows. For example, if one Row contains milestones that require the text to be vertically-separated, and a neighboring Row has adequate space to accommodate that vertical separation, OFFICE TIMELINE® will unnecessarily increase the height of the first Row instead of borrowing some of the whitespace in the neighboring Row.

KIDASA® MILESTONES PROFESSIONAL® is another project reporting application. It neither wraps text automatically when the text collides with neighboring text or shapes, nor when text is near the chart boundary. MILESTONES PROFESSIONAL® will automatically increase the vertical separation between conflicting pieces of text, placing the first piece on one line, and the second piece on a second line, which improves readability in some cases. However, this vertical repositioning considers text collisions within a single Row of markers and does not account for potential collisions in neighboring Rows. Therefore, the repositioning that MILESTONES PROFESSIONAL® often performs will avoid one collision only to cause a different one.

The current art all support manual repositioning of text, but this is a tedious and time-consuming process since it requires user intervention and requires some trial and error to achieve an optimal result by hand.

In conclusion, the current state of the art recognizes that text collisions in project reports are a problem but fails to provide an efficient solution. Current manual solutions are too time-consuming, while current automated solutions are either too inflexible, in that they try to apply the same treatment to all conflicting text instead of optimizing collisions on a case-by-case basis, or they perform optimizations in a way that does not make efficient use of available whitespace. The optimal solution is a system that analyzes each text collision individually and is supported by an algorithm to determine which of several treatment(s) should be used to avoid collisions based on the availability of existing whitespace near where the collision is taking place. In this system, users should have high-level control over which treatments are allowable, and the degree to which these treatments can be used. The system, based on the parameters provided by the end user, its detection of collisions, and its usage of available whitespace, should be able to solve for an optimal text layout that minimizes both the number of collisions and the number of corrective treatments that must be applied.

DRAWINGS

FIGS. 4 and 5 show an example Scoring Matrix of Condition Penalties used to calculate a Text Optimization Score, each Condition Penalty consisting of a Condition and associated Penalty Points that add to the Text Optimization Score when the Condition is met. In many cases the Penalty Points column contains additional requirements that must be true in order for the Penalty Points to accrue. These additional requirements should be considered part of a more detailed Condition. Some Penalty Points are negative to bias the optimization toward putting certain Markers into preferred Text Positions.

Figure 6:
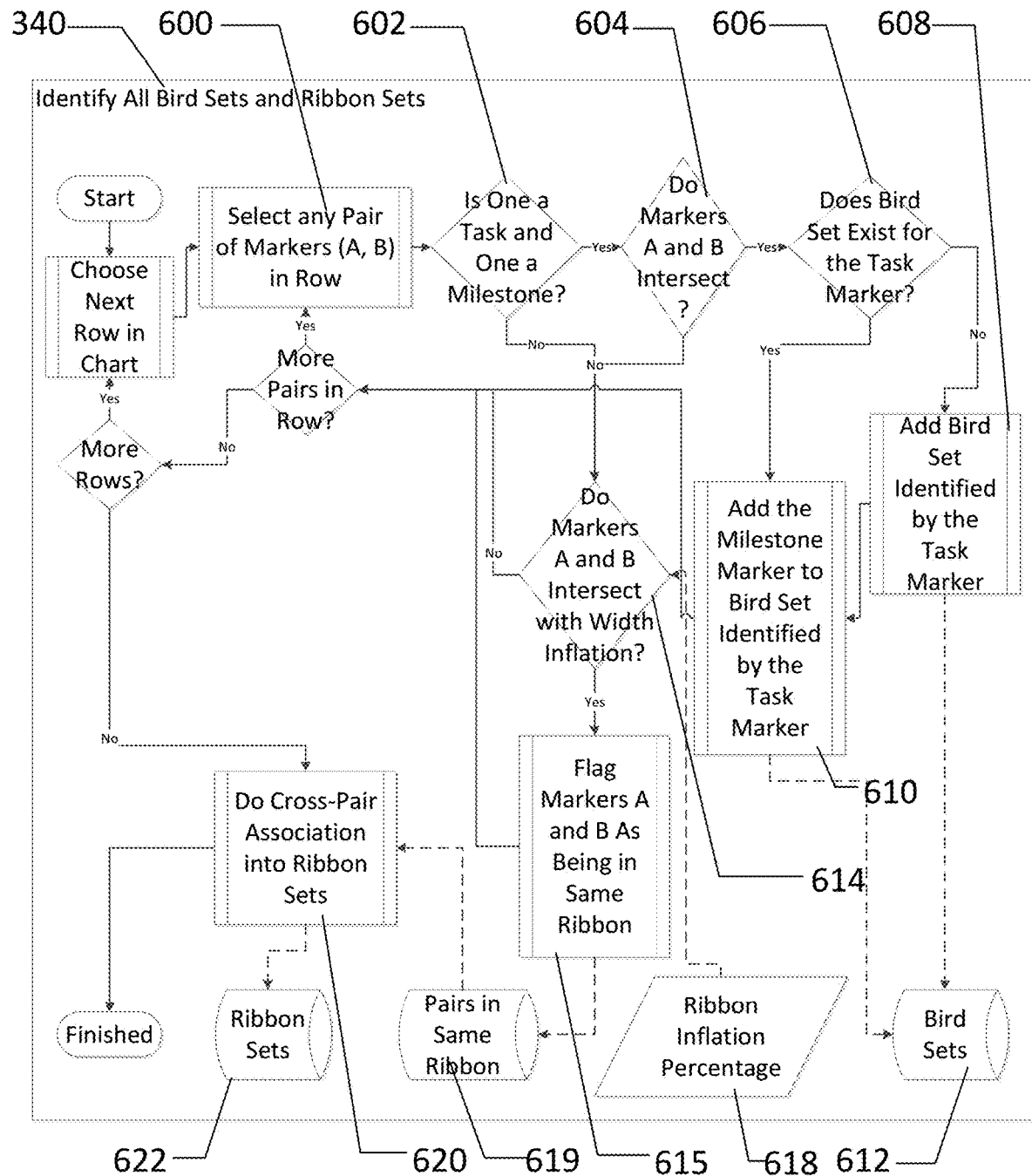

FIG. 6 shows details of how the Text Optimization Engine identifies Bird Sets and Ribbon Sets.

Figure 7:
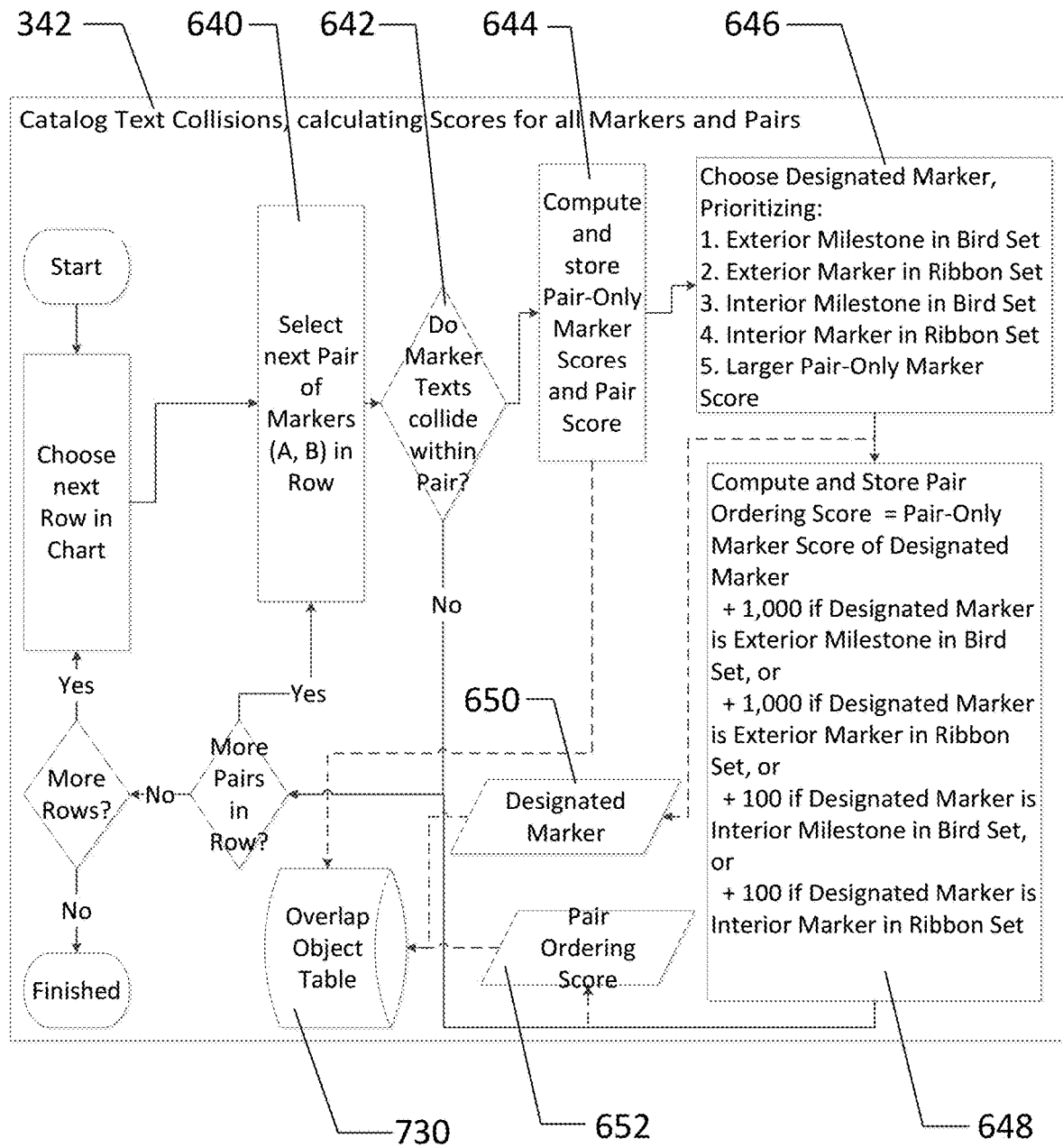

FIG. 7 shows details of how the Text Optimization Engine identifies Text Collisions within Pairs, selects the Designated Marker for first optimization within the Pair, and shows how it computes the Pair Ordering Score to store in the Overlap Object Table and thereby determine the sequence in which Pairs are optimized.

Figure 8:
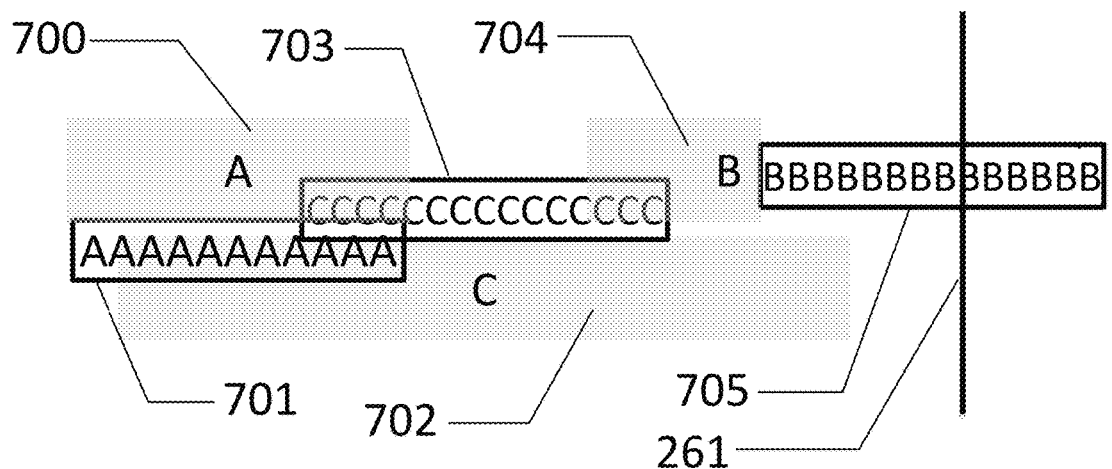

FIG. 8 shows an example of three Markers with colliding Marker Text to illustrate how Penalty Points contribute to the computation of Marker Score, Pair-Only Marker Score, Pair Score, Text Optimization Score, Pair Ordering Score, and Designated Marker.

Figure 2:
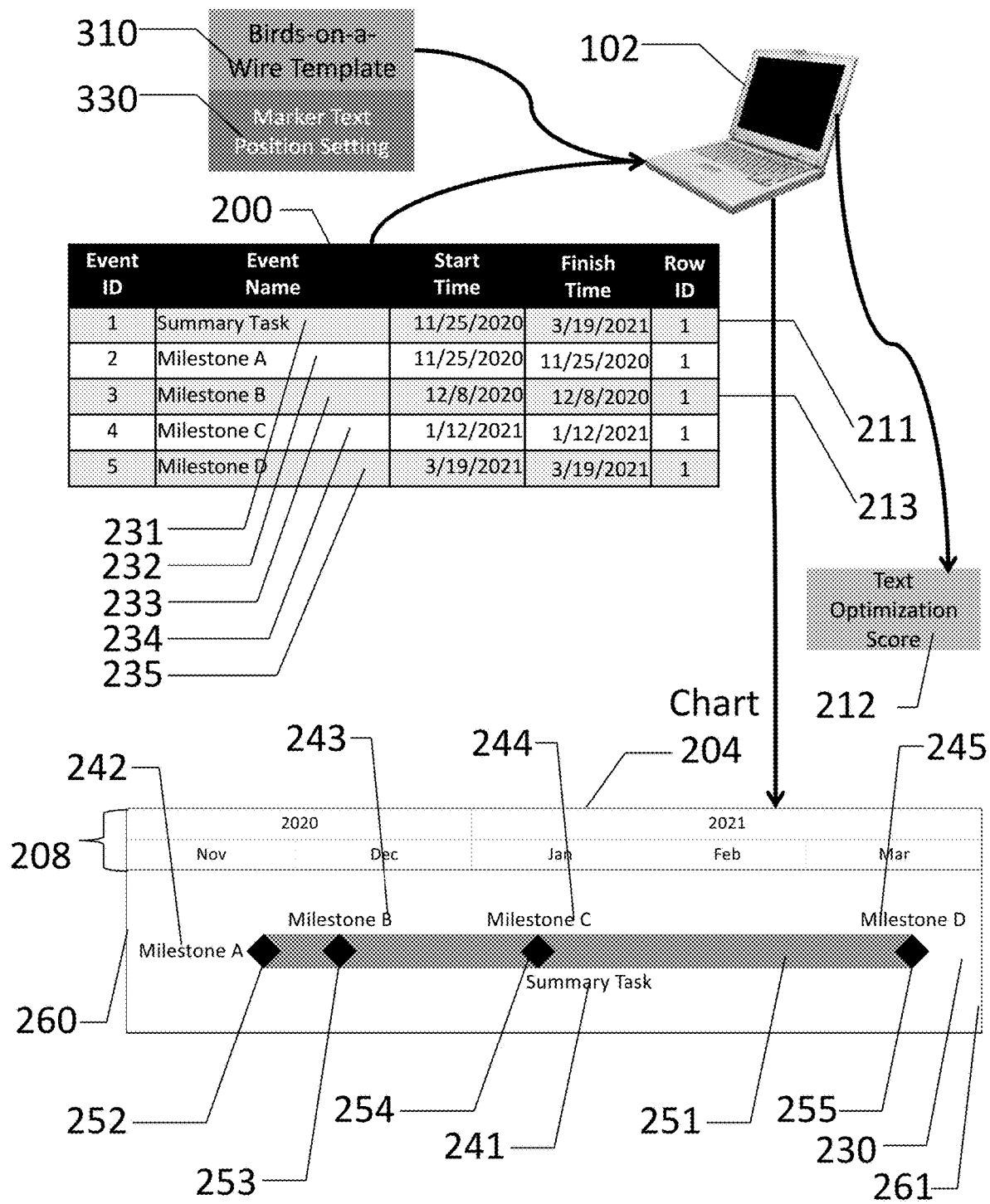
FIG. 2 shows a high-level overview of the computer-driven process, which transforms Event Data into a Chart in a Birds-on-a-Wire Layout with Marker Text optimized according to an embodiment of the present invention.
Figure 9:
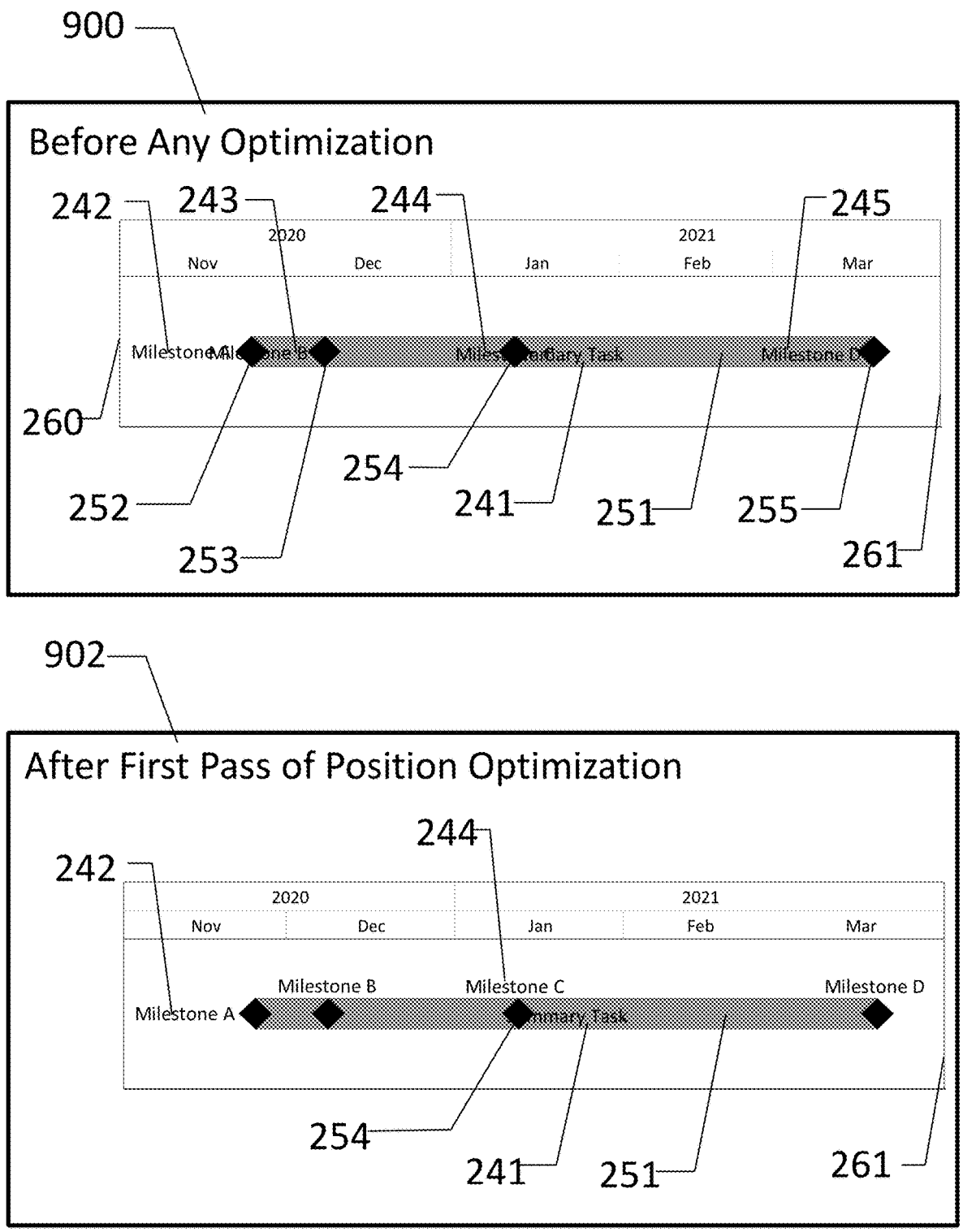

FIG. 9 shows in the top portion the initial, illegible configuration of Marker Text that the Text Optimization Engine transforms into the legible configuration of FIG. 2; and shows in the bottom portion the state of Text Collisions after the first pass of Position Optimization on the way to the legible configuration of FIG. 2.

Figure 10:
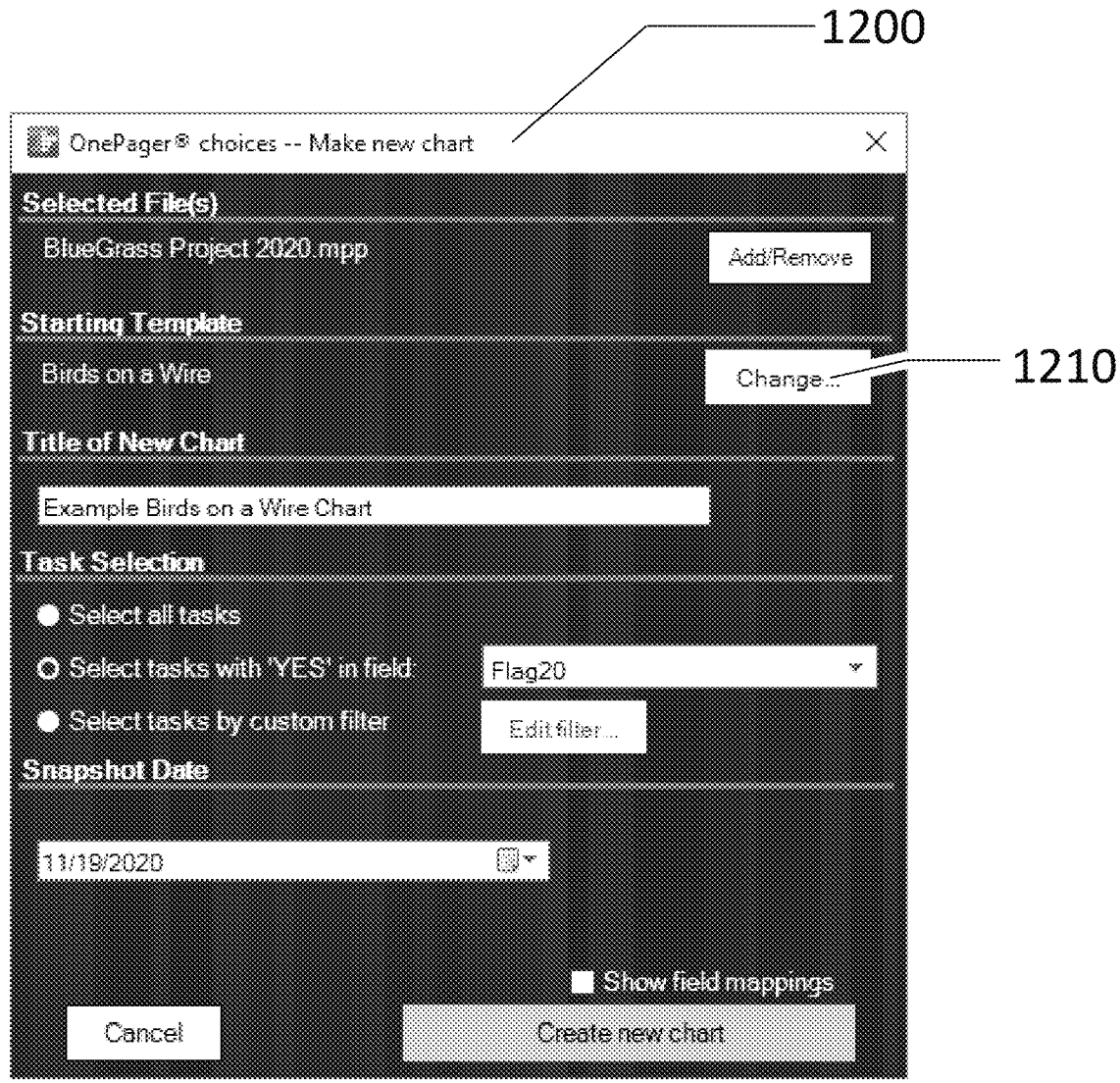

FIG. 10 shows a form method to create a new Chart from Event Data according to an embodiment of the present invention.

Figure 11:
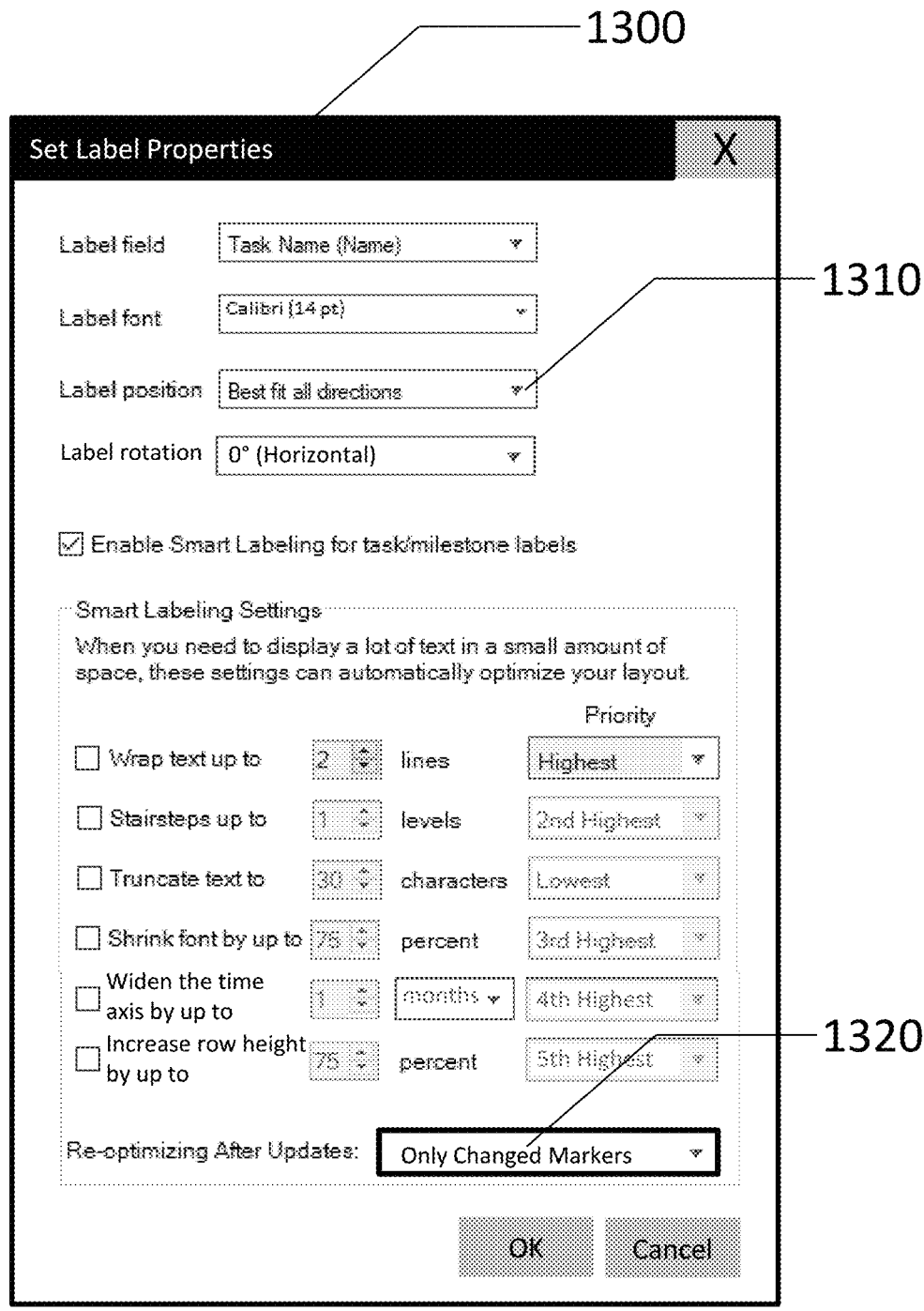

FIG. 11 shows a Settings Screen that includes a Marker Text Position Setting Control and a Reoptimize After Update Control.

Figure 12:
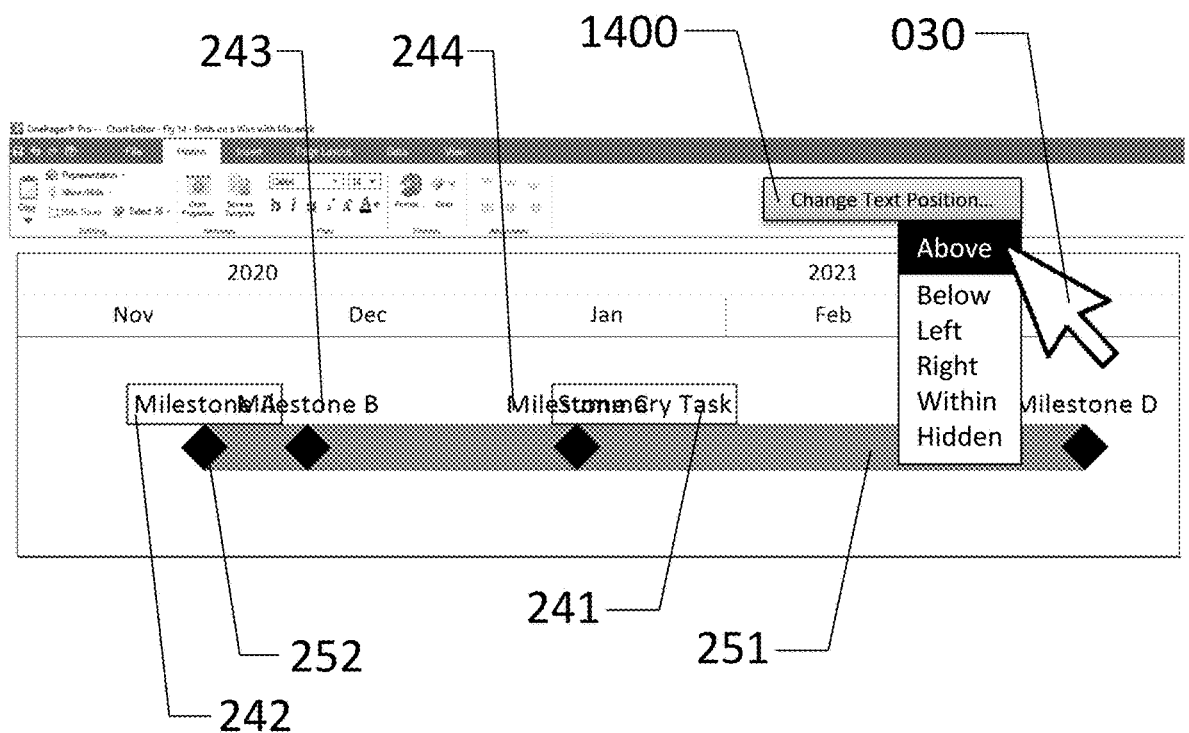

FIG. 12 shows a process by which a user can manually reposition Marker Text, thereby creating Mavericks and causing Text Collisions.

Figure 13:
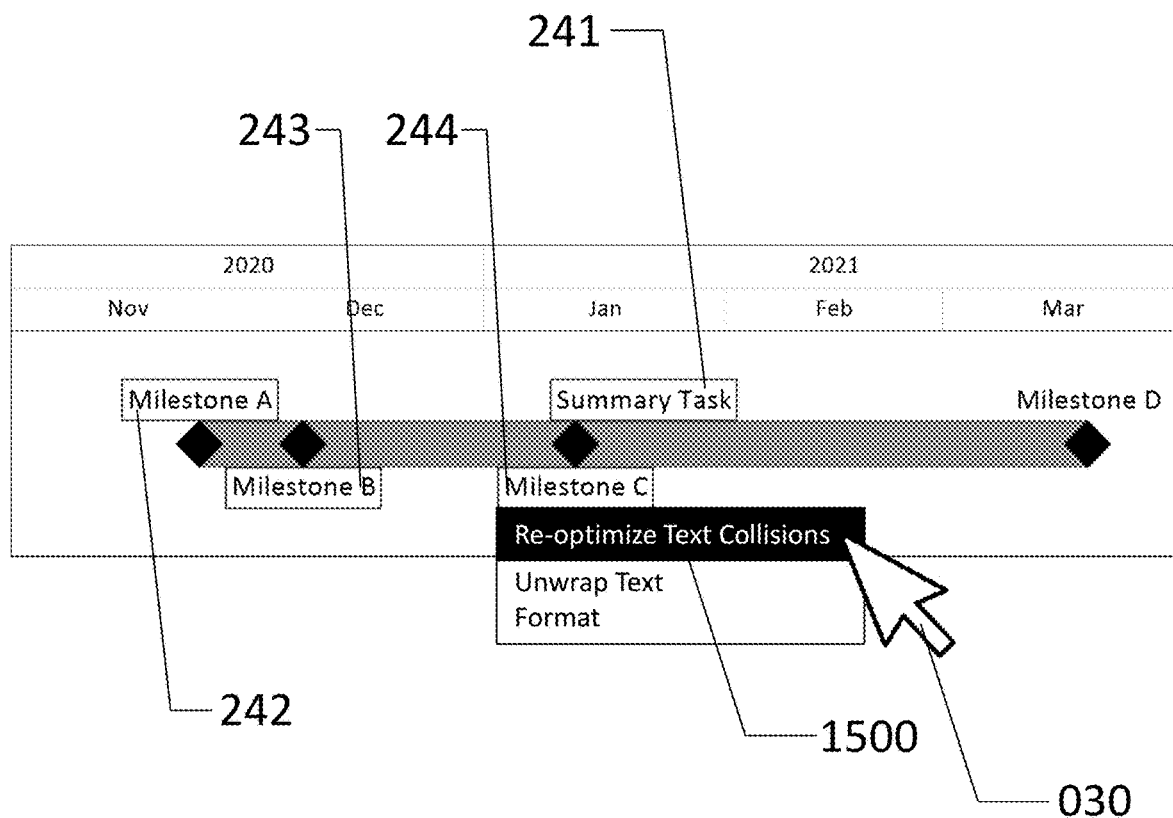

FIG. 13 shows a process by which a user can use a Re-Optimize Text Collisions Option to repair Text Collisions.

Figure 14:
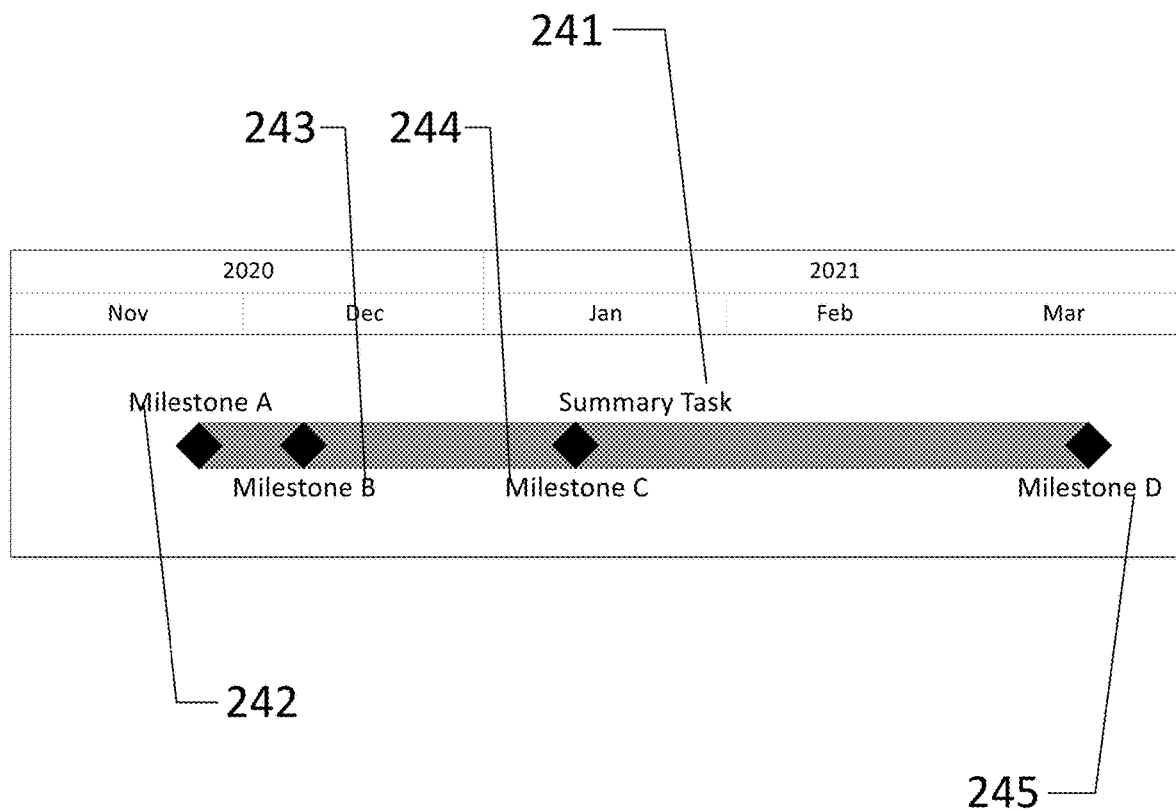

FIG. 14 shows that Maverick Marker Text Positions do not change, even after a change to the Marker Text Position Setting.

FIG. 15 shows how the user can select Maverick Marker Text and reset their Marker Text Positions back to the default Marker Text Position Setting using a Use Defaults Button.

Figure 16:
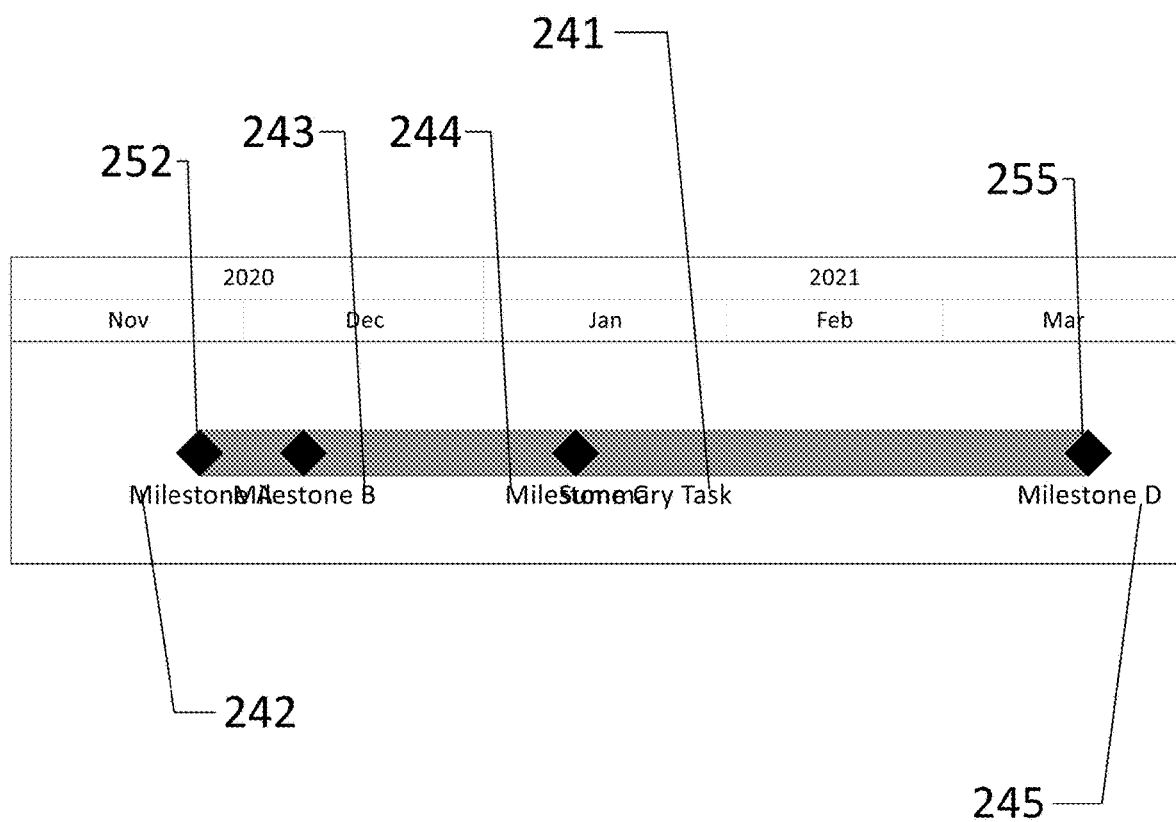

FIG. 16 shows previously-Mavericked Marker Text reverting to the default Marker Text Position Setting.

Figure 17:
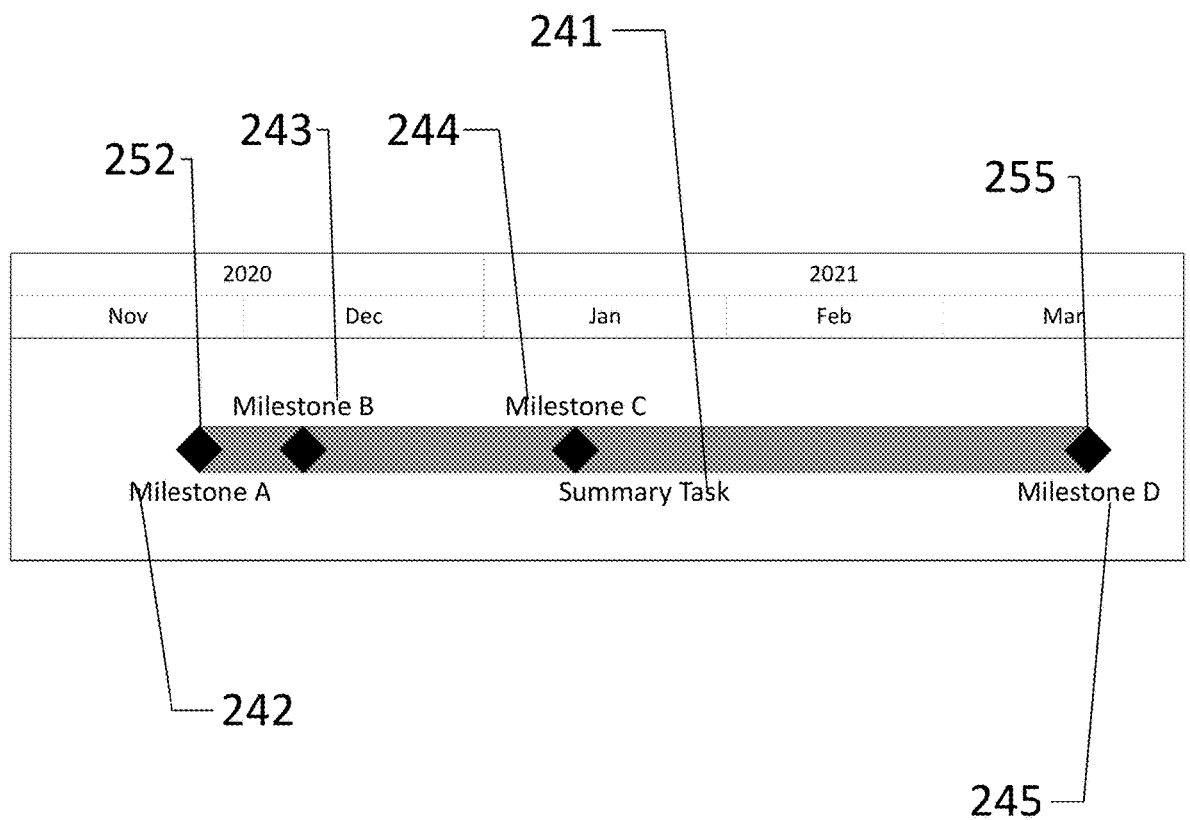

FIG. 17 shows the result of a change in the Marker Text Position Setting from Best Fit All Directions to Best Fit Above/Below.

Figure 18:
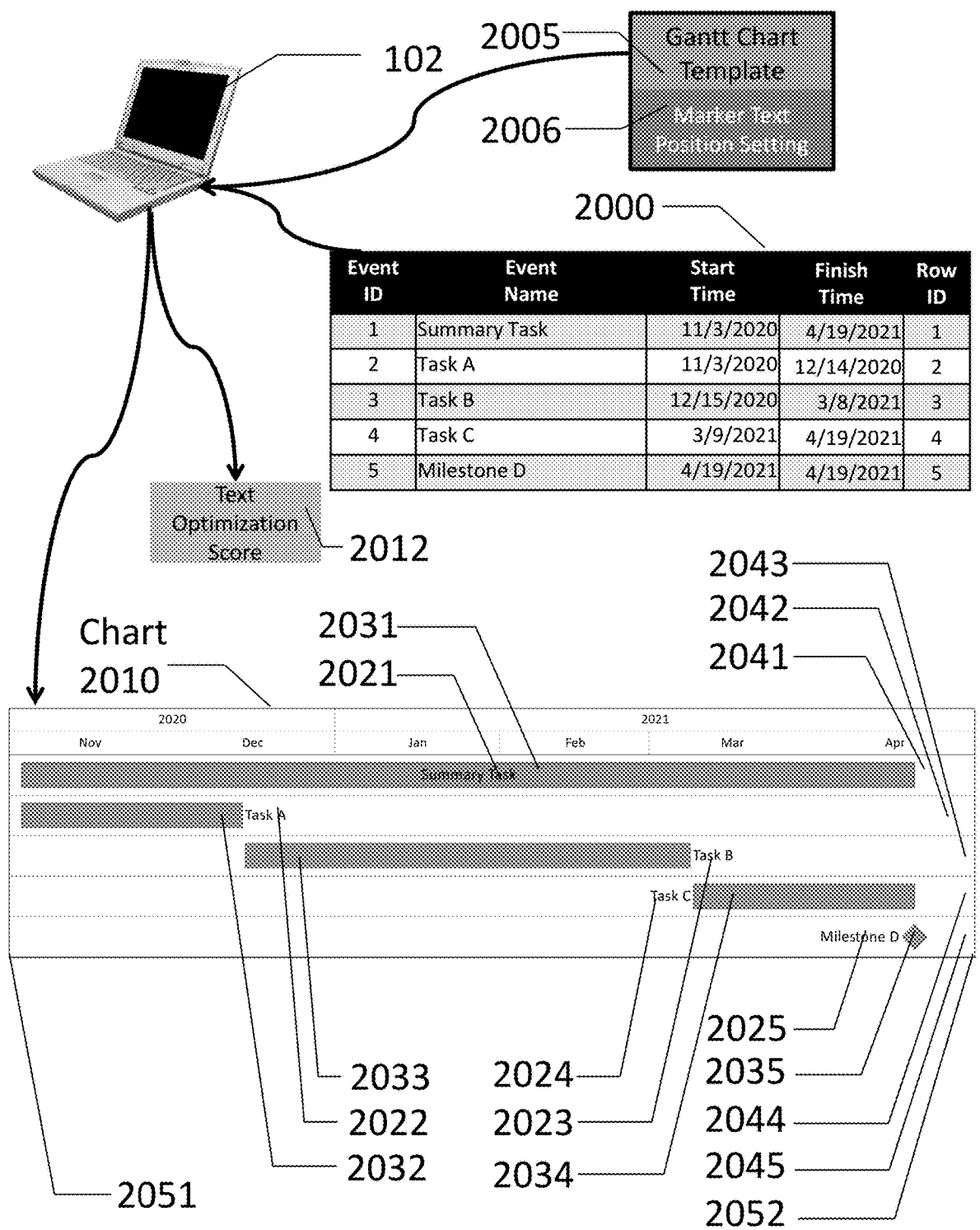

FIG. 18 shows a high-level overview of the computer-driven process, which transforms Event Data into a Chart in a Gantt Layout with Marker Text.

Figure 19:
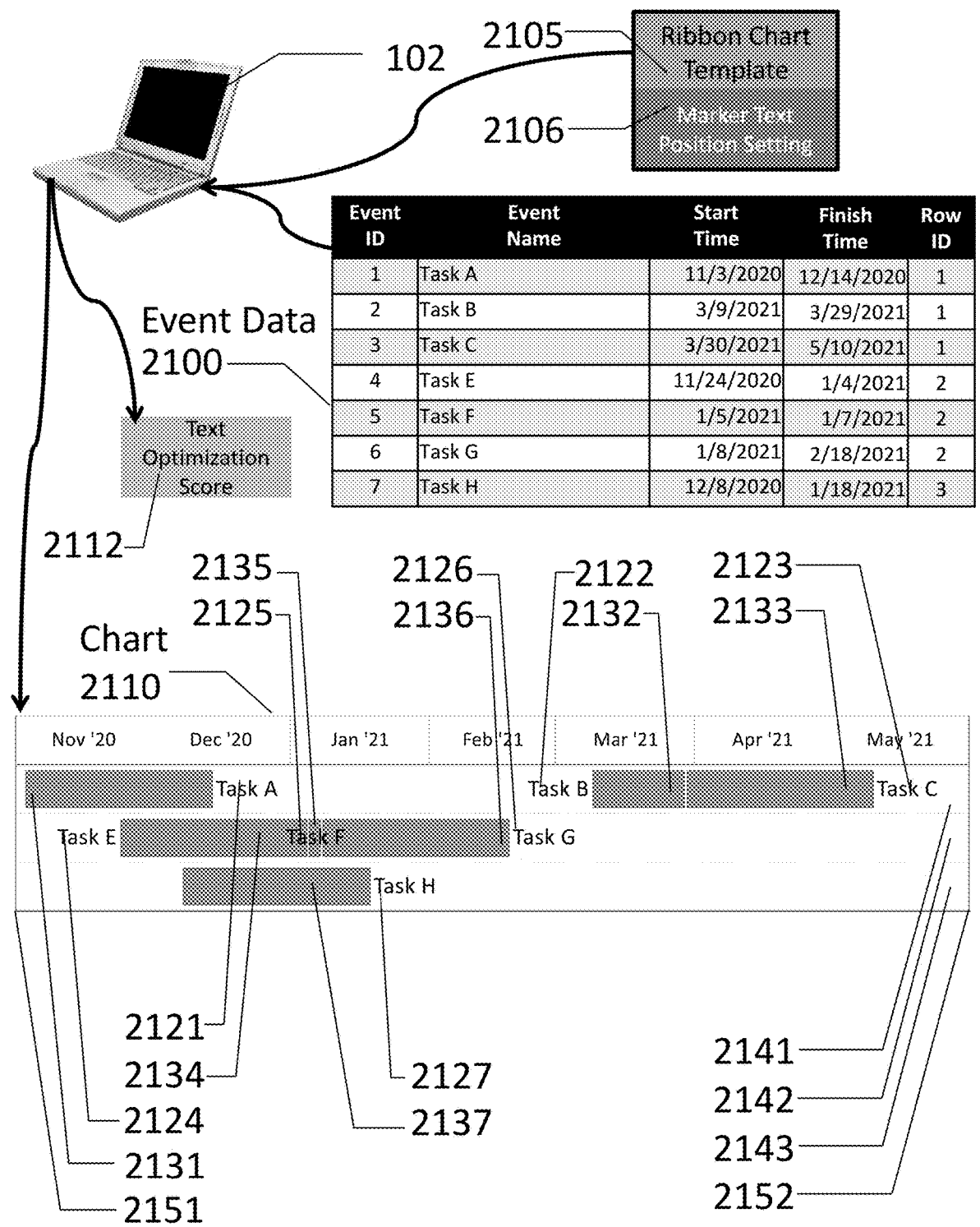

FIG. 19 shows an overview of the computer-driven process that transforms Event Data into a Chart in a Ribbon Layout with Marker Text partially optimized but experiencing a Text Collision according to an embodiment of the present invention.

Figure 20:
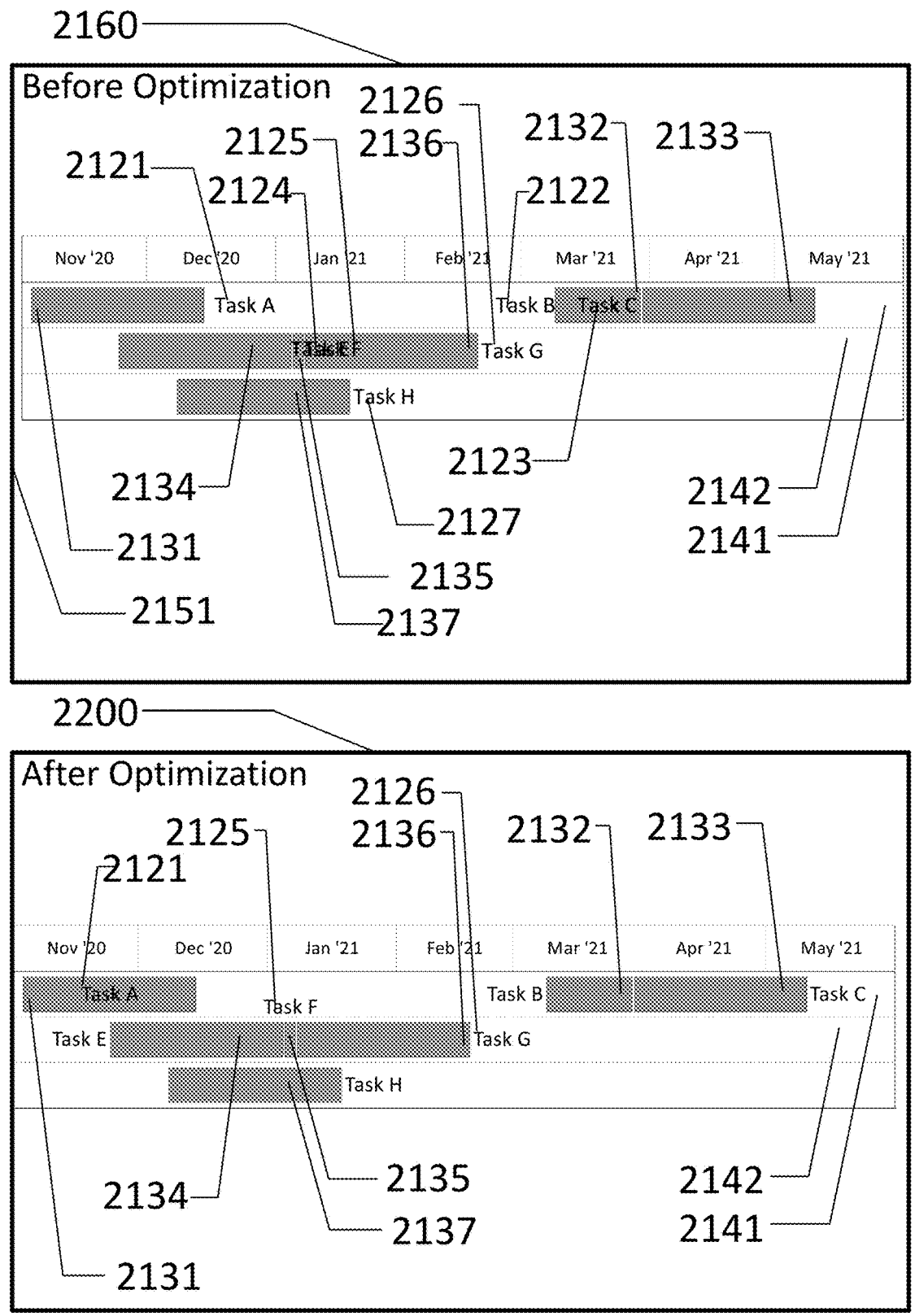

FIG. 20 shows in the top portion the state of Text Collisions before optimization for FIG. 19 begins; and shows in the bottom portion the Text Collision avoided and optimization improved after a change in the Marker Text Position Setting to Best Fit All Directions.

Figure 21:
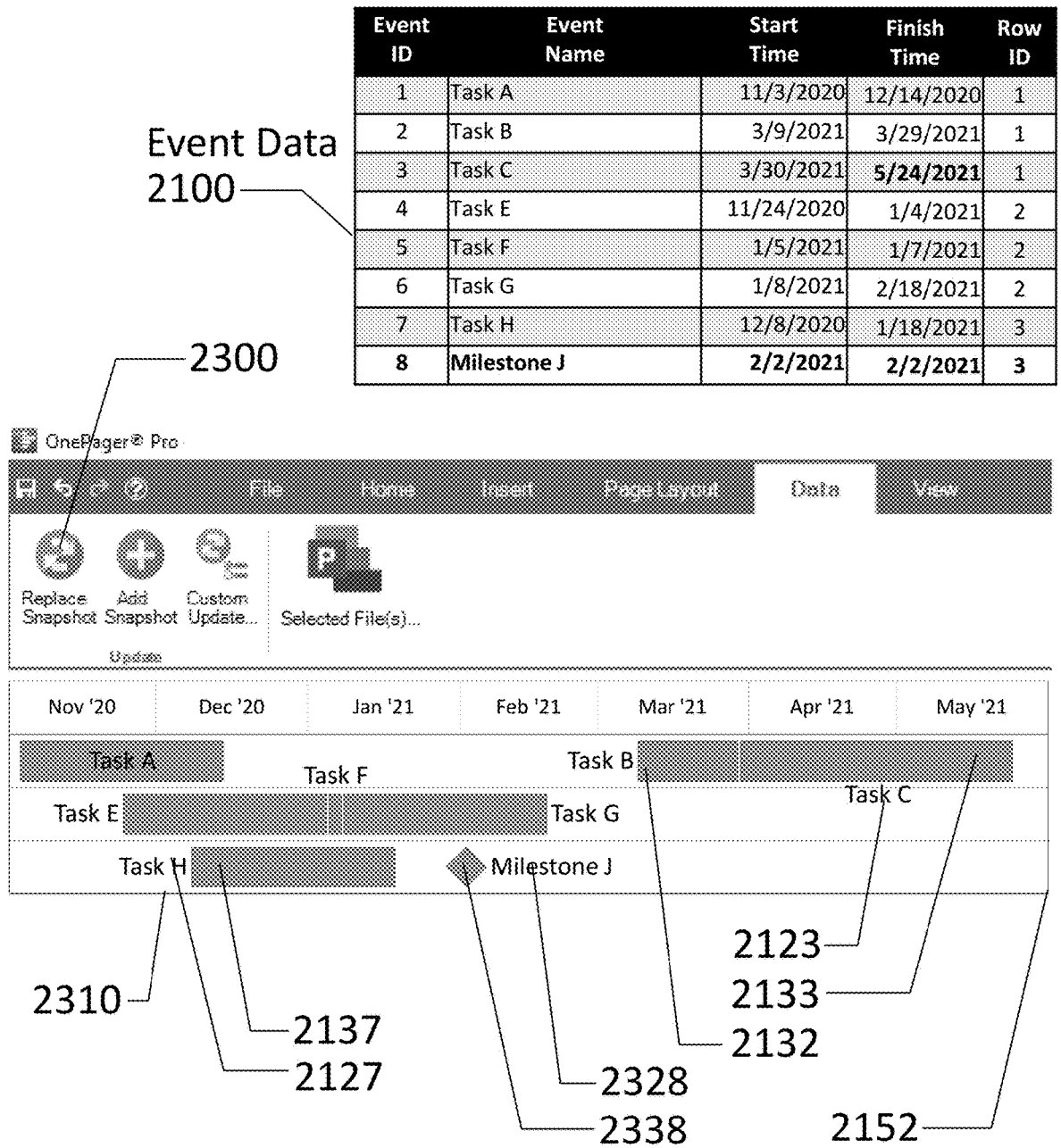

FIG. 21 shows re-optimization of Marker Text after a change to the Event Data.

Figure 22:
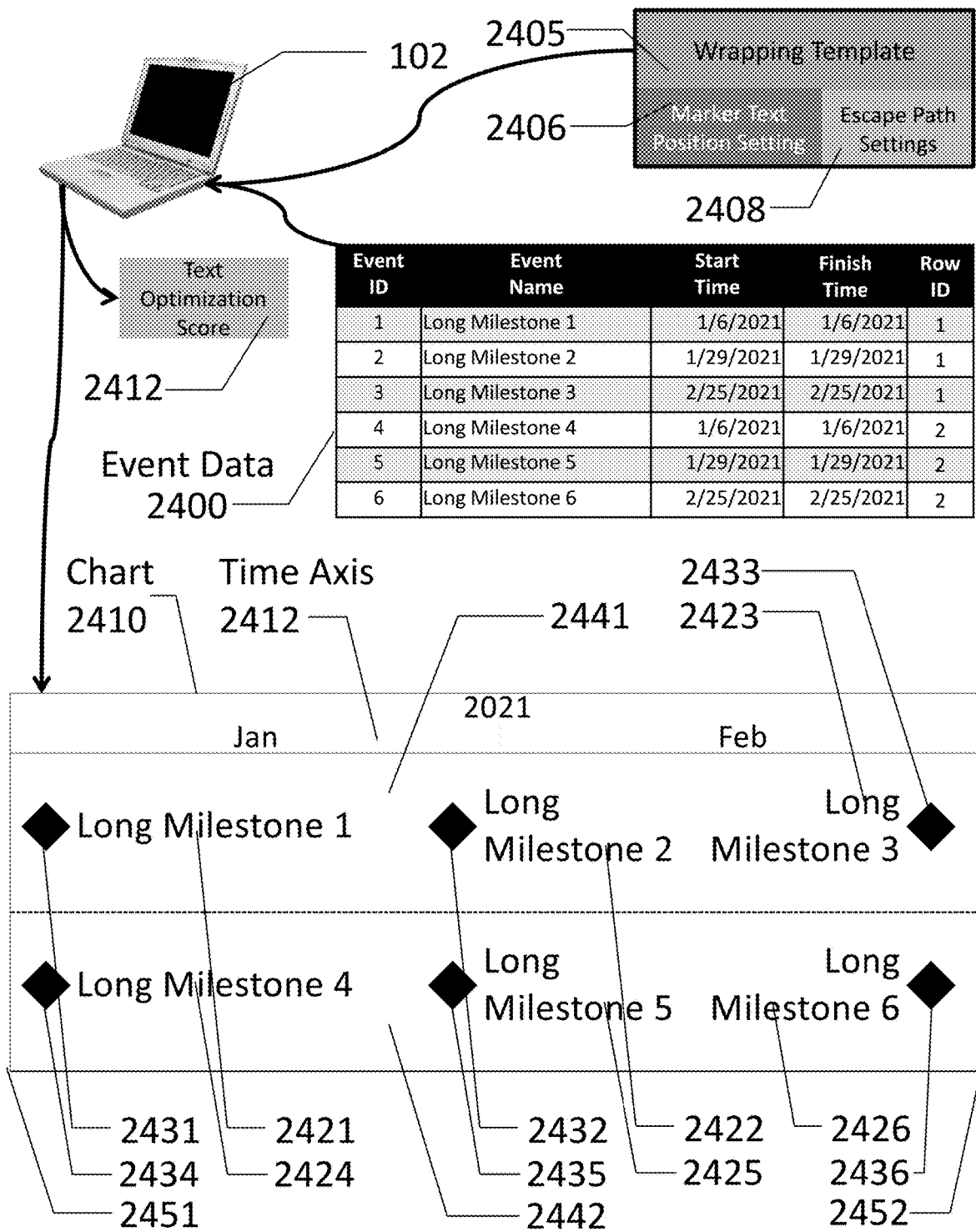

FIG. 22 shows an overview of a computer-driven process that transforms Event Data into a Chart using a Text Wrapping Escape Path, and calculation of a Text Optimization Score.

Figure 23:
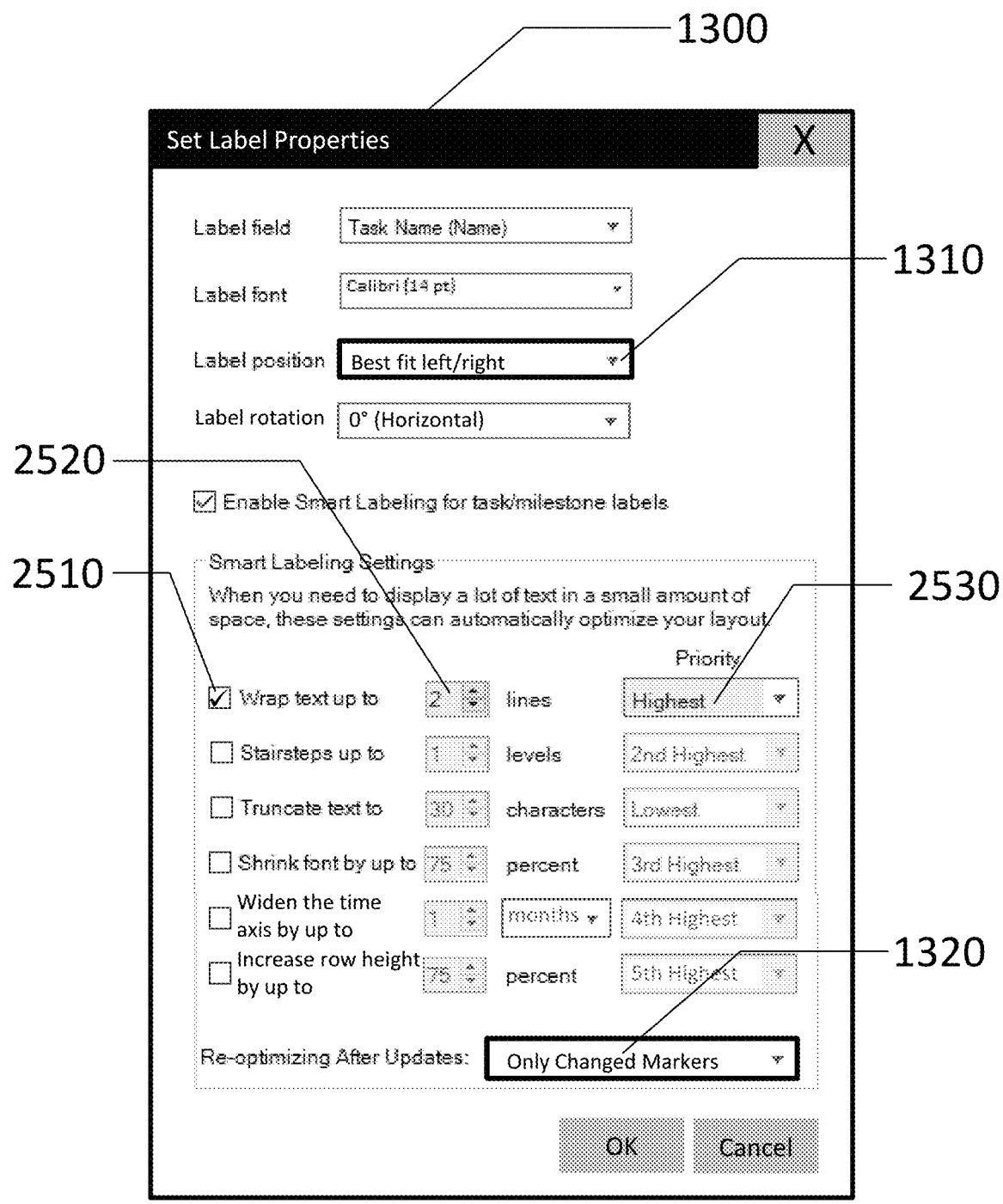

FIG. 23 shows the Settings Screen with a Text Wrapping Switch and Text Wrapping Control Setting.

Figure 24:
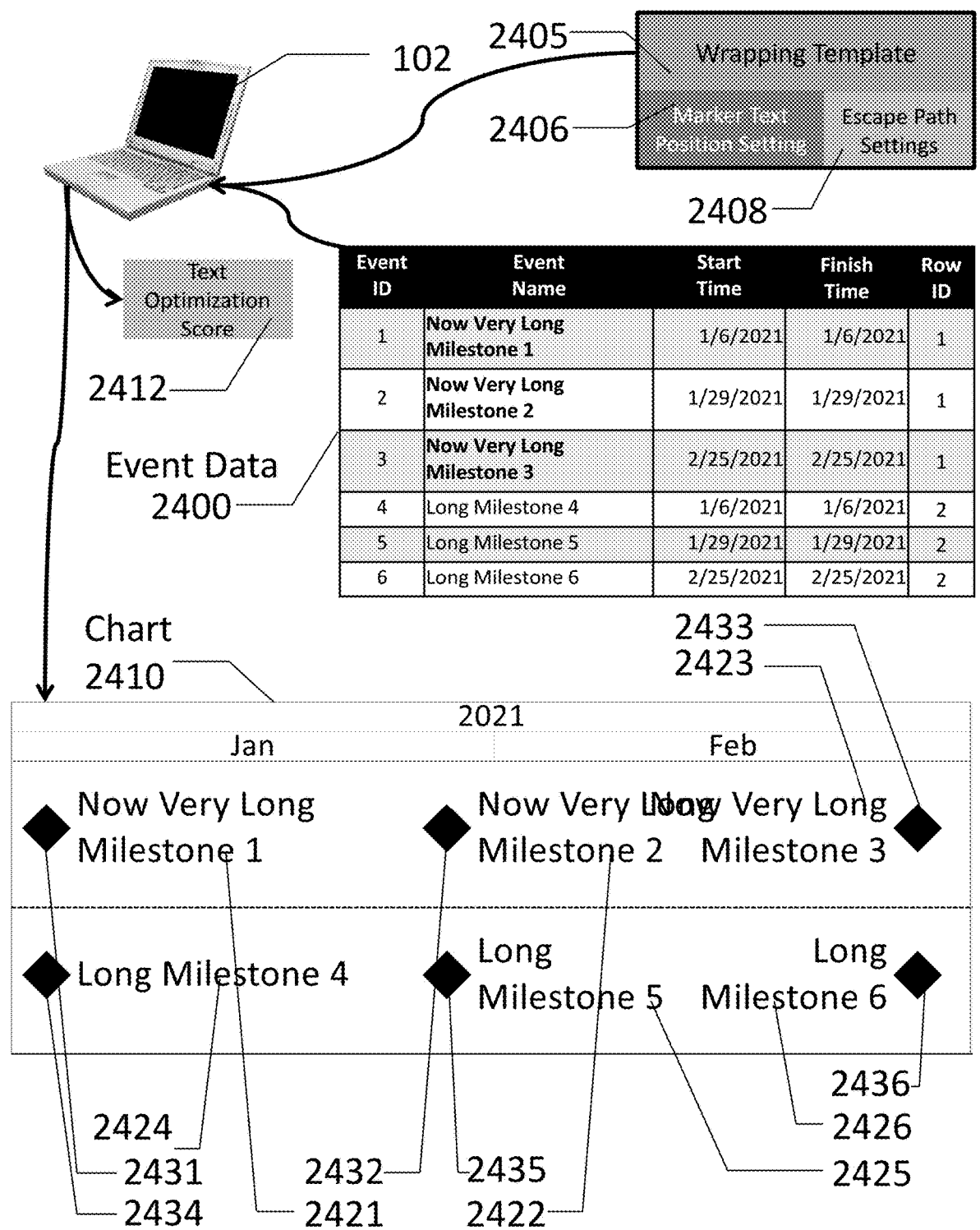

FIG. 24 shows an update to the Chart and a Text Collision after changes to the Event Data lengthens some Marker Text.

Figure 25:
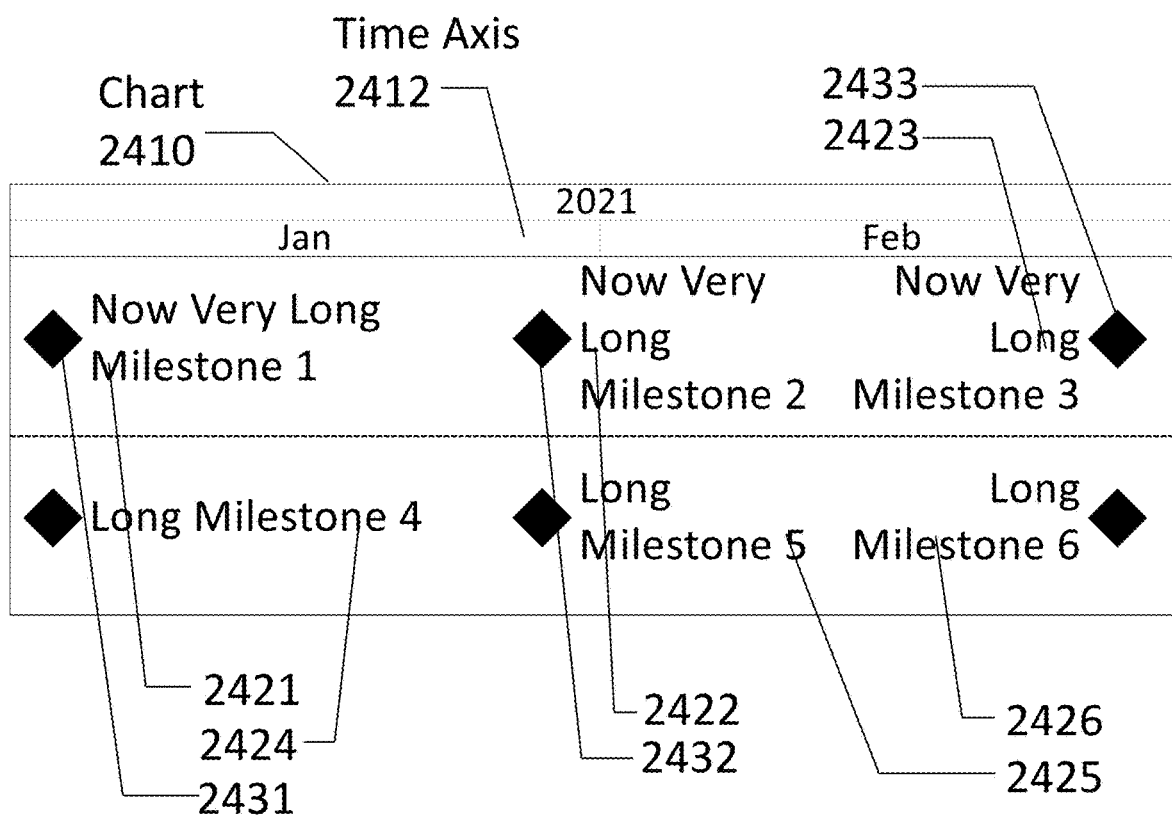

FIG. 25 shows the chart with up to three lines of Text Wrapping allowed instead of two, resolving the earlier Text Collision.

Figure 26:
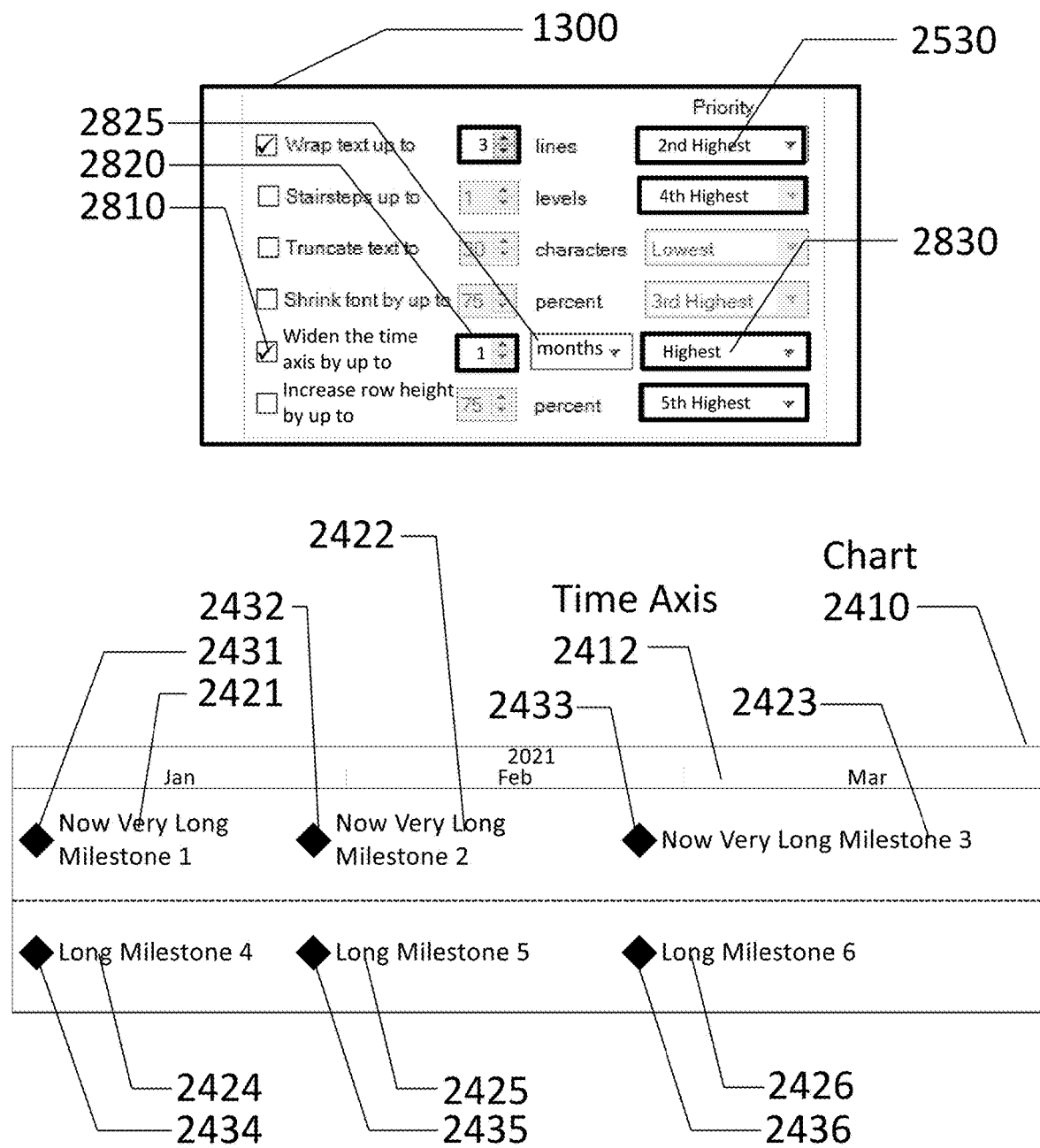

FIG. 26 shows a change to the Settings Screen, adding Time Axis Expansion as a new Escape Path with higher priority than Text Wrapping and the resulting changes to Marker Texts.

Figure 27:
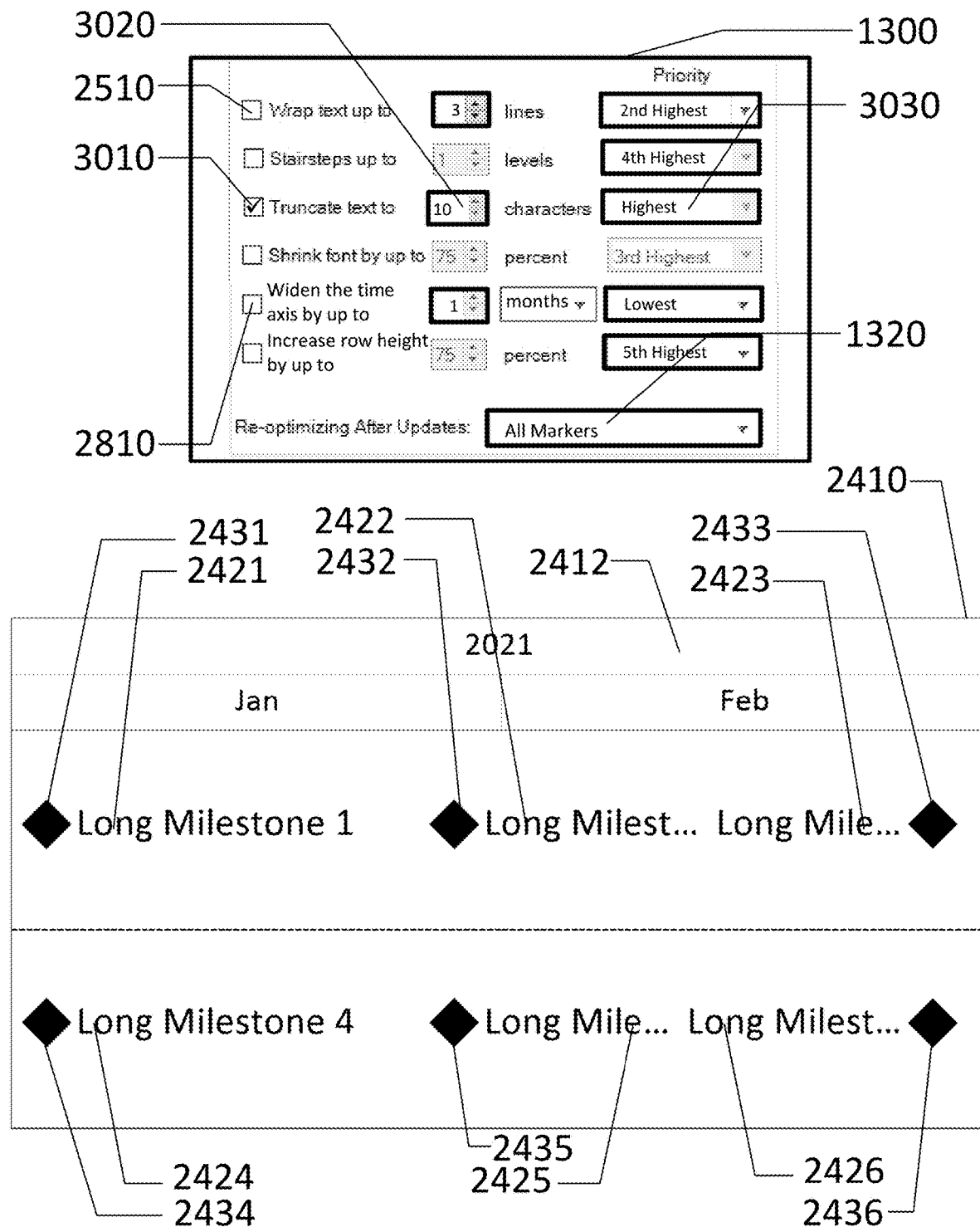

FIG. 27 shows a change to the Settings Screen making Text Truncation the only Escape Path and shows the resulting changes to Marker Texts.

Figure 28:
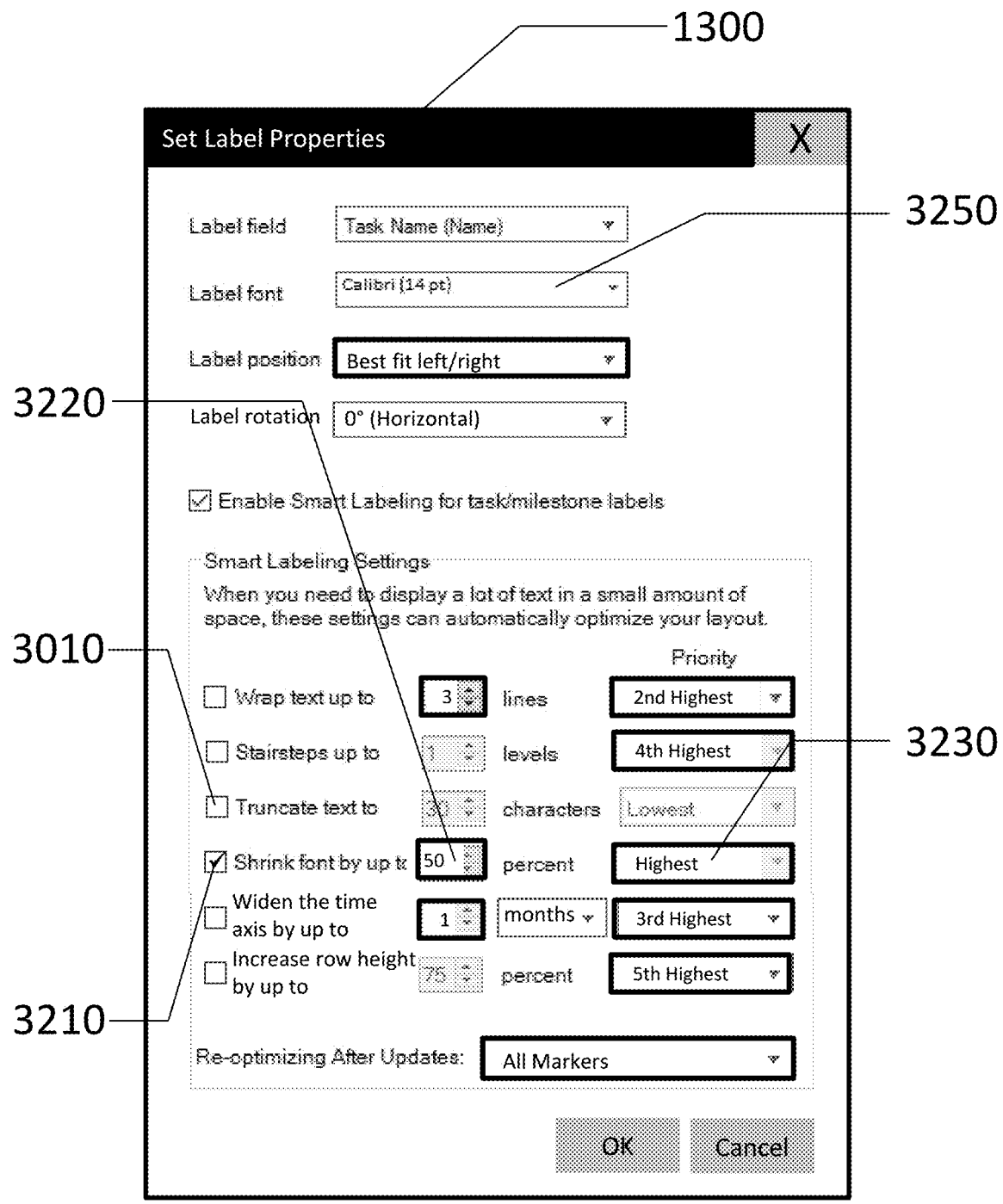

FIG. 28 shows the Settings Screen with the sole Escape Path of Font Reduction.

Figure 29:
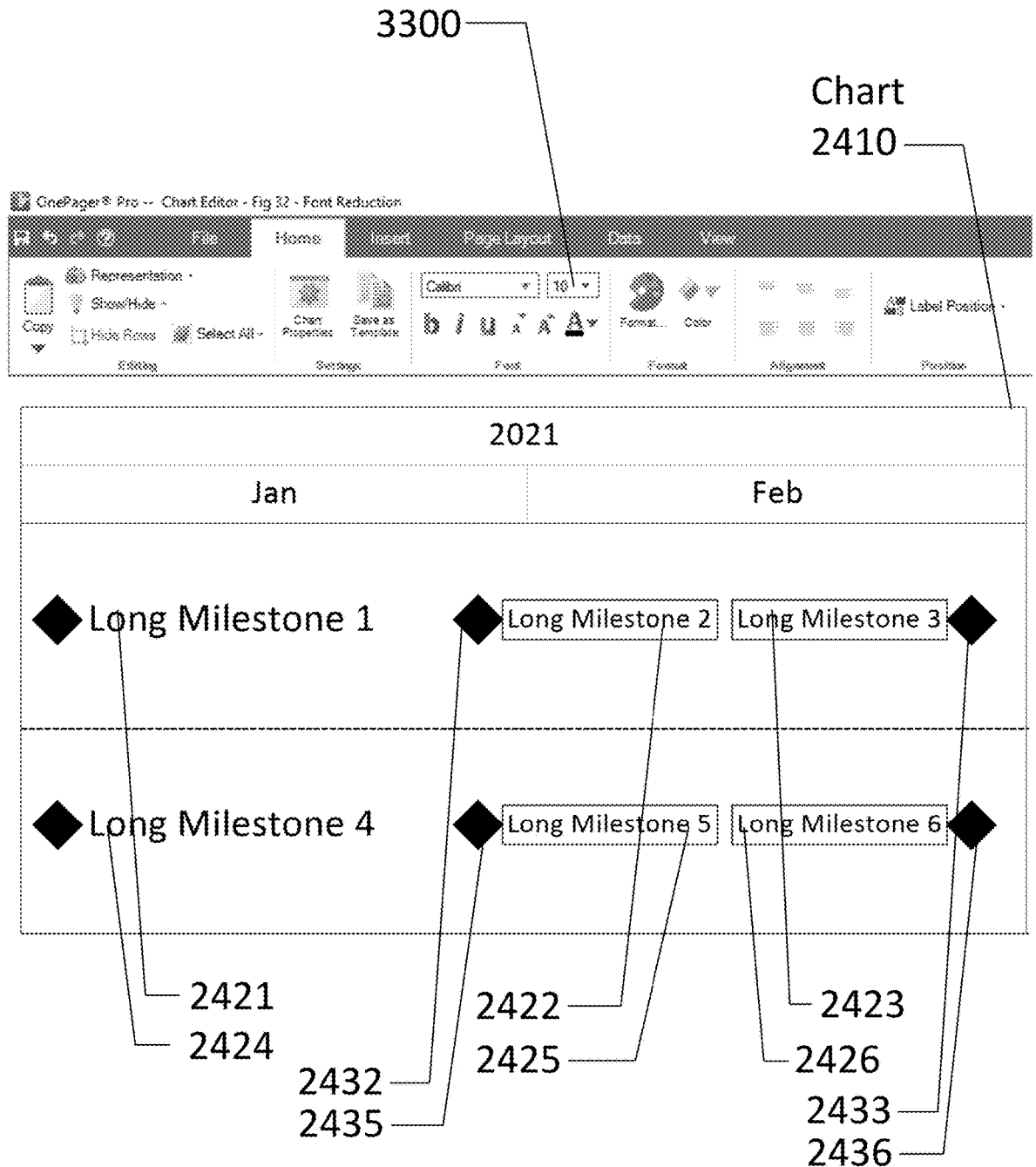

FIG. 29 shows Marker Text after the Font Reduction Escape Path is applied.

Figure 30:
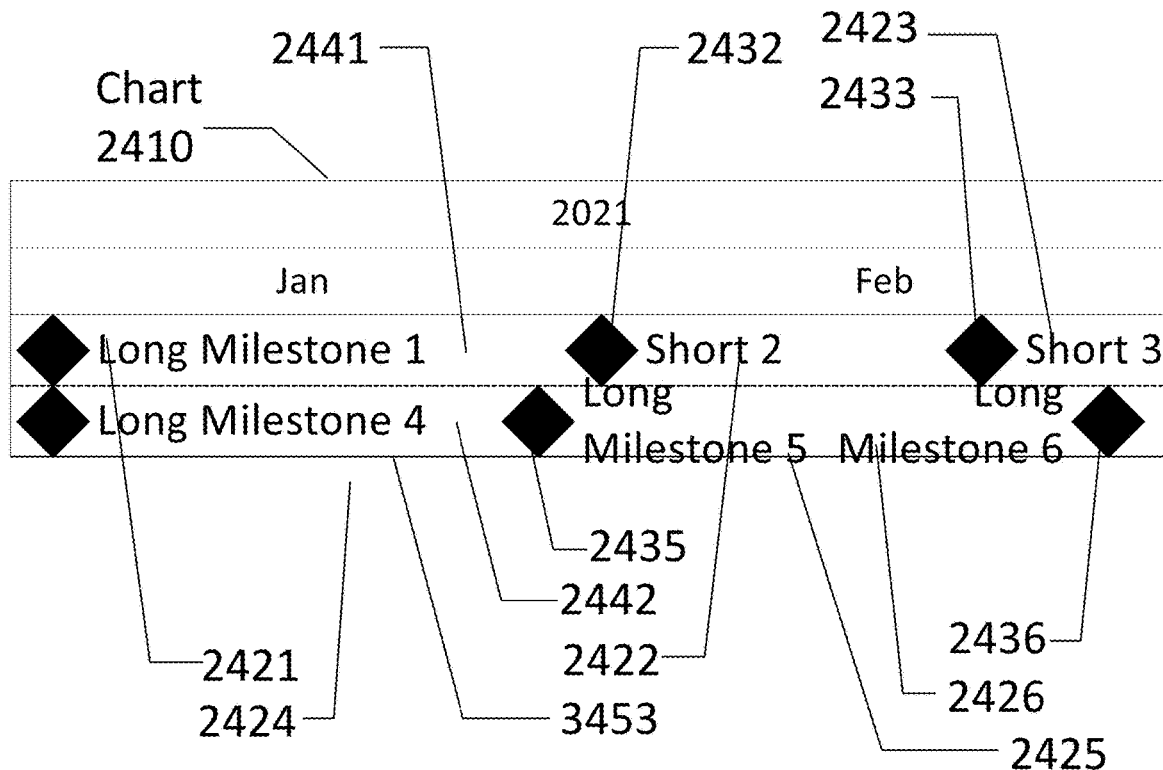

FIG. 30 shows an update to the Event Data along with a reduction in Default Row Height and shows the resulting changes to the Chart.

Figure 31:
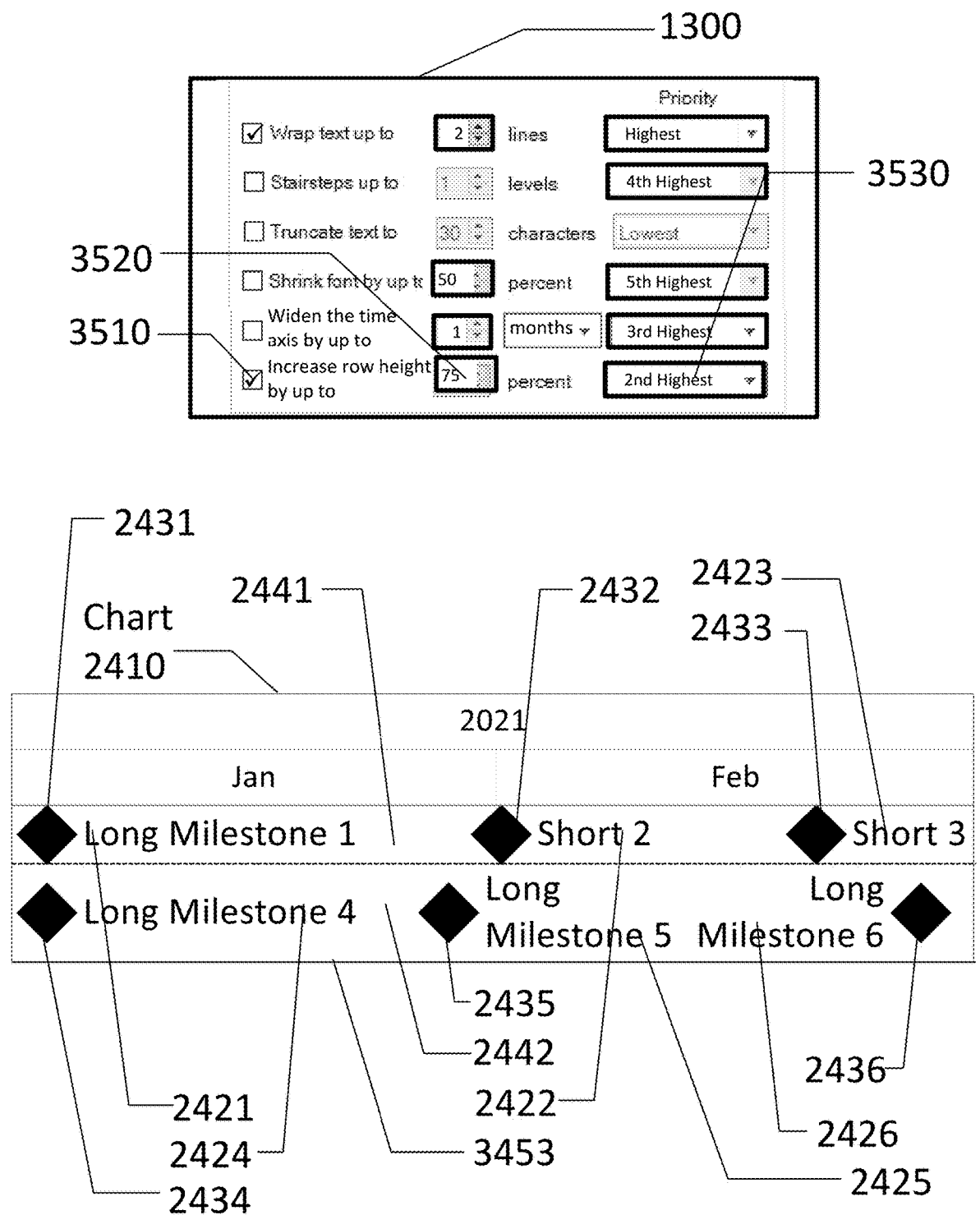

FIG. 31 shows the Settings Screen having the Escape Path changed to Row Height Expansion and also shows the result after Row Height Expansion is applied to one Row in the Chart.

FIG. 32 shows an overview of a computer-driven process that transforms Event Data into a Chart using a Stairstep Escape Path.

Figure 33:
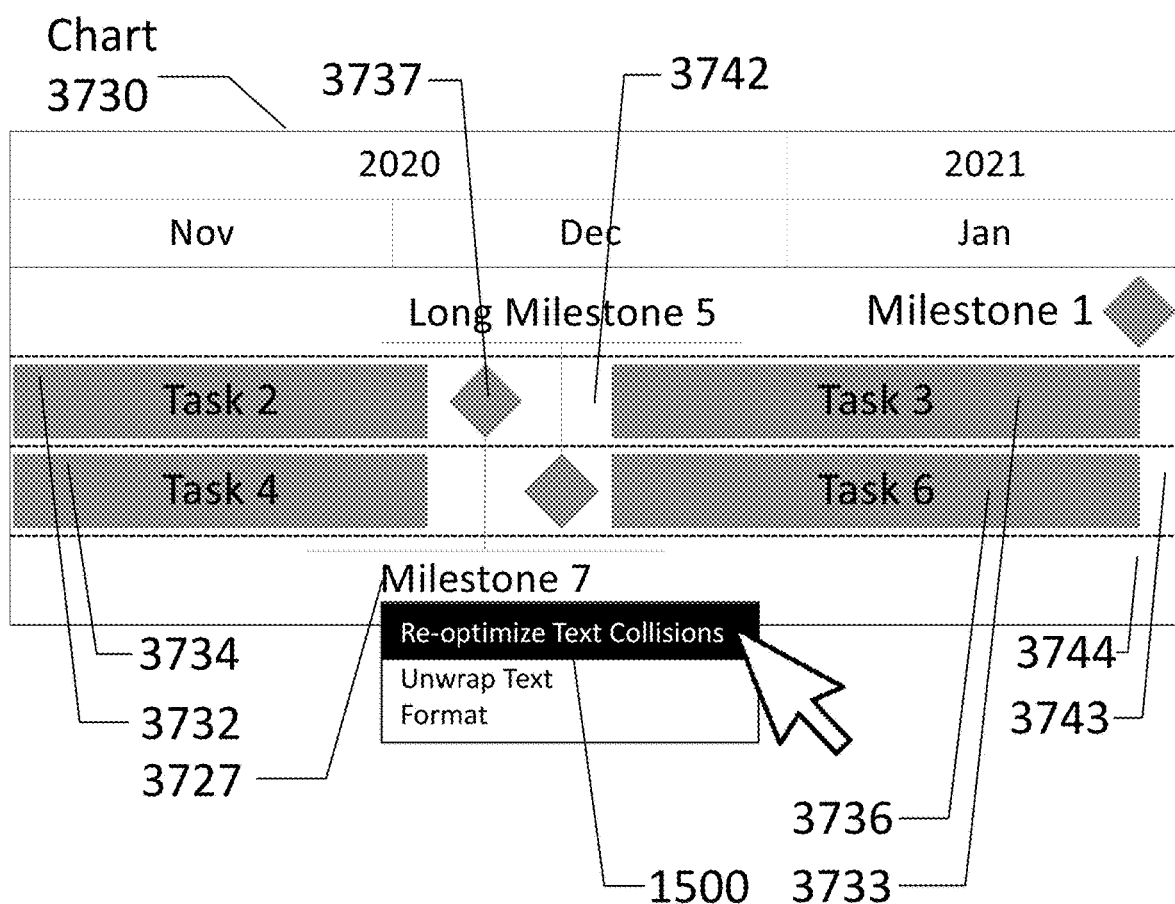

FIG. 33 shows how a user can avoid a Text Collision by using the Re-Optimize Text Collisions Option and shows how the resulting optimization creates a second Stairstep.

DETAILED DESCRIPTION OF PREFERRED EXEMPLAR EMBODIMENTS

One embodiment of the invention, which is not intended to limit the scope of the invention, is a computer system that processes Event Data from one or more project plans and renders a set of Markers and Marker Text in a Chart.

For each Marker Text, a Text Optimization Engine considers Whitespace in the Chart, as well as neighboring Marker Text, Markers, and other objects, to position Marker Text with a significant reduction in the amount of Text Collision. The user has control over allowable Marker Text Positions through a Marker Text Setting. If sufficient Whitespace is not available near a Marker, the Text Optimization Engine uses Escape Paths to either increase the amount of available Whitespace or decrease the size or aspect ratio of the Marker Text. Iteratively minimizing a Text Optimization Score reduces the number and magnitude of Text Collisions while controlling the number and Degree of Intensity of Escape Paths used, so that Marker Text is repositioned and modified to yield a reduced amount of Text Collision without making unnecessary changes to the Chart.

The user controls which Escape Paths are allowed, to what extent they can be used, and the parameters contributing to the Text Optimization Score, giving stronger weight to preferred Escape Paths or Marker Text Positions.

The user can also refresh the Chart, bringing in revised Event Data, choosing to automatically re-optimize all Marker Text, or to selectively re-optimize only Marker Text for newly-added Events or for Events whose Marker Text has changed.

GLOSSARY OF TERMS

The terms and phrases defined in this section are intended to have the meaning ascribed to them applied throughout this document including the claims unless clearly indicated otherwise explicitly or in context. Further, as applicable, the stated definitions are to apply, regardless of the word or phrase's case, to the singular and plural variations of the defined word or phrase.

Best Fit Above/Below: is a Meta-Location which enables Marker Text to be positioned to above or below a given Marker based on available Whitespace in the Chart.

Best Fit All Directions: is a Meta-Location which enables Marker Text to be positioned to Above, Below, Left, Right, or Upon a given Marker based on available Whitespace in the Chart.

Best Fit Left/Right: is a Meta-Location which enables Marker Text to be positioned to the left, right, or upon a given Marker based on available Whitespace in the Chart.

Birds-on-a-Wire Layout: a type of Timeline Layout where a Row contains multiple Milestone Markers and also one or more Task Markers underneath the Milestone Markers in the same Row.

Birds Set: a set of Markers including one Task Marker and one or more Milestone Markers intersecting this Task Marker. There can be one or more Bird Sets in any given Row.

Boundary Proximity Initialization: For Meta-Location Best Fit All Directions or Best Fit Left/Right, the Text Position for each Marker is initialized to Left if the right edge of the Marker is closer to the right Chart Boundary than the left edge is to the left Chart Boundary. It is initialized to Right if the Marker is closer to the left Chart Boundary than to the right. If Meta-Location Best Fit Above/Below, each Marker Text Position is initialized to Above if the bottom of Marker is closer to the bottom Chart Boundary than the top of the Marker is to the top Chart Boundary. It is initialized to Below if the Marker is closer to the top Chart Boundary.

Chart: a collection of Markers and Marker Text, combined with a Time Axis and one or more Rows, plus various display settings to present the occurrence of Events. A Chart can contain one or more projects.

Chart Boundary: Refers to the top, bottom, left, and right edges of the Chart.

Collision: a shortened form of the term "Text Collision".

Condition: a rule, which may be defined by a user, that evaluates Marker Text for Text Collisions, Marker Text Overflow, Escape Paths and the Degrees of Intensity associated therewith, and Marker Text Positions. When a Condition is satisfied, the invention assesses Penalty Points associated with the Condition.

Condition Penalty: the combination of a Condition and its associated Penalty Points, including any additional requirements to be met that are stated in the Penalty Points column of the Scoring Matrix.

Convergence Percentage: a percentage that determines whether additional passes of Position Optimization or Escape Path Optimization are to be performed. If the current Text Optimization Score after a pass differs from the Text Optimization Score after the previous pass by less than a Convergence Percentage of the current Text Optimization Score, no further passes are done. A reasonable value for this percentage is 10%, but it can be made smaller to achieve lower Text Optimization Score at some additional computational cost.

Data Attribute: Elements of an Event that help define the meaning of the Event. Examples of Data Attributes include, but are not limited to Start Time, Finish Time, resource assignment, percent complete, assigned phase, cost, and status.

Date Text: the rendering of either the start date/time, the finish date/time, or both, of a given Event. For example, for an event that starts on Jan. 1, 2020 and finishes on Dec. 31, 2020, the Date Text could read "1/1/2020" and "12/31/2020", respectively. The Date Text for the start date could be put in Left Position, with the Date Text for the finish date put in Right Position, though any Date Text can be positioned into any other Marker Text Position.

Default Row Height: the standard vertical height for all Rows in the Chart. The Default Row Height for individual Rows can be overridden by a Maverick, or by applying the Row Height Expansion Escape Path. Any Rows not impacted by these two types of modifications will retain their Default Row Height.

Degree of Intensity: the extent to which a given Escape Path changes properties of a given piece of Marker Text. For example, Text Wrapping of three lines is a higher Degree of Intensity than Text Wrapping of two lines. Truncating 50% of the characters in a Marker Text is a higher Degree of Intensity than truncating 10% of the characters.

Dependency: a logical relationship between two Events that governs one Event's start time or end time based on the start time or end time of another event. For example, "Event B" may not be able to commence until "Event A" is complete.

Designated Marker: the Marker in a Pair chosen to be optimized first during Position Optimization. The other Marker in the Pair may be immediately optimized after the Designated Marker or may have its optimization deferred until the next pass of Position Optimization.

Escape Path: any treatment made to minimize a Text Collision other than changing its Marker Text Position, including but not limited to Text Wrapping, Text Truncation, Font Reduction, Stairsteps, Time Axis Expansion, and Row Height Expansion.

Escape Path Anticipation: An advanced technique using one or more designated Escape Paths for determining the best Position for Marker Text during Positional Optimization. In this technique, each trial Marker Score at a trial Position is evaluated both with the Escape Path applied with each allowed Degree of Intensity, and without the Escape Path applied. The Marker Score used for that trial Position is the minimum of the Marker Scores over all these Degrees of Intensity, including the Marker Score with the Escape Path not applied. If more than one Escape Path is enabled, then the Escape Paths are applied in all combinations of their Degrees of Intensity, including turning off each Escape Path. Escape Path Anticipation speeds the process of minimizing the Text Optimization Score when Escape Paths are turned on, because it allows Positional Optimization to put Marker Text in Positions where the Escape Paths can better lower the Text Optimization Score during Escape-Path Optimization.

Escape Path Anticipation Settings: user-defined settings that govern whether one or more Escape Paths are to be considered ("anticipated") in the process of evaluating the Marker Score of a chosen Marker at each trial Position during Positional Optimization. The Escape Path Anticipation Settings are stored in Escape Path Settings.

Escape Path Parameters: user-defined settings that govern the degree to which an Escape Path is permitted to modify Marker Text. For example, a user may stipulate that Text Wrapping can only create up to two lines of text, or that Text Truncation cannot shorten any Marker Text to fewer than ten characters. Escape Path Parameters are stored in Escape Path Settings.

Escape Path Optimization: the second optimization stage of the Text Optimization Engine in which Marker Text Positions are not altered but, rather, various Degrees of Intensity of Escape Paths are applied to lower the Text Optimization Score. There may be multiple passes over all Pairs in this Escape Path Optimization phase, but a preferred implementation has only one pass.

Escape Path Priority: user-defined rankings that govern the order in which Escape Paths are tested and applied relative to each other. For example, a user may stipulate that Text Wrapping has the highest priority, meaning that Text Wrapping should be tested and applied before a secondary Escape Path like Stairsteps. The Escape Path Priority is stored in Escape Path Settings.

Escape Path Settings: the default settings for Escape Paths established either in the Template or the Chart. When defined in the Template, Escape Path Settings generate the initial Escape Paths for all Marker Text in the Chart. When Escape Path Settings are later changed in the Chart, the Escape Paths will adhere to those revised Escape Path Settings, except in the case of Mavericks.

Event: a task or milestone in a project plan.

Event Data: a non-transient data store containing one or more Events, including but not limited to project plans in the memory of a computer in an application such as Microsoft Project.

Exterior Marker: a Milestone Marker belonging to a Bird Set or any Marker belonging to a Ribbon Set that is the leftmost or rightmost Marker in that set.

First Marker: In a Pair of Markers designated (A, B), this term refers to Marker A.

Font Reduction: an Escape Path that reduces the font size for Marker Text by one or more points (1/72 inch) causing it to use less space and have fewer Text Collision Penalty Points.

Free Shape: a shape drawn in the Chart that is not associated with any specific Event or any specific Marker. Examples include, but are not limited to, free-floating text boxes containing notes, user-drawn shapes, and images.

Gantt Layout: a Chart portion where each Row has at most one Marker.

Interior Marker: a Milestone Marker belonging to a Bird Set or any Marker belonging to a Ribbon Set that is not the leftmost or rightmost Marker in that set.

Marker: the symbol employed to represent an Event in a Chart. For example, Events may be represented by colored rectangles, diamonds, or other symbols. The horizontal coordinates of a Marker relative to the Time Axis convey the Start Time and/or End Time of the Event that the Marker represents. The Marker may also contain graphical representations of other Data Attributes such as Percent Complete, which may be represented by an overlay on top of the symbol that represents Start Time and End Time of the Event.

Marker Link: a line that begins on one Marker and ends on another Marker and represents a Dependency between two Events.

Marker Score: a numeric value for one Marker that quantifies all the Penalty Points for Text Collision of its Marker Text with all other Chart objects plus the Degree of Intensity of all Escape Paths applied to its Marker Text, plus any other applicable Penalty Points assessed in accordance with other Condition Penalties. The sum of Marker Score over all Markers in the Chart is the Text Optimization Score, which is the quantity that this invention optimizes by making it smaller so as to use as much available Whitespace as is practically possible.

Marker Text: the text associated with a Marker in a Chart, including but not limited to Name Text, Date Text, and Percent Complete Text.

Marker Text Overflow: a condition met when Marker Text is positioned Upon a Marker, but the width of the Marker Text exceeds that of the Marker, causing the Marker Text to extend past the left and right edges of the Marker.

Marker Text Position: the location of Marker Text relative to its associated Marker, including but not limited to Above, Below, Left, Right, Upon, and Hidden. Above means adjacent to the Marker and vertically above it. Below means adjacent to the Marker and vertically below it. Left means adjacent to the Marker and horizontally left of it. Right means adjacent to the Marker and horizontally right of it. Upon means centered directly over the Marker. Hidden means not visible.

Marker Text Position Setting: the default setting for Marker Text Positions in either in the Template or the Chart. The Template setting generates initial Marker Text Positions for all Markers in the Chart. If the Marker Text Position Setting is later changed in the Chart, the Marker Text Positions will adhere to the revised settings, except for Mavericks.

Maverick: a Marker Text where the Marker Text Position does not follow the default Marker Text Position Setting, or where the Escape Paths for the Marker do not follow the default Escape Path Settings. For example, the default Marker Text Position might be Below, but the user might manually set a specific Marker Text to Above. Another example is if Text Wrapping is a default Escape Path, but the user manually unwraps text for a specific Marker Text.

Meta-Location: a rules-driven Marker Text Position that dynamically assigns placement of Marker Text based on availability of Whitespace near the Marker, instead of to a fixed position (e.g. Above). For example, when a Marker is near the left Chart Boundary, there is no room for Marker Text on the left of the Marker, so the Meta-Location might move the text to the right of the Marker.

Milestone Marker: Marker corresponding to an Event with a short duration, such as zero days, a few hours, or up to a day. The specific duration threshold for "short" is defined by the user.

Name Text: the rendering of the name of the Event. For example, for an event named "Project Kickoff", the Name Text would read the same, and could be positioned Below or any other Marker Text Position.

Overlap Object Table: an in-memory database table representing the decomposition of the Text Optimization Score into table rows of Pairs, each Pair contributing a Pair Score to the Text Optimization Score. Each Pair Score is the sum of a Pair-Only Marker Score from each of the members of the Pair. Each member of the Pair is either a Marker or a Chart Boundary. This table has table columns that include a table column identifying each pair, holding the Pair-Only Marker Score for each of the two Markers in the Pair, the Pair Score, the Pair Ordering Score, and the Designated Marker that will be optimized first when the Pair is selected for optimization.

Pair: a set of two Markers in the Chart or a set of a Marker and a Chart Boundary. In the case of two Markers, A and B, the Pair is denoted (A, B). Marker A is the First Marker, and Marker B is the Second Marker. In the case where the Pair consists of Marker A and a Chart Boundary, the Pair is denoted (A, Boundary).

Pair-Only Marker Score: a numeric value for one Marker that is the Penalty Points of Text Collisions of its Marker Text with the other Marker or Chart Boundary in the Pair, plus any Penalty Points associated with Degree of Intensity of its Escape Paths, plus any other Penalty Points assessed in accordance with other Condition Penalties.

Pair Ordering Score: a numeric value for each Pair derived from its Pair-Only Marker Scores and its participation in Bird Sets or Ribbon Sets. This quantity determines the order in which Pairs are processed for Position Optimization.

Pair Score: the sum of the Pair-Only Marker Scores of the two Markers in a Pair consisting of two Markers. If the Pair is a Marker and a Chart Boundary, the Pair Score is the Pair-Only Marker Score of the Marker. This Pair Score rather, than the Pair Ordering Score, determines the order in which Pairs are processed in Escape-Path Optimization.

Penalty Points: a positive or negative number contributing to the Marker Score and thus to the Text Optimization Score when a Marker Text satisfies one of the Conditions expressing categories of Text Collisions (positive), Escape Paths Degree of Intensity (positive), or undesirable (positive) or desirable (negative) Marker Text Positions. The objective of this invention is to minimize the sum of these Penalty Points over all Markers, which constitutes the Text Optimization Score.

Percent Complete: a number, ranging from zero to 100, which represents how much progress has been made completing an Event. For example, if an Event is scheduled to take four days to complete, and two days of work have been completed with two days of work remaining, the Event is computed to be 50% complete.

Percent-Complete Text: the rendering of Percent Complete data near the associated Marker. For example, for an event that is finished, the Percent Complete Text would read "100%", and could be positioned upon the Marker, or any Marker Text Position.

Position: synonym for Marker Text Position.

Position Optimization: the first stage of optimization in the Text Optimization Engine in which Marker Text Positions are changed to lower the Text Optimization Score. There is generally more than one pass over all Pairs and Markers in this phase. Position Optimization may optionally consider those Positions that may take advantage of subsequent Escape Path Optimizing by employing Escape Path Anticipation as it evaluates trial Positions of Markers.

Ribbon Inflation Percentage: a percentage by which the widths of Markers in the same Row are increased when testing to see if Markers belong to a Ribbon Set.

Ribbon Set: a set of Markers in one Row for which the horizontal Whitespace between the Markers is so small that Marker Text at Left or Right will likely collide within the set.

Row: a rectangular area on the computer screen whose width includes the entire width extent of the Time Axis and which contains zero or more Markers. Each Row constrains the vertical position of the Markers it contains to be within its borders.

Row Height: vertical height of a Row in the Chart. A Row can have a Row Height that differs from the Default Row Height.

Row Height Expansion: an Escape Path that adds more Whitespace to the Chart by increasing the Row Height of a Row containing Markers that are experiencing Text Collisions.

Ribbon Layout: a type of Timeline Layout where a Row contains multiple Markers, most often Task Markers.

Scores: collectively, the Marker Score, Pair-Only Marker Score, Pair Score, Pair Order Score, and the Text Optimization Score.

Scoring Matrix: a matrix defining how Penalty Points are assessed when Marker Text meets Conditions for Text Collisions, desirable/undesirable Text Positions, application of Degrees of Intensity of Escape Paths, and other Penalties that need to be reduced to make the Chart more legible. Note that some Penalty Points are negative values that express a preference for certain Text Positions in identified circumstances such as Bird Sets and Ribbon Sets. Each association of Penalty Points with a Condition in the Scoring Matrix is called a Condition Penalty.

Second Marker: In a Pair of Markers designated (A, B), this term refers to Marker B.

Stairsteps: an Escape Path that moves Marker Text to a nearby Row that has sufficient Whitespace. Stairsteps may or may not include a line that connects the Marker Text and the Marker. Even though a Stairstep moves Marker Text, it is not considered part of Position Optimization because it does not move Marker Text to a Position that is adjacent to the Marker.

Task Marker: a type of Marker corresponding to an Event with a duration, typically in excess of a day. For example, a Task Marker might depict three days, six months, or ten years.

Template: a collection of settings, including but not limited to a Marker Text Position Setting and Escape Path Settings, that when combined with Event Data define the initial formatting of Marker Text in a Chart.

Text Collision: a condition when Marker Text fully or partially intersects another object in the Chart. Examples include but are not limited to Text-to-Boundary Collisions, Text-to-Free Shape Collisions, Text-to-Link Collisions, Text-to-Marker Collisions, and Text-to-Text Collisions.

Text Optimization Score: a numeric value for the entire Chart that quantifies the number and severity of Text Collisions and the Degrees of Intensity of Escape Paths plus any Penalty Points for any other Conditions satisfied. This quantity is the sum over all Markers of the Marker Score. It is also the sum over all Pairs of each Pair's Pair Score. The objective of the current invention is to improve Chart legibility by minimizing the Text Optimization Score, which tends to put Marker Text into available Whitespace.

Text-to-Boundary Collision: occurs when the Marker Text of a Marker extends past the Chart Boundary in one or more directions. For example, Marker Text may bleed into the Time Axis, or may extend past the right-hand edge of the Chart.

Text-to-Free Shape Collision: occurs when the Marker Text of a Marker overlaps wholly or partially with a nearby Free Shape. For example, Marker Text may be obscured by an image.

Text-to-Link Collision: occurs when the Marker Text of a Marker overlaps fully or partially with a nearby Marker Link.

Text-to-Marker Collision: occurs when the Marker Text of a Marker overlaps fully or partially with a Marker that is not associated with the same Event.

Text-to-Text Collision: occurs when the Marker Text of one Marker overlaps fully or partially with Marker Text from a different Marker.

Text Truncation: an Escape Path that removes one or more characters from the end of Marker Text and appends an ellipsis (" . . . ") at the end to reduce the horizontal space required.

Text Wrapping: an Escape Path that adds one or more line breaks to Marker Text so that the text appears on multiple lines instead of one, thereby changing the aspect ratio of the area occupied by the Marker Text. Text Wrapping minimizes the amount of horizontal space utilized by Marker Text, and therefore attempts to evenly divide Marker Text across multiple lines so that each line of text has a comparable number of characters and so that one line of text is not significantly wider than the others.

Time Axis: a graphical representation of a time scale showing one or more units of time that serve as reference points for the progression of Events in a project plan.

Time Axis Expansion: an Escape Path that adds more horizontal Whitespace to the Chart by adding time to left or right-hand edges of the Time Axis. For example, if Marker Text needs more space, and the Time Axis currently begins in June, Time Axis Expansion could add two months (April) to increase the amount of Whitespace on the left-hand side of the Chart.

Timeline Layout: a portion of a Chart where a Row contains two or more Markers.

Whitespace: any Chart area within the Chart Boundaries that is devoid of Marker Text, Markers, Marker Links, and Free Shapes and is thus available for repositioning colliding Marker Text into non-colliding Positions.

DESCRIPTION AND OPERATION

Figure 1:
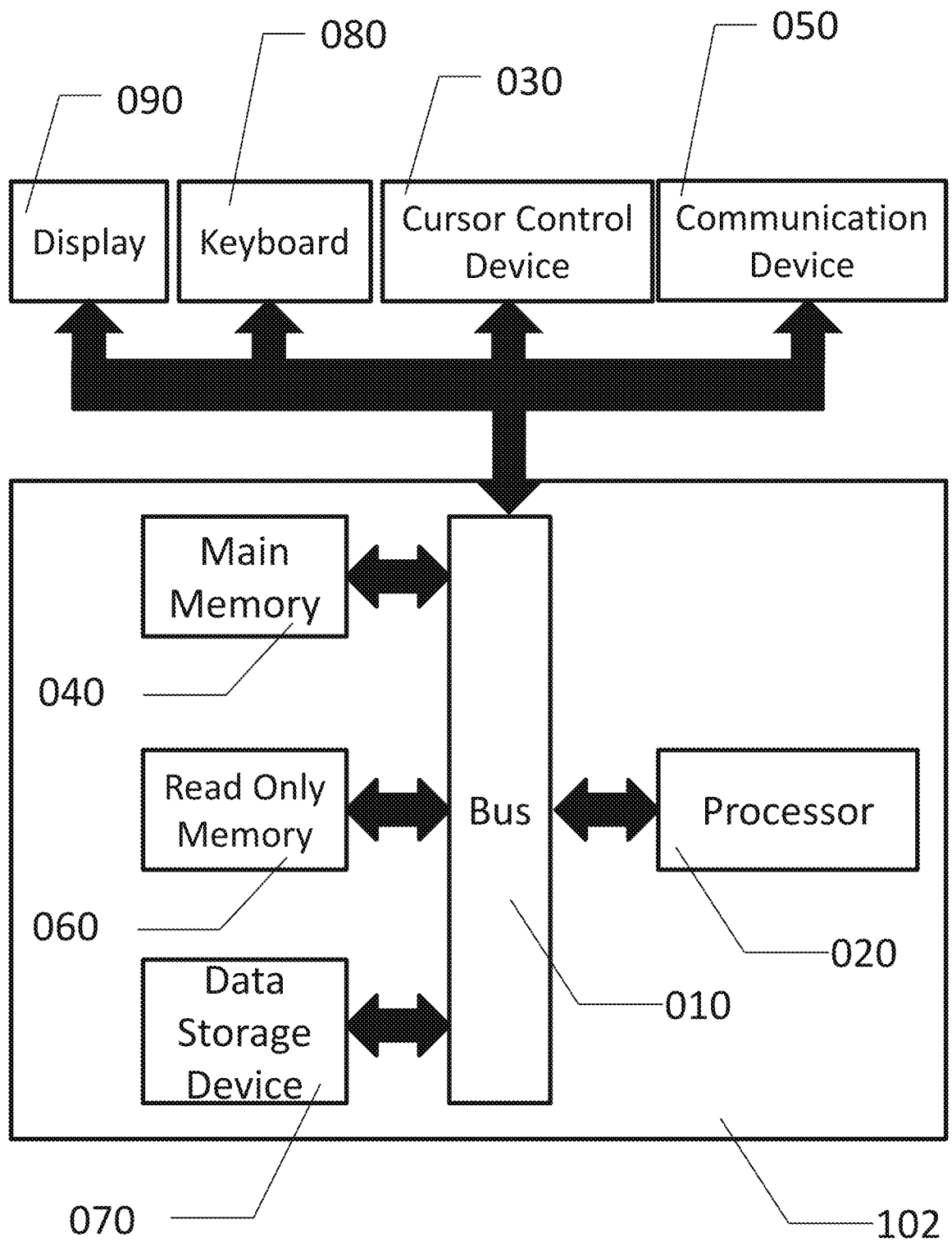
FIG. 1 shows a typical computer system, consisting of main memory, read only memory, a data storage device, and a processor connected to a bus. The computer is peripherally connected to a display, a keyboard, a cursor control device such as a mouse, and a communication device.

FIG. 1 illustrates an exemplary computer system 102 upon which embodiments of the invention may be implemented. Computer system 102 comprises a bus or other communication means 010 for communicating information, and a processing means such as processor 020 coupled with the bus 010 for processing information. Computer system 102 further comprises a random-access memory (RAM) or other dynamically-generated storage device 040 (referred to as main memory), coupled to bus 010 for storing information and instructions to be executed by processor 020. Main memory 040 also may be used for storing temporary variables or other intermediate information during execution of instructions by processor 020. Computer system 102 also comprises a read only memory (ROM) and/or other static storage device 060 coupled to bus 010 for storing static information and instructions for processor 020.

A non-transitory data storage device 070 such as a magnetic disk drive, an optical disk drive and/or flash drive storage may also be coupled to computer system 102 for storing information and instructions. Computer system 102 can also be coupled via bus 010 to a display device 090, such as an LED Monitor or smart-phone screen, for displaying information to an end user. Typically, an alphanumeric input device (keyboard) 080, including alphanumeric and other keys, may be coupled to bus 010 for communicating information and/or command selections to processor 020. Another type of user input device is cursor control device 030, such as a mouse, a trackball, touch screen, or cursor direction keys for communicating direction information and command selections to processor 020 and for controlling cursor movement on display 090. A communication device 050 is also typically coupled to bus 010. The communication device 050 may include a network interface card, a modem, a wireless transceiver or other well-known interface device for purposes of providing a communication link to support a local or wide area network. For example, the computer system 102 may be coupled to the internet or other network. It is appreciated that a lesser or more equipped computer system than the example described above may be desirable for certain implementations. Therefore, the configuration of computer system 102 will vary from implementation to implementation depending upon numerous factors, such as price constraints, performance requirements, security restrictions, technological improvements, and/or other circumstances. Further, computing machines as used herein include tablet computers, smart phones and other similar devices wherein the input and display devices may, for instance, both comprise a touch screen.

It should be noted that, while the operations described herein may be performed under the control of a programmed processor, such as processor 020, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

One embodiment of the invention is illustrated in FIG. 2. A set of Event Data 200 is present on a computer 102 implementing the invention, which transforms the Event Data 200 into a Chart 204 that is displayed on the screen of the computer 102.

An example Marker "Summary Task" 251 corresponds to an Event 211, which is a Task in a project plan. In this example, the Event 211 is a Task entitled "Summary Task," and its Marker 251 is positioned horizontally along a Time Axis 208 according to its Start Time of Nov. 25, 2020 and its Finish Time of Mar. 19, 2021. Because of the difference between the Start Time and Finish Time, the Marker 251 is rendered as a Task instead of as a Milestone. The Marker 251 has a Marker Text 241 reading "Summary Task" that is positioned Below it.

Another example Marker "Milestone B" 253 corresponds to an Event 213, which is a Milestone in a project plan. In this example, the Event 213 is a Milestone entitled "Milestone B," and its Marker 253 is positioned horizontally along the Time Axis 208 according to its Start Time of Jan. 12, 2021 and its Finish Time of Jan. 12, 2021. Because the Start Time and Finish Time are equal, the Marker 253 is rendered as a Milestone instead of as a Task. The Marker 253 has a Marker Text 243 reading "Milestone C" that is positioned Above it.

Both the Marker 251 and the Marker 253 are vertically aligned into a single Row 230 because their respective Events 211 and 213 share the same Row ID of "1".

Figure 3:
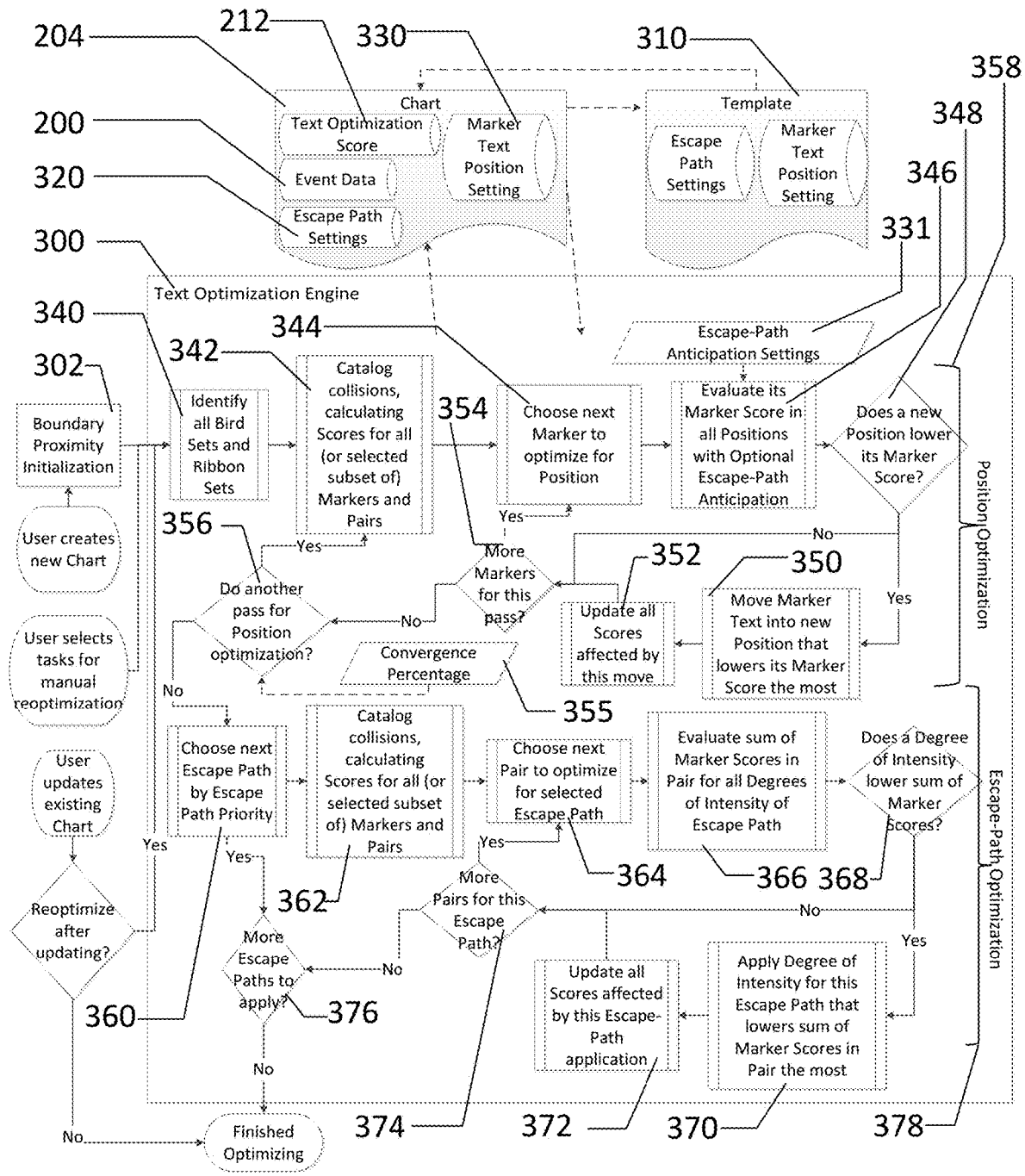
FIG. 3 shows the process for rendering Marker Text using a Text Optimization Engine that uses a Marker Text Position Setting, Escape Path Settings, and a Text Optimization Score.

FIG. 3 illustrates the detailed method for creating the new Chart 204 from the Event Data 200 and optimally rendering the Marker Text 241-245. One or more sets of Event Data 200, in this case, project plans, are loaded into the non-transient storage of the computer 102. A Configuration Form 1200 is shown in FIG. 10 and specifies a Template 310 for the Chart 204. The Template 310 contains the initial settings, presented on a Settings Screen 1300 as illustrated in FIG. 13, for all Marker Text 241-245 in the Chart 204. The template 310 also contains other settings for the Chart 204 such as those pertaining to all Markers 251-255, the Time Axis 208, and the Row 230, among other elements. The user may choose from a set of available Templates 310 by clicking on a Change Template Button 1210, and after selecting the desired Template 310, the choice will be displayed on the Configuration Form 1200. In this example, the Template 310 will generate the Chart 204 so that it has a Birds-on-a-Wire Layout and has its Marker Text Position Setting 330 set to Best Fit All Directions, which is reflected in a Marker Text Position Setting Control 1310 of the Settings Screen 1300.

FIGS. 4 and 5 depict a Scoring Matrix that the Text Optimization Engine 300 employs to calculate a Text Optimization Score. Each line of the Scoring Matrix contains a Condition Penalty consisting of a Condition and Penalty Points. The latter can be a formula to compute Penalty Points from measured overlap of a Marker Text with other objects. For Conditions that describe Escape Paths, the penalty can be a formula that expresses the Degree of Intensity of the applied Escape Path. The user can adjust the Penalty Points for each Condition to change the behavior of the Text Optimization Engine 300. For example, the user could be using Best Fit Left/Right as the Marker Position Setting 330 but wants to avoid Upon position unless absolutely necessary. The user can change the Scoring Matrix so that the Condition "Movement of Marker Text into Upon position" 502 in FIG. 5 has Penalty Points of +20 instead of +2, which makes Upon much less favorable than the Left and Right positions.

A Text Optimization Engine 300 iteratively changes Marker Text Positions and applies Escape Paths to minimize the Text Optimization Score. The Text Optimization Score for a Chart is the sum of the Marker Scores over all Markers in the Chart, where each Marker Score is computed by cataloging all Text Collisions of the Marker Text, evaluating each of the Conditions in FIGS. 4 and 5, and summing all the Penalty Points for the Conditions that apply. Another useful way to construct the Text Optimization Score is to consider all Pairs of Markers. In this alternative, the Text Optimization Score is the sum of Pair Scores over all Pairs in the Chart. The Pair Score is the sum of the Pair-Only Marker Scores of the two Markers in a Pair, where a Pair-Only Marker Score is the Marker Score limited to Text Collisions within the Pair.

FIG. 8 shows three exemplary Markers 700, 702, and 704 with their associated Marker Text 701, 703, and 705 to describe how the Text Optimization Engine 300 catalogs and calculates (342, 362) Marker Scores, Pair-Only Marker Scores, Pair Scores, and Text Optimization Score, collectively Scores. None of these shapes belong to a Bird Set or Ribbon Set, which makes this elucidation simpler because none of the Penalty Points in FIG. 5 apply here. Beginning with the Marker Score computation, table 710 shows how a Marker Score table column 718 for each of the three Markers is the sum of values in Penalty Points table column for three Condition Penalties described in FIG. 4, namely a Text-To-Marker Collision 712, a Text-to-Text Collision 714, and a Text-to-Boundary Collision 716. Marker 700 is represented by table row 720 in table 710 and has a Text-to-Marker Collision of its Marker Text 701 with Marker 702 that overlaps 70% of the area of its Marker Text 701, thus yielding 70 Penalty Points. Marker 700 also has a Text-to-Text Collision of its Marker Text 701 with the Marker Text 703 of Marker 702 that overlaps 10% of the area of Marker Text 701, yielding 10 Penalty Points. Thus Marker 700 has a Marker Score of 70+10=80. Marker 704 is represented by table row 722 and has a Text-To-Boundary Collision that comprises 40% of the area of its Marker Text 705 and thus has a 40 Penalty Points and a Marker Score of 40. Marker 702 is represented by table row 724 and has three Text Collisions: a Text-to-Marker Collision of its Marker Text 703 with Marker 700 yielding 20 Penalty Points, a second Text-to-Marker Collision of its Marker Text 703 with Marker 704 yielding 15 Penalty Points, and a Text-to-Text Collision between its Marker Text 703 and Marker Text 701 yielding a 10 Penalty Points. Thus Marker 702 has a Marker Score of 20+15+10=45. Summing the three values in the Marker Score table column 718 yields the Text Optimization Score of 80+40+45=165.

It is advantageous to decompose the Total Optimization Score 212 into a sum of Pair Scores over all Pairs that have Text Collisions, as shown in the Overlap Object Table 730. The table 730 has a table column 732 that identifies each Pair by its First Marker and Second Marker with the notation (First Marker, Second Marker), two table columns 734 and 736 containing Pair-Only Marker Scores for the First Marker and Second Marker respectively, and a table column 738 that contains the Pair Score, which is the sum of the two Pair-Only Marker Scores. In addition, the Overlap Object Table 730 has two table columns that determine the sequence of Markers optimized by the Text Optimization Engine 300 during Position Optimization 358 in the selection process 344 of FIG. 3. Table column 752 contains the Pair Ordering Score 652 that is computed 648 as shown in FIG. 7. Pairs are selected 344 for optimization in decreasing order of the numbers in the Pair Ordering Score table column 752. The order in which Markers are selected 344 for Position Optimization 358 within each Pair is determined by the table column 750 that identifies the Designated Marker 650, which is either the First Marker or the Second Marker in the Pair. Within each Pair, the Marker selected 344 first for optimization is the Designated Marker. The Marker in the Pair is identified as the Designated Marker is computed by process 646 that is shown in FIG. 7. During the first pass of Position Optimization 358, it is customary to optimize only the Designated Marker in each Pair, but during the second and subsequent passes, both the Designated Marker and the other Marker in the Pair are optimized.

In the Overlap Object Table 730, a table row 742 represents all Text Collisions between the Pair (Marker 700, Marker 702) that is also denoted as the (A, C) Pair and their associated Marker Text 701 and 703. Because Marker Text 701 has Collisions only with Marker 702 and its Marker Text 703, the Pair-Only Marker Score of 80 is the same as the Marker Score of 80 in table row 720 of table 710. On the other hand, Marker Text 703 has Collisions with both Marker 700 (and its Marker Text 701) and Marker 704. The Pair-Only Marker Score for Marker 702 in table row 742 includes only its Collision with Marker 700 and its Marker Text 701. Thus, the Pair-Only Marker Score for Marker 702 is 30, which is the sum of 20 Penalty Points from its Text-to-Marker Collision of Marker Text 703 with Marker 700 plus 10 Penalty Points from its Text-to-Text Collision of Marker Text 703 with Marker Text 701. For this Pair, the Designated Marker in table column 750 is identified as the First Marker 700 because this First Marker has a Pair-Only Marker Score of 80, which is greater than the Pair-Only Marker Score of 30 for the Second Marker 702. The Pair Ordering Score 752 of 80 for this Pair is just the Pair-Only Marker Score of the Designated Marker since there are no Bird Sets or Ribbon Sets.

Next, the Pair (Marker 704, Marker 702) Pair, which is also denoted as the (B, C) Pair is shown in table row 742, where the 15 Penalty Points come from the overlap of Marker Text 703 with Marker 704. In this Pair, there is no Collision of Marker Text 705 with Marker 702 or with Marker Text 703, so the Pair-Only Marker Score of Marker 704 is zero. The Designated Marker 750 for this Pair is the Second Marker 702 because its Pair-Only Marker Score of 15 is greater than the Pair-Only Marker Score of zero for the First Marker 704. The Pair Ordering Score 752 for this Pair is 15, which is just the Pair-Only Marker Score of the Designated Marker 702.

Finally, table row 744 represents the Pair expressing the Text-to-Boundary Collision of Marker Text 705 of Marker 704 with the Chart Boundary 261 and is thus denoted (B, Boundary). In such a Text-to-Boundary Collision, the Chart Boundary is formally a member of the Pair but is never identified as the Designated Marker in table column 750. Hence the Designated Marker for this Pair is the First Marker 704, and the Pair Ordering Score of 40 in table column 752 is the Pair-Only Marker Score of this Designated Marker. Summing the three values in the Pair Score table column 738 yields the Text Optimization Score of 110+15+40=165, the same number that summing over Markers yielded in table 710.

This invention begins optimization in FIG. 3 with a Chart that has initial Text Positions of all Markers based upon the Marker Text Position Setting 330 and using Boundary Proximity Initialization 302. When this setting is Best Fit All Directions or Best Fit Left/Right, the Text Position for each Marker is initialized to Left if the Marker is closer to the right Chart Boundary and to Right if the Marker is closer to the left Chart Boundary. Likewise, if the setting 330 is Best Fit Above/Below, each Marker Text Position is initialized to Above if the Marker is closer to the bottom Chart Boundary and to Below if it is closer to the top Chart Boundary.

This invention then proceeds in FIG. 3 to minimize the Text Optimization Score 212 and thereby maximize the use of available Whitespace and improve legibility. As it does this optimization, it first changes the Text Positions of Markers in two or more passes of Position Optimization 358. It then tries to further lower the Text Optimization Score 212 by adjusting non-Positional properties of Marker Text (e.g. wrapping), properties of Rows (e.g. Row Height), and properties of the Chart (e.g. extending the Time Axis) through Escape Path Optimization 378. As Position Optimization begins in FIG. 3, the Text Optimization Engine 300 first identifies 340 all Bird Sets and Ribbon Sets, which it will use to assign special Penalty Points for preferred and non-preferred Positions as shown in FIG. 5 and also to determine 648 the Pair Ordering Score 652 for sequencing Pairs it selects 344 for optimizing Marker Text Positions.

FIG. 6 shows that this Bird Set and Ribbon Set identification step 340 proceeds one Row at a time through the Chart, iterating 600 over all Pairs of Markers that are both in the Row. For each such Pair, it tests 602 whether one Marker in the Pair is a Task Marker and the other is a Milestone Marker. If so, these Markers are then geometrically intersected. Specifically, each Marker is represented by the smallest rectangle that bounds its shape. Geometric intersection is carried out between such rectangles, and the area of the resulting intersection rectangle is measured. If the area of this intersection rectangle is non-zero 604, both Markers are added to Bird Sets 612, consisting of sets of one or more Milestone Markers identified by the one Task Marker which they all intersect. An example Bird Set in FIG. 2 is identified by Task Marker 251 and its four intersecting Milestone Markers 252, 253, 254, and 255. If a Bird Set identified by the Task Marker in the Pair does not exist yet in the Bird Sets 612, it is added 608. The Milestone Marker in the Pair is then added 610 to the Bird Set associated with the Task Marker.

If the two Markers in the Pair are not a Task Marker and a Milestone Marker, the method looks instead to see if they are in a Ribbon Set by intersecting them after inflating the widths of their Markers by the Ribbon Inflation Percentage 618. If the two width-inflated Markers intersect 614, they are added to a list 619 of Pairs that belong to an as-yet-undetermined Ribbon Set. After all Pairs in all Rows have been processed in this way, this list of Pairs 619 is examined to associate any Pairs that share common Markers as being in the same Ribbon Set. This determines the Ribbon Set of each Marker that is in a Ribbon Set. The collection of all such Ribbon Sets is then stored in the Ribbon Sets 622 data collection. In FIG. 19, one example of a Ribbon Set is the set of adjacent Markers 2134, 2135, and 2136 in Row 2142. Another Ribbon Set in FIG. 19 is the set of adjacent Markers 2132 and 2133 in Row 2141. Marker 2131 is not in this latter Ribbon Set because it does not intersect Marker 2132 after inflation of the width of both Markers by a Ribbon Inflation Percentage 618 of 20%. Markers in a Ribbon Set need not be Task Bars even though that is a common case. Any set of Markers in the same Row with small enough horizontal spacing to have non-zero overlap when their widths are expanded by Ribbon Inflation Percentage 618 constitutes a Ribbon Set.

Returning to FIG. 3 after step 340 is completed, the Text Optimization Engine 300 then computes 342 the Scores and the Overlap Object Table 730 using all Condition Penalties in FIGS. 4 and 5 to quantify the Penalty Points for overlap of Marker Text with other objects in the Chart. As part of computing Scores, it computes the Pair Ordering Score for each Pair and chooses which Marker in each Pair to optimize first, identifying it as the Designated Marker of the Pair. These computations are shown in FIG. 7 and use the Bird Sets 612 and Ribbon Sets 622 previously computed. Iterating over all Rows and over all Pairs in each Row, if the method detects Collisions 642 between a Marker Text and the other Marker or other Marker Text within a Pair, it computes and stores 644 the Pair-Only Marker Score and Pair Score in the Overlap Object Table 730, as was demonstrated in the example of FIG. 8. It then chooses 646 the Designated Marker in the Pair, giving priority to Markers in Bird Sets 612 and Ribbon Sets 622. In this process, the highest priority goes to Exterior (leftmost or rightmost) Markers in a Bird Set or in a Ribbon Set, then to Interior Markers in a Bird Set or Ribbon Set, and finally to the Marker with the higher Pair-Only Marker Score. It stores this Designated Marker 650 in the Overlap Object Table 730 in table column 750 shown in FIG. 8. Finally, it computes and stores 648 in the Overlap Object Table 730 a Pair Ordering Score 652 that prioritizes Pairs with large values of Pair-Only Marker Score of their Designated Marker and to Pairs participating in Bird Sets 612 and Ribbon Sets 622, especially if the Designated Marker in the set is an Exterior Marker.

After computing Scores, the Bird Set, and the Ribbon Set, FIG. 3 shows how the Text Optimization Engine 300 makes a first pass of Position Optimization 358 through all Pairs in the Overlap Object Table 730, changing the Marker Text Position of Markers in each Pair whenever such a change reduces the Text Optimization Score. It proceeds one Row at a time from the top to the bottom of the Chart. Within each Row, it chooses 344 the Pair with at least one Marker in the Row and with has non-zero Pair Score that has the largest Pair Ordering Score 652. It then chooses the Designated Marker 650 of that Pair as the Marker whose Position it will test in trial Positions to see if it can find a Position that lowers the Text Optimization Score 212.

For the Designated Marker 650, the Text Optimization Engine 300 computes 346 its Marker Score in trial Marker Text Positions, temporarily repositioning its Marker Text to all such eligible Marker Text Positions (e.g., for Best Fit All Directions, the Positions Above, Below, Left, Right, or Upon). Each trial repositioning may accrue additional positive or negative Penalty Points from the positional Conditions such as "Marker Text into Left Position" in the Scoring Matrix of FIG. 5. Furthermore, the evaluation of the Marker Score at each trial repositioning may include an advanced computation called Escape Path Anticipation that helps Position Optimization converge more quickly. When an Escape Path is specified by the Escape Path Anticipation Settings 331, the Marker Score is evaluated at a trial Position both with the Escape Path applied with each allowed Degree of Intensity, and without the Escape Path applied. The Marker Score used for determining whether to move the Marker to the trial Position 348 is then the minimum of the Marker Scores over all these Escape Path Degrees of Intensity, including the Marker Score without applying the Escape Path. Note that the Escape Path is not actually applied to the Marker at this stage of optimization. All that happens at this stage is that the Marker may move to a new Position. But the move to the new Position is done with quantitative anticipation of what a subsequent application of the Escape Path during Escape Path Optimization 378 can do to lower the Marker Score in that Position.

Following such computation 346 of Marker Score in each trial Position, the Text Optimization Engine determines 348 whether any trial Position lowers the Marker Score from its current value. If so, it immediately moves 350 the Marker Text to the Marker Text Position that has the lowest Marker Score and recomputes 352 Scores and table rows in the Overlap Object Table 730 that are affected by this move. If no position lowers the Marker Score, it does not move that Marker Text and then optionally evaluates trial Positions for the other Marker in the Pair, moving that Marker Text if a trial Position lowers its Marker Score. In the second and any subsequent passes of Position Optimization 358, it always optimizes the other Marker in the Pair after it has optimized the Designated Marker. When finished optimizing the Pair, it then selects the next Pair with at least one Marker in the Row, positive Pair Score, and highest Pair Ordering Score 652. It repeats this process of changing Marker Text to trial Positions to test whether this lowers the Marker Score of the Designated Marker, and optionally the other Marker in the Pair. After going through all Pairs in the Row, it proceeds to the next Row and changes those Markers in Pairs with non-zero Pair Score that it has not yet tested.

If there are still Text Collisions after this first pass over all Pairs as shown in FIG. 3, the Text Optimization Engine then makes 356 a second pass over all Pairs with positive Pair Scores, selecting 344 Pairs and Designated Markers and repositioning 350 their Marker Text whenever such a move lowers their Marker Score. The Text Optimization Engine 300 may execute more passes of Position Optimization 358 until successive passes lower the Text Optimization Score by a relative amount that is less than Convergence Percentage 355.

If there are still Text Collisions after these passes of Position Optimization 358, the Text Optimization Engine 300 then does one or more passes of Escape Path Optimization 378, starting 360 with the Escape Path with the highest Escape Path Priority and cataloging all remaining Collisions and their associated Scores 362. It is not necessary to calculate Pair Order Score or Designated Marker for Escape-Path Optimization because Pairs are optimized in decreasing order of the Pair Score rather than Pair Order Score for Escape Path Optimization. The Text Optimization Engine iterates (364, 374) over all Pairs with positive Pair Score and evaluates 366 the sum of the two Marker Scores in the Pair in trials over the allowed range of Degree of Intensity. It starts with the Pair having the highest Pair Score. If an Escape Path Degree of Intensity lowers 368 the sum of the two Marker Scores for the Pair, the Degree of Intensity having the minimal sum of the two Marker Scores is applied 370 and all affected Scores and table rows in the Overlap Object Table 730 are updated 372. The Text Optimization Engine 300 then chooses (364, 374) the next Pair with the highest Pair Score and optimizes the sum of the two Marker Scores in this Pair in the same fashion. After testing and applying the highest-priority Escape Path to all Pairs, the next-highest-priority Escape Path is considered 360 if the Text Optimization Score still exceeds zero. The same process of iterating (364, 374) over all Pairs in the Overlap Object Table 730 in decreasing order of Pair Score and applying 370 the Degree of Intensity that maximally lowers the sum of Marker Scores in the Pair is repeated for this second Escape Path. If there are still Text Collisions, the Text Optimization Engine continues to apply Escape Paths in priority order until either there are no Text Collisions or there are no further Escape Paths to consider 376. Additional passes over the entire Escape-Path Optimization process 378 can be executed until the Text Optimization Score decreases by less than Convergence Percentage 355 on successive passes. This is done by iterating over all Markers by repeating steps 360, 362, 364, 366, 368, 370, 372, 374 and 376 until the change in Total Optimization Score between successive passes drops below Convergence Percentage 355.

To give a concrete example of how these general steps minimize the Text Collision Score, the top version 900 in FIG. 9 shows the initial state of the Chart 204 of FIG. 2 before any of the optimizations in FIG. 3 are carried out. The first Pair (Marker 255, Marker 251) to be optimized consists of "Milestone D" Marker 255 with its Marker Text 245 and the "Summary Task" Marker 251 with its Marker Text 241. For this Pair, Marker 255 has the larger Pair-Only Marker Score because its Marker Text 245 completely overlaps Marker 251, yielding a Penalty Score of 100. So, Marker 255 it is the Designated Marker. This Pair has the highest Pair Order Score of all Pairs because its Designated Marker 255 is an Exterior Marker in a Bird Set, which boosts the Pair Order Score because of process 648 in FIG. 7. Marker Text 245 tests with zero Marker Score for Position trials in the Above and Below trial positions because there is adequate Whitespace in both locations. Positioning Upon or Left would cause a Text-to-Marker Collision with Marker 251, while Right would incur Penalty Points from a Text-to-Boundary Collision with the right-hand Chart Boundary 261. Thus, the Text Optimization Engine 300 moves Marker Text 245 to Above, lowering its Marker Score to zero.

The next Pair in order of Pair Order Score is (Marker 254, Marker 251). Of these two Markers, Marker 254 has the higher Pair-Only Marker Score because its Marker Text 244 ("Milestone C") completely overlaps (100 Penalty Points) Marker 251 and also partially overlaps Marker Text 241 ("Summary Task") for another 60 Penalty Points, giving it a Pair-Only Marker Score of 100+60=160. On the other hand, Marker Text 241 incurs only 60 Penalty Points for its intersection with Marker Text 244, 20 Penalty Points for its intersection with Marker 254, and −10 Penalty Points for Condition Penalty 516 in FIG. 5, giving it a Pair-Only Marker Score of 60+20−10=70. Since 160>70, Marker 254 is the Designated Marker. The fact that Marker 254 is an Interior Marker in a Bird Set further advantages Marker 254 as the Designated Marker regardless of its Pair-Only Marker Score. Designated Marker Text 244 has no Text Collisions when tested in trial Positions Above and Below and also benefits from Condition Penalties 512 and 514 in FIG. 5 to get a Marker Score of −10. It incurs large Text Collision Penalty Points for Left and Right Positions, so the Text Optimization Engine 300 positions it Above.

The Pair (Marker 252, Marker 253) with Milestone Text 242 "Milestone A" and Milestone Text 243 "Milestone B" is the final Pair to be optimized in the first pass. Marker 252 has a smaller Pair-Only Marker Score than Marker 253 because Marker Text 243 has both a Text-to-Text Collision (20 Penalty Points) with Marker Text 242 and a Text-to-Marker Collision (30 Penalty Points) with Marker 252, yielding a Pair-Only Marker Score of 50. Marker Text 242 has only a Text-to-Text Collision (20 Penalty Points) with Marker Text 242 and gets −10 Penalty Points from 508 in FIG. 5, yielding a Pair-Only Marker Score of 10. Since 50>10, Marker 253 "Milestone B" is the Designated Marker. For Marker Text 243, trial Marker Text Positions of Above or Below reduce its Marker Score to −10 for the same reasons as Marker 254, whereas Right and Upon incur large Text Collision Penalty Points, so the Above position is selected.

Since all Pairs with Text Collisions have now been acted upon, this completes the first pass of Position Optimization 358. The configuration of the Markers and their Marker Texts at the end of this first pass is shown in FIG. 9 as version 902 of the Chart 204. Note that the legibility is much improved over the non-optimized version 900, but that there is a remaining Text-to-Marker Collision of Marker Text 241 "Summary Task" with Marker 254, amounting to 20 Penalty Points. Hence the second pass of Position Optimization 358 commences with only this Pair to optimize. The only Marker in this Pair with positive Pair-Only Marker Score is Marker 251 since its Text Marker 241 intersects with Marker 254, whereas the Text Marker 244 of Marker 254 in the Above Position has no intersections with any objects. Thus Marker 251 is the Designated Marker. Testing trial Positions of its Marker Text 241 at Above causes a Text-to-Text Collision with Marker Text 244. Positioning Left causes a Text-to-Text Collision with Marker Text 242, while Right causes a Text-to-Boundary Collision with the right-hand Chart Boundary 261. Therefore, the Marker Text Position for Marker Text 241 that lowers its Marker Score the most (to zero) is Below, and that is where the Text Optimization Engine 300 moves it. With this move, the second pass of Position Optimization 358 in FIG. 3 is complete. The Text Optimization Score 212 has been reduced to −30, and there are no remaining Text Collisions so Escape-Path Optimization 378 in FIG. 3 is skipped because it can make no further reductions in the Text Optimization Score 212. The final result is shown in FIG. 2, where the invention has minimized Text Collisions and Text Optimization Score, maximized use of Whitespace, and achieved good legibility.

FIG. 12 depicts a process by which the user may create Mavericks. Here, the user employs the Cursor Control Device 030 to first select Marker Texts 242 and 241, and with those items selected, clicking on a Change Text Position Button 1400 that sets the Marker Text Positions for both Marker Text 242 and 241 from their default Best Fit All Directions as originally specified in the Marker Text Position Setting 330 and displayed on the Marker Text Position Setting Control 1310, to the Above Position instead. This action by the user immediately causes one Text-to-Text Collision between the Marker Texts 242 and 243, and a second Text-to-Text Collision between the Marker Texts 241 and 244.

FIG. 13 depicts a process by which the user can mitigate these two Text-to-Text Collisions by using the Cursor Control Device 030 to select all four colliding Marker Texts 241, 242, 243, and 244 and then right-clicking on any one of the four Marker Texts 241, 242, 243, and 244, and choosing a Re-Optimize Text Collisions Option 1500. This re-instantiates the Text Optimization Engine 300, but only for the Marker Texts 241, 242, 243, and 244 that are currently involved in Collisions. Because "Milestone A" Marker Text 242 and "Summary Task" Marker Text 241 are Mavericks due to manual manipulation by the end user, their Marker Text Positions are not allowed to be modified by the Text Optimization Engine. Rather, the non-Maverick "Milestone B" Marker Text 243 and the non-Maverick "Milestone C" Marker Text 244 are relocated to new Positions at Below, which minimizes the Text Optimization Score and eliminates the Text Collisions. The Marker Texts 243 and 244 can relocate their Marker Text Positions because they are still adhering to the default Marker Text Position Setting 330 of Best Fit All Directions. However, the other Marker Texts 241 and 242 are Mavericks, and therefore their Marker Text Positions no longer follow the default Marker Text Position Setting 330 of Best Fit All Directions; instead their Marker Text Positions are manually locked at Above.

Mavericks not only hold their Marker Text Positions when being manually re-optimized using the Re-Optimize Text Collisions Option 1500, but they also retain their Marker Text Positions when the Marker Text Position Setting 330 for the whole Chart is adjusted. The user can use the Cursor Control Device 030 to change the Marker Text Position Setting Control 1310 from the current Best Fit All Directions to Below. The result of this change is depicted in FIG. 14 and shows that when the Marker Text Position Setting 330 of the Chart 204 changes to Below, all non-Maverick Marker Texts 243, 244, and 245 have their Marker Text Positions changed to Below. In this example, the previous Best Fit All Directions for Marker Texts 243, 244, and 245 had resulted in positions of Below, Below, and Above, respectively, so with this change, the Position of Marker Texts 243 and 244 did not change since they were already in the Below Position. However, Marker Text 245 did relocate from Above to Below as a result of this change. All non-Maverick Marker Texts 243, 244, and 245 are eligible for further relocations, if the user changes the Marker Text Position Setting Control 1310. On the other hand, no changes that the user makes to the default Marker Text Position Setting Control 1310 will impact the position of Marker Texts 242 and 241, as these are Mavericks whose Marker Text Positions were established by the Change Text Position Button 1400 instead. Maverick changes enacted by the Change Text Position Button 1400 will always take precedence over default Marker Text Position Setting 330 defined by the Marker Text Position Setting Control 1310.

FIG. 15 depicts a process by which the user can remove Maverick status from the Marker Texts 241 and 242. Using the Cursor Control Device 030, the user selects Marker Texts 241 and 242, then clicks a Format Button 1700. A Format Screen 1710 appears with a Text Position Control 1720 that reflects the current Maverick Marker Text Position of Above for the two Marker Texts 241 and 242. When the user uses the Cursor Control Device 030 to click a Use Defaults Button 1730, the Text Position Control 1720 switches from the Maverick Marker Text Position of Above to the default Marker Text Position Setting 330 of Below.

Now that Marker Texts 241 and 242 have lost their Maverick state and their Marker Text Positions have defaulted to Below, FIG. 16 shows the result, with all Marker Texts 241-245 positioned Below. This causes Text-to-Text Collisions between Marker Texts 242 and 243, and also between Marker Texts 241 and 244. To mitigate these Text Collisions automatically, the user can use the Cursor Control Device 030 to change the value of the Marker Text Position Setting Control 1310 and thereby change the Marker Text Position Setting 330 from Below to the Meta-Location of Best Fit Above/Below.

FIG. 17 shows the result the optimization that immediately follows this change of the Marker Text Position Setting 330 to Best Fit Above/Below. The "Milestone A" Marker Text 242 is positioned by the Text Optimization Engine 300 to be Below as it lowers the Text Optimization Score by lowering the Marker Score of Marker 252 back to zero. Previously, when the Marker Text Position Setting 330 was set to Best Fit All Directions, this same Marker Text 242 had been positioned to the left of Marker 252, as illustrated in the earlier FIG. 2. However, the new Marker Text Position Setting 330 of Best Fit Above/Below does not allow for Left, Right, or Upon positions, so the Marker Text 242 can only be positioned Above or Below.

With "Milestone A" Marker Text 242 positioned Below, the neighboring "Milestone B" Marker Text 243 is moved during the first pass of Position Optimization 358 to Above because this move lowers the Text Optimization Score by avoiding a Text-to-Text Collision with Marker Text 242. The "Milestone C" Marker Text 244 and "Summary Task" Marker Text 241 have a Text-to-Text Collision. In order to lower the Text Optimization Score by avoiding this Collision, the Text Optimization Engine 300 during Position Optimization 358 moves Marker Text 241 to Below and Marker Text 244 to Above. The "Milestone D" Marker Text 245 is not in close horizontal proximity to any of the other Marker Texts 241-244 and thus is involved in no Text Collisions. Thus, the Text Optimization Engine 300 does not even attempt to optimize it since Marker 255 is not present in the Overlap Object Table 730 at all.

FIG. 18 illustrates a detailed method for creating another new Chart 2010 from a new set of Event Data 2000 and optimally rendering the Marker Texts 2021-2025. One or more sets of Event Data 2000, in this case, project plans, are loaded into the non-transient storage of the computer 102. The user selects a different Template 2005 from the Configuration Form 1200. This different Template 2005 contains an initial Marker Text Position Setting 2006 for all Marker Texts 2021-2025 of Best Fit Left/Right, plus other settings pertaining to a set of Markers 2031-2035, a set of Rows 2041-2045, among other elements of the Chart 2010. This template 2005 stipulates that all of the Markers 2031-2035 should be placed into their own individual Rows 2041-2045, thereby creating the 1:1 relationship between Markers and Rows that defines a Gantt Layout. Because the Marker Text Position Setting 2006 is Best Fit Left/Right, the permissible Marker Text Positions for Marker Texts 2021-2025 are Left, Right, and Upon relative to their respective Markers 2031-2035.

The "Summary Task" Marker 2031 spans most of the width of the Chart 2010. Therefore, there is limited Whitespace to the left or right of the Marker 2031 to locate the Marker Text 2021. In fact, positioning the Marker Text 2021 at Left or Right Position would create Text-to-Boundary Collisions with 90 Penalty Points for Left and 60 Penalty Points for Right. Therefore, the Text Optimization Engine 300 places the Marker Text 2021 in the Upon Position, which costs 2 Penalty Points because of the "move to Upon" Condition Penalty 502 in FIG. 5. Despite the 2 Penalty Points for the Upon Position, the move to Upon is the change that yields the lowest Marker Score for Marker 2031. This example shows that the lowest Marker Score and thus the lowest Text Optimization Score is sometimes greater than zero and that improved legibility can happen when the minimal Text Optimization Score exceeds zero.

The "Task A" Marker 2032 appears very close to the left-hand Chart Boundary 2051. Therefore, the remaining Positions with low Penalty Points under the Best Fit Left/Right Meta-Location are Upon and Right. In this case, because there is ample Whitespace to the right of the Marker 2032, the Text Optimization Engine 300 selects Right as the preferred placement. While placing the Marker Text 2022 in the Upon Position leads to no Collisions with other Markers, Marker Texts and Chart Boundaries, it would add 2 Penalty Points because of Condition Penalty 502 in FIG. 5. This means the Text Optimization Engine 300 favors an outside placement into Whitespace when possible, as it often improves readability. For example, the black text of the Marker Text 2022 contrasts better with the white background of the Row 2042 than with the gray background of the Marker 2032.

The "Task B" Marker 2033 is approximately horizontally centered in the Chart 2010, however there is slightly more Whitespace to the right of the Marker 2033 than to the left. Therefore, to use the most-ample Whitespace available, the Boundary Proximity Initialization 302 of Marker Text prior to the operation of the Text Optimization Engine 300 places the Marker Text 2023 in the Right position. Marker 2033 is not involved in any Text Collisions, but if it were and if there were a choice during Position Optimization 358 in FIG. 3 between putting Marker Text 2023 at Left or Right Position, the Condition Penalty 504 in FIG. 5 would favor putting it in Right Position, all other Penalty Points being the same between Left and Right.

Boundary Proximity Initialization 302 puts Marker Texts 2024 and 2025 in Left Position because there is more space between them and the left Chart Boundary 2051 than the right Chart Boundary 2052. Neither Marker Texts 2024 nor 2025 are involved in Text Collisions, so neither appears in the Overlap Object Table 730, and thus neither is acted upon by the Text Optimization Engine 300. If it were involved in a Text Collision, Marker Text 2024 could be put into Upon Position to avoid the Collision, but the Text-Optimization Engine 300 would add 2 Penalty Points for Upon Position because of Condition Penalty 502 in FIG. 5.

FIG. 19 illustrates a detailed method for creating another new Chart 2110 from a new set of Event Data 2100 and optimally rendering the Marker Texts 2121-2127. One or more sets of Event Data 2100, in this case, project plans, are loaded into the non-transient storage of the computer 102. The user selects a different Template 2105 from the Configuration Form 1200. This different Template 2105 contains an initial Marker Text Position Setting 2106 for all Marker Texts 2121-2127 of Best Fit Left/Right, plus other settings pertaining to a set of Markers 2131-2137, a set of Rows 2141-2143, among other elements of the Chart 2110. This template 2005 stipulates a Ribbon Layout for each of the Rows 2141-2143, resulting in the Row 2141 containing the Markers 2131-2133, the Row 2142 containing the Markers 2134-2136, and the Row 2143 containing the Marker 2137. Because the Marker Text Position Setting 2106 is Best Fit Left/Right, the permissible Positions for Marker Texts 2121-2127 are Left, Right, and Upon.

Version 2160 of Chart 2110 in FIG. 20 shows the configuration of the Text Collisions after Marker Text Locations have been initialized using Boundary Proximity Initialization 302 but before optimization starts. As the Text Optimization Engine 300 begins its first pass in the first Row 2141, the Pair (Marker 2132, Marker 2133)=("Task B", "Task C") is optimized first, with Designated Marker 2133 and its Marker Text 2123 receiving the first optimization. Before optimization, both Marker Text 2122 and 2133 are in the Left Position, which causes 100 Penalty Points of Text-to-Marker Collision for Marker 2133. The Text Optimization Engine 300 puts Text 2123 in the Right Position, since the Upon Position would cost 2 Penalty Points under Condition Penalty 502 and since Condition Penalty 510 subtracts 10 Points in the Right Position because Markers 2133 and 2133 constitute a Ribbon Set. Marker Text 2122 is already in its lowest Marker Score Position at Left and will not be moved.

The Pair (Marker 2131 "Task A", Left Boundary) is already optimized by having Marker Text 2121 at Right. It has a Pair Score of zero because there are no Collisions between Marker Text 2121 and the Left Boundary 2151. So, the Text Optimization Engine 300 takes no action on this Pair. Even though Marker Texts 2121 and 2122 share the Whitespace between the Markers 2131 and 2132, the Text Optimization Engine 300 calculates that there is enough Whitespace to accommodate both Marker Texts 2121 and 2122 in shared Whitespace (i.e. there are no Penalty Points because there is no Text-to-Text Collision between them) without increasing the Text Optimization Score 2112.

As the Engine 300 proceeds to the second Row 2142 in version 2160 in FIG. 20, it finds Marker Text 2124 ("Task E"), 2125 ("Task F"), and 2126 ("Task G") all in Right Position, causing illegibility because of Collisions that result in three Pairs having non-zero Pair Scores:

1. Pair (2134, 2135) has Pair Score of 15+85+85=185, a Designated Marker 2134, and Pair Order Score 185+1000=1185, with the bonus of 1000 from computation 648 in FIG. 7 because Marker 2134 is an Exterior Marker in a Ribbon Set. The Pair Score is the sum of the Pair-Only Marker Score of 100 for Marker 2134, whose Marker Text 2124 has 15% overlap with Marker 2135 and 85% overlap with Marker Text 2125, plus the Pair-Only Marker Score of 85 for Marker 2135, whose Marker Text 2135 has 85% overlap with Marker Text 2124.
2. Pair (2134, 2136) has Pair Score 80, Designated Marker 2134, and Pair Order Score 80+1000=1080. The only Collision in this Pair is 80% overlap of Marker Text 2124 with Marker 2136.
3. Pair (2135, 2136) has Pair Score 100, Designated Marker 2135, and Pair Order Score 100+100=200, with the bonus of 100 from computation 648 in FIG. 7 because Marker 2135 is an Interior Marker in a Ribbon Set.

Pair (2134, 2135) has highest priority because its Pair Order Score of 1190 is largest, so its Designated Marker 2134 is evaluated in trial Positions Left and Upon to see if either of these lowers its Marker Score from its current value of 100 in Right Position. Left Position lowers its Marker Score to −10 because it has no Text Collisions there and because Condition Penalty 508 in FIG. 5 contributes −10. On the other hand, the Upon Position lowers its Marker Score to 2 under Condition Penalty 504. The Text Optimization Engine thus moves Marker Text 2124 to Left Position and recomputes all Scores affected by this move.

This move of Marker Text 2124 means that there is only one remaining Pair with Text Collisions, Pair (2135, 2136), which has Designated Marker 2135. Marker 2135 currently has Marker Score of 100 in the Right Position because of the 100% overlap of Marker Text 2125 with Marker 2136. Evaluating moves of Marker Text 2125 to Left and Upon Positions, Left yields a Marker Score of 100 because of 100% overlap with Marker 2134, and Upon yields a Marker Score of 82=40+40+2 because of a 40% overlap with Marker 2134, a 40% overlap with Marker 2136 and 2 Penalty Points under Condition Penalty 502 in FIG. 5. Condition Penalty 402 for Marker Text Overflow does not produce Penalty Points here because Marker 2135 is an Interior Ribbon Marker. Thus, the lower Marker Score is for the move to Upon Position, which is what happens. The Text Optimization Engine 300 leaves "Task G" Marker Text 2126 and "Task H" Marker Text 2127 in Right Position because neither has any Text Collisions. The result is the optimized Text Marker Positions shown in Chart 2110 of FIG. 19.

The Best Fit Left/Right Meta-Location does not completely eliminate Text Collisions in Chart 2110 because Marker Text 2125 still intersects the two neighboring Markers 2134 and 2136. To fix this, the user can employ the Cursor Control Device 030 on the Marker Text Position Setting Control 1310, changing its value from Best Fit Left/Right to Best Fit All Directions, and in so doing also changing the Marker Text Position Setting 2106 to the same.

Version 2200 of Chart 2110 in FIG. 20 reflects how re-optimization of Chart 2110 adjusts to the additional degrees of freedom provided to it by the switch to Best Fit All Directions. The "Task F" Marker Text 2125 which contributed three Penalties in Chart 2110 has the new flexibility to move to Above or Below now that Best Fit All Directions is in place. Marker 2137 imposes significant Penalty Points to the Below position, but there is attractive Whitespace available at Above. Therefore, Marker Text 2125 moves to Above and in so doing moves out of its original Row 2142 and into adjacent Row 2141. The Text Optimization Engine 300 permits Marker Text to move into neighboring Rows to avoid a Collision, provided Whitespace is available.

With the relocation of the "Task F" Marker Text 2125, the "Task A" Marker Text 2121 also needs to change its location to Upon, and this happens in the second pass 356 of Position Optimization 358. If the "Task A" Marker Text 2121 had remained positioned at Right, it would have been involved in a Text-to-Text Collision with the "Task F" Marker Text 2125 that is now sharing a portion of the same Whitespace.

The detailed steps by which the Text Optimization Engine 300 transforms version 2160 of Chart 2110 into version 2200 using the processes of FIG. 3 are as follows. When the optimization starts, the only Collisions are in Row 2142 and involve two Pairs of Markers:

1. Pair (2134, 2135) has Pair Score of 42, a Designated Marker 2135, and Pair Order Score 42+100=142, with the bonus of 100 because Marker 2135 is an Interior Marker in a Ribbon Set. The Pair Score is the Pair-Only Marker Score of 42 for Marker 2135, whose Marker Text 2125 has 40% overlap with Marker 2134 and also incurs 2 Penalty Points because of Condition Penalty 502.
2. Pair (2135, 2136) also has Pair Score 42, Designated Marker 2135, and Pair Order Score 142 for the same reasons.

It does not matter which Pair the Text Optimization Engine 300 chooses in 344 in FIG. 3 because either choice will cause Marker 2135 to be optimized by testing its Marker Text 2125 in two previously-untested trial locations Above and Below, along with the previously-allowed Positions of Upon, Left, and Right. The current Marker Score in the Upon Position is 40+40+2=82 from the discussion above. The Marker Scores at Left and Right are both 100 because Marker Text 2125 overlaps 100% with Marker 2134 or Marker 2136 in Left or Right Positions respectively. The Below trial yields a Marker Score of 40=50−10, because Marker Text 2125 in Below Position suffers 50% overlap with Marker 2137 but gets a 10 Penalty Point reduction because of Condition Penalty 514. However, the Marker Score in Above Position is −5 Penalty Points, because "Task F" overlaps "Task A" by only about 5% of the area of the "Task F" text rectangle and it gets a 10 Penalty Point reduction because of Condition Penalty 512. The result of this set of trial Marker Scores for Marker 2135 is that the Text Optimization Engine 300 moves Marker Text 2125 into Above Position, as is shown in Chart 2110. Updating the Scores in process 352 now produces a new Text Collision for Pair (2131, 2135) with Pair Score of 5−5=0, because Marker 2131 has a Pair-Only Marker Score of 5, and Marker 2135 has a Pair-Only Marker Score of −5. Because this Pair has a Text Collision, it will be immediately optimized; the Text Collision will not be eliminated until the second pass of Position Optimization 358 because Marker 2135 will be chosen as the Designated Marker since it is part of a Ribbon Set. Optimizing Marker 2135 will do no good because no Position for Marker Text 2125 will lower its Marker Score. However, during the second pass of Position Optimization 358 as discussed for FIG. 3, it is guaranteed that the Text Optimization Engine 350 will optimize both the Designated Marker and the other Marker in each Pair with Text Collisions. During this second pass, Marker 2131 is optimized, and the Position trials for Marker Text 2121 find that the Marker Score of 2 for the Upon Position is lower than the current Marker Score of 5 in the Right Position, and that the other three Positions (Above, Left, and Below) are much worse because of Collisions with the Time Axis, the Chart Boundary, and Marker Text 2135 respectively. The Text Optimization Engine 300 thus moves Marker Text 2121 to Upon, yielding version 2200 shown in FIG. 20.

The Text Optimization Engine 300 also works to avoid Collisions when an existing Chart 2110 is updated. FIG. 21 shows some changes to the existing Event Data 2100 with Marker Text Position Setting remaining at Best Fit All Directions. Specifically, the Finish Time for "Task C" has been delayed from May 10, 2021 to May 24, 2021. A new Event "Milestone J" has been added to the Event Data 2100, with a Start Time and Finish Time of Feb. 2, 2021. When the user employs the Cursor Control Device 030 to click on a Chart Refresh Button 2300, the Chart 2110 is refreshed in accordance with any changes to the Event Data 2100. In FIG. 21, the Marker 2133 is now wider than it originally was in FIG. 20 because its Finish Time is now later. In addition, a new Marker 2338 appears in FIG. 21 for the first time. The widening of Marker 2133 and the addition of Marker 2338 cause new Text Collisions.

Whenever the Text Optimization Engine 300 minimizes Text Collisions caused by an update, it uses a mode setting to determine how the user wishes to perform re-optimization after updates. A Reoptimize After Update Control 1320 on the Settings Screen in FIG. 11 gives the user three choices. The first choice is the mode "Do Not Re-optimize", which will direct the Text Optimization Engine 300 not to re-optimize Marker Texts at all after an update.

The second mode choice is to re-optimize "Only Changed Markers", which will direct the Text Optimization Engine 300 to minimize Collisions only for Markers 2338 and 2133 in this example, since they are the only Markers that changed as a result of the update. However, this mode does not re-optimize Marker 2137, whose Event Data did not change, even though its Marker Text in Right Position now collides with the newly added Marker 2338.

The third mode choice is to re-optimize "All Markers", and its results are depicted in the updated version 2310 of the Chart 2110 displayed in FIG. 21. Here, all Marker Text 2121-2127 and 2328 are eligible to be re-optimized. The "Task C" Marker Text 2123 no longer has sufficient Whitespace to the right, and now has a Text-to-Boundary Collision with the right-hand Chart Boundary 2152. The Text Optimization Engine 300 cannot move it to Left because of 100 Penalty Points in a Text-to-Marker Collision with Marker 2132. Position Below yields 0 Penalty Points, and Position Upon yields 2 Penalty Points under Condition Penalty 502. Therefore, Marker Text 2123 is moved to the Below position, as is shown in FIG. 23.

Marker Text "Task H" 2127 was originally positioned at Right, but, upon the addition of Marker 2338, now suffers a Text-to-Marker Collision resulting in a Marker Score of 10. There is a Marker Score of 0 for it in Left Position and a Marker Score of 2 for it in Upon Position, so Marker Text 2127 is moved to Left. Finally, Marker Text "Milestone J" 2328 was initialized to Left Position by Boundary Proximity Initialization 302 but is moved to Right Position where the Marker Score is 0. While there is some Whitespace to the left of Marker 2338, the width of Marker Text 2328 exceeds the available Whitespace and would cause a Text-to-Marker Collision with Marker 2137 with a Marker Score of 40. The Upon Position would yield a Marker Score of 60 under the Marker Text Overflow Condition of FIG. 4.

Once this re-optimization is complete, the Text Optimization Engine 300 re-calculates the Text Optimization Score 2112 in accordance with the Scoring Matrix in FIGS. 4 and 5. There are no remaining Text Collisions, the Text Optimization Score 2112 has achieved its minimum achievable value, and the Chart has improved legibility after the update.

FIG. 22 begins a description of Escape Path Optimization 378. It illustrates a detailed method for creating another new Chart 2410 from a new set of Event Data 2400 and optimally rendering the Marker Texts 2421-2426 along a Time Axis 2412. One or more sets of Event Data 2400, in this case, project plans, are loaded into the non-transient storage of the computer 102. The user selects a different Template 2405 from the Configuration Form 1200. This different Template 2405 contains an initial Marker Text Position Setting 2406 for all Marker Texts 2421-2426 of Best Fit Left/Right, and also includes a set of Escape Path Settings 2408. These Escape Path Settings 2408 are further detailed in FIG. 23, where the Settings Screen 1300 has a Text Wrapping Switch 2510 that is enabled, indicating that Text Wrapping is enabled, a Text Wrapping Configuration Setting 2520 set to "2 lines" indicating that Text Wrapping is permitted to wrap up to two lines of text, and an Text Wrapping Priority Setting 2530 set to "Highest", meaning that Text Wrapping is the highest-priority Escape Path. Because the Marker Text Position Setting 2406 is Best Fit Left/Right, the permissible locations for Marker Texts 2421-2426 are Left, Right, and Upon. However, because all the Markers 2431-2436 are Milestones, positioning the Marker Texts 2421-2426 in the Upon position would result in large Marker Text Overflow Condition Penalties 402. Thus, the only locations in this Chart 2410 with zero Marker Score are Left and Right. Also note that there are no Bird Sets or Ribbon Sets in this case.

In the first Row 2441, Position Optimization 358 keeps "Long Milestone 1" Marker Text 2421 in its initial Right Position, which has zero Marker Score, rather than in Left, which has a Marker Score of almost 100 because of a Text-to-Boundary Collision with Chart Boundary 2451 or in Upon, which has a Marker Score of 80 because of 40 Penalty Points from Text Overflow 402 and 40 Penalty Points from a Text-to-Boundary Collision with Chart Boundary 2451. Similarly, "Long Milestone 3" Marker Text 2423 is initially at Left due to its proximity 302 to the right-hand Chart Boundary 2452. "Long Milestone 2" Marker Text 2422 therefore has to share Whitespace with either Marker Text 2421 or Marker Text 2423. There is not enough Whitespace to share in either location without a Penalty of 30 for each of these two Markers, which gives the Text Optimization Score the value 60. And the resulting Collisions (not shown) reduce legibility no matter how many passes of Position Optimization 358 are executed.

With intractable Collisions after Position Optimization 358, the Text Optimization Engine 300 in FIG. 3 then goes into Escape Path Optimization 378, applying Text Wrapping to Pair (2432, 2433) with Pair Score 60 and acting upon their Marker Texts 2422 and 2423 by splitting their texts across two lines instead of one. This reduces the Text-to-Text Collision Penalties in this Pair from 60 to zero, trading this decrease for an increase of 20 Penalty Points for using two Text-Wrapping Escape Paths under 410 of FIG. 4. This tradeoff is fine because it greatly improves legibility. Note that only the Marker Texts 2422-2423 undergo Text Wrapping as Escape Path Optimization 378 acts. Marker Text 2421 has enough Whitespace to avoid Text Collisions without Text Wrapping, so its text is not wrapped. The Escape Path Settings 2408 allow for Text Wrapping, but do not require it on Pairs that have no Text Collisions when process 362 calculates Scores as Escape Path Optimization 378 starts.

The second Row 2442 contains similar Marker Texts 2424-2426, and identical Whitespace constraints, so the Text Optimization Engine 300 applies Positional Optimization 358 and Escape Path Optimization 378 via Text Wrapping just as in the first Row 2441.

At all stages of optimization, the Text Optimization Engine 300 calculates a Text Optimization Score 2412 for the Chart 2410 based on the Scoring Matrix of FIG. 4. At the end of optimization, the Marker Texts 2421 and 2424 have no Text Collisions and use no Escape Paths, so both have Marker Scores of zero. The Marker Texts 2422, 2423, 2425, and 2426 all use the Text Wrapping Escape Path for two lines of text, resulting in a Text Optimization Score 2412 of 40, which is 10 Penalty Points per Marker under Condition Penalty 410. Therefore, the four Marker Texts 2422, 2423, 2425, and 2426 have a Marker Score of 10 each, resulting in the Text Optimization Score 2412 of 40 for the entire Chart 2410. Had the Text Optimization Engine 300 not employed Text Wrapping, then the four Marker Texts 2422, 2423, 2425, and 2426 would have each been penalized 30 Penalty Points each for Text-to-Text Collisions, raising the Text Optimization Score 2412 to 120, which is worse than a Text Optimization Score of 40 with Text Wrapping. On the other hand, excessive use of Escape Paths is discouraged by Condition Penalty 410 in FIG. 4. If the Text Optimization Engine 300 had unnecessarily applied Text Wrapping to all Markers, then Markers 2431 and 2434 would each have had Marker Scores of 10, resulting in a Text Optimization Score of 60 (6 Markers×10 Penalty Points). Actually, this is avoided in step 364 of FIG. 3, where Pairs having no Text Collisions are not considered for Escape Path evaluation. Even if they were considered, no Escape Path would be applied because the benefit (0 Penalty Points in reduction in Text Collisions) is not worth the cost (10 Penalty Points).

FIG. 24 depicts the result of the user modifying the Event Data 2400 to have longer Event Names and then using the Chart Refresh Button 2300 in FIG. 21 to update the Chart 2410. The Marker Texts 2421-2423 are now significantly longer than in FIG. 22, so there is no longer enough Whitespace to avoid Text Collisions without increased Degree of Intensity of Text Wrapping from 2 lines to 3 lines. However, the Escape Path Settings 2408 currently limit Text Wrapping to only 2 lines. During re-optimization after the refresh, the Text Optimization Engine 300 minimizes Text Optimization Score 2412 as follows: Marker Text 2421 is wrapped, and Marker 2431 is penalized 10 Penalty Points for its second line of Text Wrapping. Marker Text 2422 remains wrapped and Marker 2432 incurs 10 Penalty Points for its second line of Text Wrapping plus 25 Penalty Points for its Text-to-Text Collision with 2423. Marker Text 2423 remains wrapped, and Marker 2433 gets 10 Penalty Points for its second line of Text Wrapping plus 25 Penalty Points for its Text-to-Text Collision with 2422. Marker 2434 gets no Penalty, as its Marker Text 2424 remains unwrapped and has no Collisions. Marker Text 2425 and 2426 remain wrapped and their Markers 2435 and 2436 are each penalized 10 Penalty Points for their second lines of Text Wrapping. Therefore, the Text Optimization Score 2412 is 100.

The user can employ the Cursor Control Device 030 to adjust the Text Wrapping Configuration Setting 2520 from "2 lines" to "3 lines", raising the allowed Degree of Intensity, which will update the Escape Path Settings 2408 accordingly. The Text Optimization Engine 300 responds by going through the processes of FIG. 3 to optimize the Pair (2432, 2433) and is unable to lower the Text Optimization Score during Positional Optimization 358. However, the change in maximum allowed Degree of Intensity for Text Wrapping allows it to lower Text Optimization Score during Escape Path Optimization 378. FIG. 25 shows the improvement to Chart 2410 after application of higher Degree of Intensity for Text Wrapping 2408. The Marker Text "Now Very Long Milestone 1" 2421 does not increase to a third line of Text Wrapping, so Marker 2431 retains its Marker Score of 10. The Marker Texts 2422 and 2423 both increase to 3 wrapped lines, and each associated Marker 2432 and 2433 adds another 10 Penalty Points to their Marker Scores, for a total of 20 each, but are both able to remove the Penalty Points from their earlier Text-to-Text Collisions, so both end up with a lower Marker Scores of 20. The Marker Text 2422 demonstrates the concept of closely-even division of text across multiple lines, since the first line has a length is nine characters ("Now Very"), the second line has a length of five characters ("Long"), and the third line has a length of eleven "Milestone 2". This minimizes the width of the Marker Text to eleven characters. If the Marker Text 2422 were split into three lines as "Now Very", "Long Milestone", and "2", then the width of Marker Text 2422 would increase to fifteen characters due to the width of the second line and would no longer be minimized. If the Marker Text 2422 were split into three lines as "Now Very Long", "Milestone", and "2", then the width of Marker Text 2422 would increase to fourteen characters due to the width of the second line and would also no longer be minimized. Therefore, the minimum width of Marker Text 2422 is achieved by Text Wrapping as illustrated in FIG. 25. The Marker Texts 2424-2425 remain unchanged from FIG. 22. Therefore, the revised Text Optimization Score 2412 becomes 70 (10+20+20+0+10+10), which is a decrease below FIG. 24's Text Optimization Score of 100.

The user can further improve the Text Optimization Score 2412 by adding a more powerful Escape Path. Using the Cursor Control Device 030 on the Settings Screen 1300, the user can enable a Time Axis Expansion Switch 2810, then use Time Axis Expansion Configuration Settings 2820 and 2825 to configure the number ("1") and units ("months") of time, respectively, allowed to be added to the Time Axis 2412. The user also has the option to change the Time Axis Expansion Configuration Setting 2825 to a different unit such as years, quarters, months, days, weeks, hours, minutes, or seconds, and can change the Time Axis Expansion Configuration Setting 2820 to any number other than one. Together, these Time Axis Expansion Configuration Settings 2820 and 2825 enable the Time Axis 2412 to expand by a wide range of user-specified date/time spans. However, FIG. 26 limits the Degree of Intensity of this Escape Path to the addition of one month. Note that the time span will be added to the Time Axis only if the Text Optimization Engine 300 determines that such addition will lower the Text Optimization Score 2412. The user changes a Time Axis Expansion Priority Setting 2830 to "Highest" and the Text Wrapping Priority Setting 2530 to "2nd Highest". The user's changes are saved to the Escape Path Settings 2408, which tell the Text Optimization Engine 300 to permit the adding of one month of horizontal Whitespace to the right-hand end of the Time Axis 2412 if it lowers the Text Optimization Score, thereby increasing the width and horizontal Whitespace of the entire Chart 241, before moving to the second-priority Escape Path of Text Wrapping.

FIG. 26 reflects the application of these changes, with the Text Optimization Engine 300 now widening the Time Axis 2412 by roughly 50% during Escape Path Optimization 378, since it now includes the month of March. This addition of Whitespace through the higher-priority Time Axis Widening Escape Path renders Text Wrapping less important, though it still is beneficial.

Marker Text 2421 remains wrapped at 2 lines and has a Marker Score of 10 for Marker 2431. Marker Text 2422 reduces Text Wrapping from 3 lines to 2, so the Marker Score for Marker 2432 drops from 20 to 10, since it is using its Text Wrapping less intensely. Marker Text 2423 is now completely unwrapped, so the Marker Score for Marker 2433 goes from 20 to zero. Marker Text 2424 remains unwrapped as it always has, and the Marker Score for Marker 2434 remains zero. Marker Texts 2425 and 2426 are both able to unwrap from two lines to one, thereby avoiding Text Wrapping and lowering the Marker Scores for Markers 2435 and 2436 from 10 each to zero each. The Text Optimization Score of the Markers 2431-2436 is therefore 20. The addition of Time Axis Expansion comes at a cost of 10 (=20*1 month/2 months) additional Penalty Points based on 412. However, those Penalty Points are incurred once across the entirety of the Chart 2410 as opposed to being incurred for each of the individual Marker Texts 2423 and 2426 that benefitted, so this is an efficient spend of Penalty Points. The result in FIG. 26 therefore has a Text Optimization Score 2412 of 30 (10+10+0+0+0+0+10), with the first six numbers pertaining to the Markers 2431-2436 and the final 10 Penalty Points pertaining to the Time Axis Expansion. With its Text Optimization Score 2412 of 30, FIG. 26 represents a better solution than the 70-Penalty-Point Text Optimization Score in FIG. 25, which in turn was better than the 100-Penalty-Point Text Optimization Score in FIG. 24.

To explore another type of Escape Path, the user reverts for simplicity to the original Event Data 2400 from FIG. 22, where Event Names were shorter than in the revised Event Data 2400 of FIG. 24. FIG. 27 depicts the end user employing the Cursor Control Device 030 on the Settings Screen 1300 to disable both Text Wrapping and Time Axis Expansion Paths by unchecking both the Text Wrapping Switch 2510 and the Time Axis Expansion Switch 2810 and then enabling Text Truncation as the sole Escape Path by turning on a Text Truncation Switch 3010 and adjusting a Text Truncation Setting 3020 to limit Text Truncation to ten characters, meaning that any Marker Text subject to Text Truncation under the Escape Path Settings 2408 will still retain at least the first nine characters, plus an ellipsis (" . . . ") character, for a total of 10 characters. The Reoptimize After Update Control 1320 is also changed from "Only Changed Markers" to "All Markers".

Now the Cursor Control Device 030 is used to click on a Chart Refresh Button 2300, which refreshes the Marker Texts 2421-2423 back to the original Event Data 2400. Since the Reoptimize After Update Control 1320 is set to re-optimize "All Markers", the Text Optimization Engine 300 will work on all the Text Collisions in the Chart 2410.

As these changes are applied, the Time Axis 2412 narrows back to two months instead of three. Marker Texts 2421 and 2424 unwrap and do not need Text Truncation, so these two Marker Scores are zero. Marker Texts 2422 and 2426 truncate from "Long Milestone 2" and "Long Milestone 6", respectively, to "Long Milest . . . ", representing truncation to twelve characters, including the ellipsis, compared to their original lengths of sixteen. This loss of 33% of their length costs 13.3 Penalty Points for each truncated Marker 2432 and 2436 under Condition Penalty 404 in FIG. 4, which is better than the 30 Penalty-Point cost of a Text-to-Text Collision. Marker Texts 2423 and 2425 truncate from "Long Milestone 3" and "Long Milestone 5", respectively, to "Long Mile . . . ", a truncation to the minimum-allowed ten characters compared to their original lengths of sixteen. This loss of 37.5% of their length means that Markers 2433 and 2435 incur 15 Penalty Points each. The Text Optimization Score 2412 becomes 56.6 (0+13.3+15+0+15+13.3), which is less optimal than the Text Wrapping in FIG. 22 that had a Text Optimization Score of 40.

FIG. 28 depicts the end user employing the Cursor Control Device 030 on the Settings Screen 1300 to disable Text Truncation as an Escape Path by unchecking the Text Truncation Switch 3010, and then enabling Font Reduction as the sole Escape Path by turning on a Font Reduction Switch 3210 and adjusting a Font Reduction Setting 3220 to limit Font Reduction to 50% of the default font size, which is set to a 14-pt font in a Default Font Size Control 3250.

FIG. 29 shows the resulting changes to the Chart 2421. Marker Texts 2421 and 2421 have adequate Whitespace in the Right position, so the Text Optimization Engine 300 applies no Position Optimization 358 nor Escape Path Optimization 378, since they currently have no Collisions. Marker Texts 2422, 2423, 2425, and 2426 do not have adequate Whitespace, so the Text Optimization Engine 300 reduces all their fonts from the default 14-pt to a 10-pt font size. This 28.5% reduction is within the 50% boundary established by the Font Reduction Setting 3220 and costs 11.4 (=40*28.5%) Penalty Points for each of the four Markers 2432, 2433, 2435, and 2436 under Condition Penalty 414. Therefore, the Text Optimization Score 2412 for the Chart 2410 is 45.6 (0+11.4+11.4+0+11.4+11.4). This Text Optimization Score is slightly better than the Text Truncation outcome illustrated in FIG. 27, but still not as good as the Text Wrapping solution illustrated in FIG. 22. The relative Text Optimization Scores of these Escape Paths optimizations depend upon details of the Penalty Points assigned in FIG. 4 and can be changed to suit user preferences, but the settings in FIG. 4 appear reasonable as FIG. 29 is more legible than FIG. 27 but not as legible as FIG. 22.

FIG. 30 shows the changes to Chart 2410 if the user modifies the Event Data 2400 to include some shorter Event Names and some different Start Times and End Times and then uses the Cursor Control Device 030 to change a Default Row Height Setting 3400 from 1.000 inches to 0.300 inches. This greatly reduces the vertical Whitespace available in both Rows 2441 and 2442. The user also employs the Cursor Control Device to eliminate Font Shrinking by turning off the Font Shrinking Switch 3210, turning Text Wrapping back on with the Text Wrapping Switch 2510, and limiting its Degree of Intensity to a maximum of two lines using the Text Wrapping Configuration Setting 2520.

As a result, Marker Text 2425, which is wrapped to avoid a Text-to-Text Collision with Marker Text 2426, does not have enough vertical Whitespace to avoid having its text extend past the top and bottom of the Row 2442. Extending past a Row boundary is not penalized in the current Scoring Matrix of FIGS. 4 and 5 although a different embodiment of this invention could add a Condition Penalty for Marker Text that overlaps visible horizontal border lines on a Row, as such overlap reduces legibility. Notwithstanding that, FIG. 30 presents two other legibility issues addressed by the current embodiment. First, Marker Text 2425 has a Text-to-Marker Collision with Marker 2432 at a cost of 5 Penalty Points. Secondly, Marker Text 2425 has a Text-to-Boundary Collision with a lower Chart Boundary 3453, at a cost of 20 Penalty Points. The wrapping of the Marker Text 2425 costs 10 Penalty Points, so the contribution of Marker 2435 to the Text Optimization Score is 35. Neighboring Marker Text 2426 experiences a 10 Penalty-Point Text-to-Marker Collision with Marker 2433 and an identical Text-to-Boundary Collision with Chart Boundary 3453. Since Marker Text 2426 was also wrapped to a second line, Marker 2436 has a Marker Score of 40 (=10+20+10) Penalty Points, for a Text Optimization Score of 75 for the entire Chart 2410 shown in FIG. 30.

FIG. 31 shows that the user can return to the Settings Screen 1300, use the Cursor Control Device 030 to enable Row Height Expansion as a secondary Escape Path by turning on a Row Height Expansion Switch 3510, setting its priority to "Second Highest" using a Row Height Expansion Priority Control 3530, and configuring Row Height Expansion to increase any given Row up to 75% beyond the Default Row Height 3400 using a Row Height Expansion Configuration Setting 3520. FIG. 31 also shows the result of having the Text Optimization Engine 300 re-optimize with these changes in settings. There are no Text Collisions in Row 2441, so the Text Optimization Engine 300 makes no changes to the Text Positions nor does it apply either of the two Escape Paths there. The three Markers in this row make a total contribution to the Text Optimization Score 2412 of zero. Row 2442 is a different story. Since the Position Optimization 358 in FIG. 3 finds no trial Text Positions that would lower Marker Scores, it moves to Escape Path Optimization 378. Finding no changes in Text Wrapping that would lower Marker Scores, it turns to the second-highest priority of Row Height Expansion. By increasing the Row Height of Row 2442 from 0.30 inches up to 0.50 inches in increments of 0.05 inches and calculating Marker Scores 370 for Marker 2435 and 2436 at each Row Height, the Text Optimization Engine 300 finds that a Row Height of 0.450 minimizes the Text Optimization Score. In this embodiment, the Text Optimization Engine 300 uses a linear search to find the minimum Row Height of 0.450, but a different embodiment of the invention might use a more precise algorithm such as the golden-section search. The value 0.400 still incurs Text Collision Penalty Scores for these two Markers.

The value 0.500 has no Text Collision Penalty Points, but costs increasing Penalty Points via the Condition Penalty 406 as the trial Row Height increases. Thus, a Row Height of 0.450 inches is the newly-assigned Degree of Intensity for this Escape Path, and it costs 10 Penalty Points (20*50%), which is allocated across the entire Row 2442 and is not incurred individually by the Markers 2434-2436 in Row 2442. Marker Texts 2425-2426 are both wrapped at a cost of 10 Penalty Points each. Therefore, the Text Optimization Score 2412 is 30 (0+0+0+0+10+10+10), where the first six figures are the individual Marker Scores of Markers 2431-2436, and the seventh figure is the cost of the Row Height Expansion applied to Row 2442. This Text Optimization Score of 30 for the Chart shown in FIG. 31 is lower than the value of 70 in FIG. 30, and the better legibility of FIG. 31 versus FIG. 30 is consistent with this reduction in total Penalty Points.

FIG. 32 describes another Escape Path, depicting a new set of Event Data 3700, and changes to the Settings Screen 1300 to enable Stairsteps using a Stairstep Switch 3710 and a Stairstep Setting Control 3720 that sets a Stairstep's maximum distance at two levels (i.e. two Rows above or below the Row containing the Marker). An optimized new Chart 3730 contains a Marker Text 3725 that Position Optimization 358 puts (not shown) in the Above Position to minimize its Marker Score at 42=10+32, where the 10 comes from the Text-to-Marker Collision with Marker 3732 and the 32 comes from the Text-to-Marker Collision with Marker 3733. However, by using a Stairstep in Escape-Path Optimization 378, the Text Optimization Engine 300 is able to lower this Marker Score by putting Marker Text 3725 into Row 3741 to avoid all Text Collisions. It pays 20 Penalty Points for the Stairstep Condition Penalty 408 in FIG. 4, but 20 Penalty Points is a reduction from the 42 Penalty Points without the Stairstep Escape Path. And the result makes good use of available Whitespace to avoid all Text Collisions.

FIG. 33 depicts the same Chart 3730, but after the user has selected Marker 3737 with the Cursor Control Device 030 and dragged it from Row 3744 to Row 3742. The Text-to-Marker Collision between the Marker Text 3727 and Marker 3733 costs 60 Penalty Points, so the user places the Cursor Control Device 030 over the Marker Text 3727, right-clicks, and chooses the Re-Optimize Text Collisions Option 1500. This causes the Text Optimization Engine 300 to re-optimize Marker Text 3727, turning it into a Stairstep in Row 3744. The Text Optimization Score after this re-optimization lowers to 20 Penalty Points (=2 levels*10 Penalty Points per level), which is an improvement over the 60 Penalty Points if the user had not re-optimized.

ADVANTAGES

From the description above, a number of advantages of the described embodiment become evident. It is to be appreciated that other embodiments falling within the scope of the claims may not exhibit some or even all of these advantages. The described embodiment facilitates the creation and maintenance of project Charts having a standard set of visual characteristics stored in Templates, saving project managers considerable time compared to manually configuring and preserving their standards for visual presentation of projects.

The Text Optimization Engine, combined with the Marker Text Position Setting, the Escape Path Settings, and the ability to automatically minimize Text Collisions in the Chart in accordance with a Scoring Matrix, a Text Optimization Score, Position Optimization, and Escape Path Optimization give users wide latitude to create Charts that can be both dense with information and highly legible. The abilities to Maverick and un-Maverick, to update the Chart with new and changed Event Data, and then re-minimize affected Text Collisions, selected Text Collisions, or all Text Collisions let users maintain density of information and high legibility while updating the data behind the Chart and altering Chart visual characteristics over time. Attempting to create and maintain such dense, legible Charts manually is tedious and time-consuming, because the lack of automatic Text Collision minimization forces users to manually position Marker Texts one-by-one to avoid Text Collisions, and to repeat this tedious process after data updates or user edits to the Chart.

CONCLUSION, RAMIFICATIONS, AND SCOPE

While the invention has been described and disclosed here in connection with certain embodiments, the description is not intended to limit the invention to the specific disclosed embodiments. Rather, the description is intended to provide an illustration of several exemplary embodiments, and the invention is intended to cover all embodiments and modifications that fall within the spirit and scope of the invention as defined by the appended claims as well as any equivalents thereof.

We claim:

1. A computer-implemented method for representing events in a project as a chart, the method comprising:
   providing a computer system including a display, non-transient data storage, a processor; and an input device;
   storing event data containing data attributes pertaining to one or more events in the non-transient data storage, the data attributes having data types of at least one of strings, numbers, and dates;
   the processor performing a calculation of text collision minimization by providing a user-defined marker text position setting containing a default meta-location; and
   for each of the one or more events, providing a marker, the width and horizontal position of each marker along a time axis computed by the processor based on the event data; and
   for each of the one or more events, providing a marker text based on the event data and associated with each of the one or more markers; the processor measuring a width and a height of each marker text; and
   for each of the marker texts, the processor measuring the amount of overlap with other marker text and other markers; and
   for each of the one or more markers, rendering the marker and the associated marker text in the chart along the time axis on the display, the position of each marker text being determined by the processor based on a plurality of marker text positions allowed by the meta-location specified by the marker text position setting; and
   for each of the one or more marker texts where the processor detects a text collision at the first marker text position, moving the marker text to a second marker text position where the text collision is minimized.

2. The computer-implemented method of claim 1, wherein the chart contains a bird set and the meta-location specified by the marker text position setting permits only marker text positions of above and below for markers interior to the bird set and favors marker text positions of left and right for markers on the exterior of the bird set.

3. The computer-implemented method of claim 1, wherein the chart contains a ribbon set and the meta-location specified by the marker text position setting permits only marker text positions of above, below, or upon for markers interior to the ribbon set and favors marker text positions of left and right for markers on the exterior of the ribbon set.

4. The computer-implemented method of claim 1, wherein the chart is in a Gantt layout and the meta-location specified by the marker text position setting permits only marker text positions of left, right, and upon.

5. The computer-implemented method of claim 1, wherein a user clicks on a chart refresh button using the cursor control device; without the user selecting any markers or marker text, the processor performing a revised minimization of text collisions for all marker text.

6. The computer-implemented method of claim 1, wherein the user selects one or more instances of marker text with the cursor control device and clicks on a re-optimize text collisions button; the processor performing a revised minimization of text collisions for only the marker texts selected by the user.

7. The computer-implemented method of claim 1, wherein the user selects one or more instances of marker text with the cursor control device and changes the marker text position for the selected marker texts to a maverick text position; the user then changing the marker text position setting; the processor changing the marker text positions of all pieces of marker text in the chart in accordance with the revised marker text position setting, except those with the maverick text position.

8. The computer-implemented method of claim 1, wherein the user assigns a score to each of the marker text positions and also assigns a score to each of a type of text collision; and for each piece of marker text, the processor calculates a text optimization score that assigns a numeric value based on the user-defined scores, in consideration of:
   which marker text position is used; and
   the severity of any text collisions that occur;
   the processor sums the text optimization scores for each individual marker to calculate a total text optimization score for the entire chart; and
   the processor determines if the total text optimization score for the chart has been minimized, or if changing the marker text position would result in a lower text optimization score; and continues to perform a revised calculation of text collision minimization until a minimum text optimization score is achieved.

9. A computer-implemented method for representing events in a project as a chart, the method comprising:
   providing a computer system including a display, non-transient data storage, a processor; and an input device;
   storing event data containing data attributes pertaining to one or more events in the non-transient data storage, the data attributes having data types of at least one of strings, numbers, and dates;
   for each of the one or more events, providing a marker, the width and horizontal position of each marker along a time axis computed by the processor based on the event data; and
   for each of the markers, the processor measuring the amount of overlap with other marker text and other markers; and
   for each of the one or more events, providing a marker text based on the event data and associated with each of the one or more markers; the processor measuring a width and a height of each marker text; and
   for each of the one or more markers, rendering the marker and the associated marker text in the chart along the time axis on the display, the position of each marker text being determined by the processor; and
   the processor performing a calculation of text collision minimization by providing a set of user-defined escape path settings; and
   for each of the one or more marker texts where the processor detects a text collision, applying one or more escape paths to the marker text in accordance with the escape path settings, to minimize the text collision.

10. The computer-implemented method of claim 9, wherein the escape path settings include wrapping of the marker text.

11. The computer-implemented method of claim 9, wherein the escape path settings include truncation of the marker text or a reduction in font size of the marker text.

12. The computer-implemented method of claim 9, wherein the escape path settings include a placement of marker text into a stairstep.

13. The computer-implemented method of claim 9, wherein the escape path settings include horizontal expansion of the time axis.

14. The computer-implemented method of claim 9, wherein the escape path settings include vertical expansion of a row in the chart.

15. The computer-implemented method of claim 9, wherein the user can enable or disable an escape path using the cursor control device; the processor then performing a revised minimization of text collisions, making use of only the escape paths that are currently enabled.

16. The computer-implemented method of claim 9, wherein the user can establish a priority for each escape path; the processor then performing a revised minimization of text collisions, only using lower-priority escape paths when higher-priority escape paths have been fully exercised and a text collision still exists.

17. The computer-implemented method of claim 9, wherein the user can establish a setting for each escape path which defines a maximum degree to which the escape path can be used; the processor then performing a revised minimization of text collisions, limiting the extent to which each escape path is utilized based on the setting.

18. The computer-implemented method of claim 9, wherein a user clicks on a chart refresh button using the cursor control device; without the user selecting any markers or marker text, the processor performing a revised minimization of text collisions for all marker text.

19. The computer-implemented method of claim 9, wherein the user selects one or more pieces of marker text with the cursor control device and clicks on a re-optimize text collisions button; the processor performing a revised minimization of text collisions to only the pieces of marker text selected by the user.

20. The computer-implemented method of claim 9, wherein the user selects one or more pieces of marker text with the cursor control device and changes the escape path for the selected pieces of marker text to a maverick escape path; the user then changing the escape path settings; the processor changing the escape paths of all pieces of marker text in the chart in accordance with the revised escape path settings, except those with the maverick escape path.

21. The computer-implemented method of claim 9, wherein the user assigns a score to each of the active escape paths and also assigns a score to each of a type of text collision; and for each piece of marker text, the processor calculates a text optimization score that assigns a numeric value based on the user-defined scores, in consideration of:

which of one or more escape paths are used; and how intensely each of the one or more escape paths are deployed; and the severity of any text collisions that occur;

the processor sums the text optimization scores for each individual marker to calculate a total text optimization score for the entire chart; and the processor determines if the total text optimization score for the chart has been minimized, or if changing the use or intensity of one or more escape paths would result in a lower text optimization score; and continues to perform a revised calculation of text collision minimization until a minimum text optimization score is achieved.

* * * * *